United States Patent [19]

Kobayashi et al.

[11] Patent Number: 5,264,894
[45] Date of Patent: Nov. 23, 1993

[54] CAMERA

[75] Inventors: Ryuichi Kobayashi; Hidehiko Fukahori; Kenji Yokoyama; Tsuyoshi Fukuda, all of Kanagawa, Japan

[73] Assignee: Canon Kabushiki Kaisha, Tokyo, Japan

[21] Appl. No.: 911,701

[22] Filed: Jul. 10, 1992

[30] Foreign Application Priority Data

Jul. 12, 1991 [JP] Japan .................. 3-172687

[51] Int. Cl.⁵ ............................................. G03B 7/00
[52] U.S. Cl. .................. 354/415; 354/129; 354/138; 354/147
[58] Field of Search ............... 354/129, 137, 138, 146, 354/147, 245–249, 413, 415, 456, 458, 459

[56] References Cited

U.S. PATENT DOCUMENTS

| 2,933,025 | 4/1960 | Meyer | 354/146 |
| 3,987,468 | 10/1976 | Matsuzaki et al. | 354/146 |
| 4,299,464 | 11/1981 | Cushman | 354/137 |
| 4,963,908 | 10/1990 | Toyoda et al. | 354/246 |
| 4,977,421 | 12/1990 | Fukuda | 354/246 |
| 4,999,663 | 3/1991 | Nakamura et al. | 354/415 |

Primary Examiner—David M. Gray
Attorney, Agent, or Firm—Fitzpatrick, Cella, Harper & Scinto

[57] ABSTRACT

A camera having a red-eye phenomenon preventing emission device, the camera comprising, a shutter having a leading curtain and a trailing curtain, a flash unit capable of flashing in a range of time between immediately after a completion of a running of the leading curtain to immediately before a start of a running of the trailing curtain, and emission control means which disables the red-eye phenomenon preventing emission device when the flash unit is set for flashing immediately before the start of a running of the trailing curtain.

2 Claims, 44 Drawing Sheets

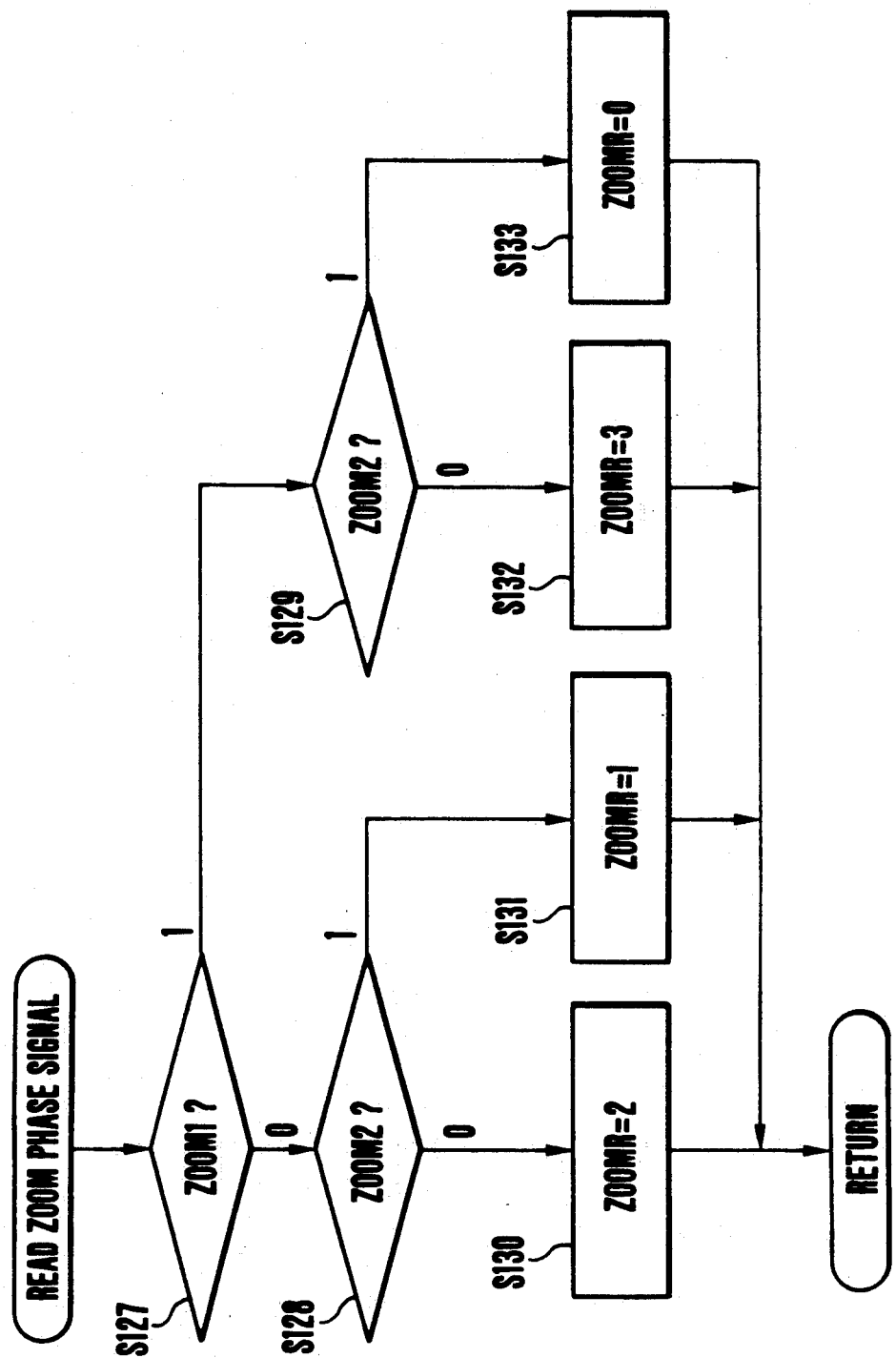

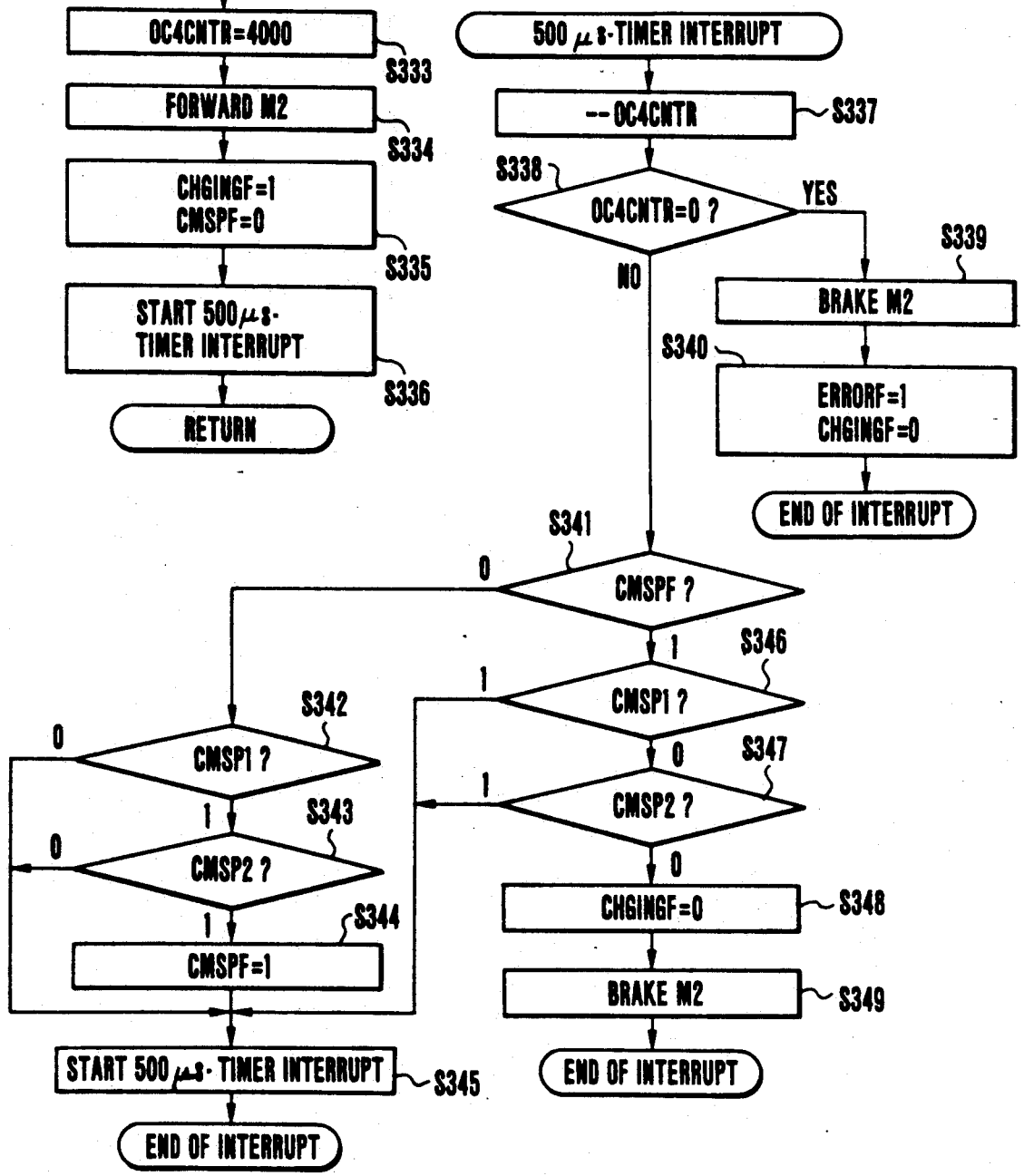

CAMERA

FIELD OF THE INVENTION AND RELATED ART

The present invention relates to a camera and, more particularly, to a camera provided with a red-eye preventing function.

Conventionally, a camera is commercially available which is arranged to project either light from a light source, such as a lamp or part of a flash, toward a subject before flash photography occurs to reduce the size of the subject's pupils for the purpose of preventing red eyes from occurring during the flash photography.

Another camera is proposed which is capable of switching the flash timing of a flash unit between a timing immediately after the completion of the running of a leading curtain of a shutter and a timing immediately before the start of the running of a trailing curtain of the shutter. With this camera, it is possible to photograph a natural image of a moving subject in which the motion thereof is represented like a so-called afterimage.

As a conventional camera provided with a red-eye phenomenon preventing device, a camera is known which is capable of switching the flashing timing of a flash unit between a timing immediately after the completion of a running of the leading curtain of the shutter and a timing immediately before the start of a running of the trailing curtain of the shutter. This camera has the disadvantage that since it continues to emit red-eye phenomenon preventing light until immediately before the start of a running of the trailing curtain of the shutter, the light may be photographed on film.

To prevent the occurrence of red eyes, it is necessary to reduce the size of the subject's pupils by projecting a light toward the eyes of the subject until immediately before the flash unit flashes. However, the proposed camera has the disadvantage that since it continues to emit the red-eye preventing light until immediately before the start of the running of the trailing curtain of the shutter, the light may be photographed on film. When the flash timing of the flash unit is set to a timing immediately before the start of the running of the trailing curtain of the shutter, if the emission of the red-eye preventing light is stopped before the start of running of the leading curtain of the shutter, the pupils, which have been temporarily reduced in size, will again open before the flashing of the flash unit. As a result, no sufficient red-eye preventing effect will be achieved. In many cases, if the flash timing of the flash unit is set to a timing immediately before the start of the running of the trailing curtain of the shutter, the camera is generally set for bulb photography involving a certain extent of long-time exposure, with the result that the red-eye preventing effect becomes insufficient.

SUMMARY OF THE INVENTION

An object of the present invention is to provide a camera with an improved red-eye preventing function from which the above-described disadvantages of the conventional camera are eliminated.

To solve the above-described problems, an improved camera according to the present invention is provided with emission controlling means for disabling the operation of a red-eye preventing emission device if the flashing timing of a flash unit is set to a timing immediately before the start of running of a shutter trailing curtain.

BRIEF DESCRIPTION OF THE DRAWINGS

FIG. 13 is a flowchart of the subroutine "Read zoom signal".

FIGS. 30(A) and 30(B) are flowcharts of the subroutines for "Start shutter charging".

DETAILED DESCRIPTION OF THE INVENTION

The camera according to the present invention is characterized by being provided with emission controlling means for disabling the operation of a red-eye phenomenon preventing emission device if the flashing timing of a flash unit is set to a timing immediately before the start of running of a shutter trailing curtain.

The camera according to the present invention does not cause a failure in photography even if the flashing timing of the flash unit is set to a timing immediately before the start of running of the shutter trailing curtain.

The camera according to the present invention is provided with a red eye preventing emission device, where the camera comprises a shutter means, which is located within the camera, and has a leading curtain and a trailing curtain, a flash unit capable of flashing in a range of time between immediately after a completion of a running of the leading curtain to immediately before a start of a running of the trailing curtain, and emission control means which disables the read eye preventing emission device when the flash is set for flashing immediately before the start of a running of the trailing curtain.

According to the present invention there is also provided a photographic system comprising a camera, a red eye preventing emission device coupled to the camera, a shutter means, which is located within the camera and has a leading curtain and a trailing curtain, a flash unit capable of flashing in a range of time between immediately after a completion of a running of the leading curtain to immediately before a start of a running of the trailing curtain, and emission control means which disables the red eye preventing emission device when the flash is set for flashing immediately before the start of the running of the trailing curtain.

Figure 32:
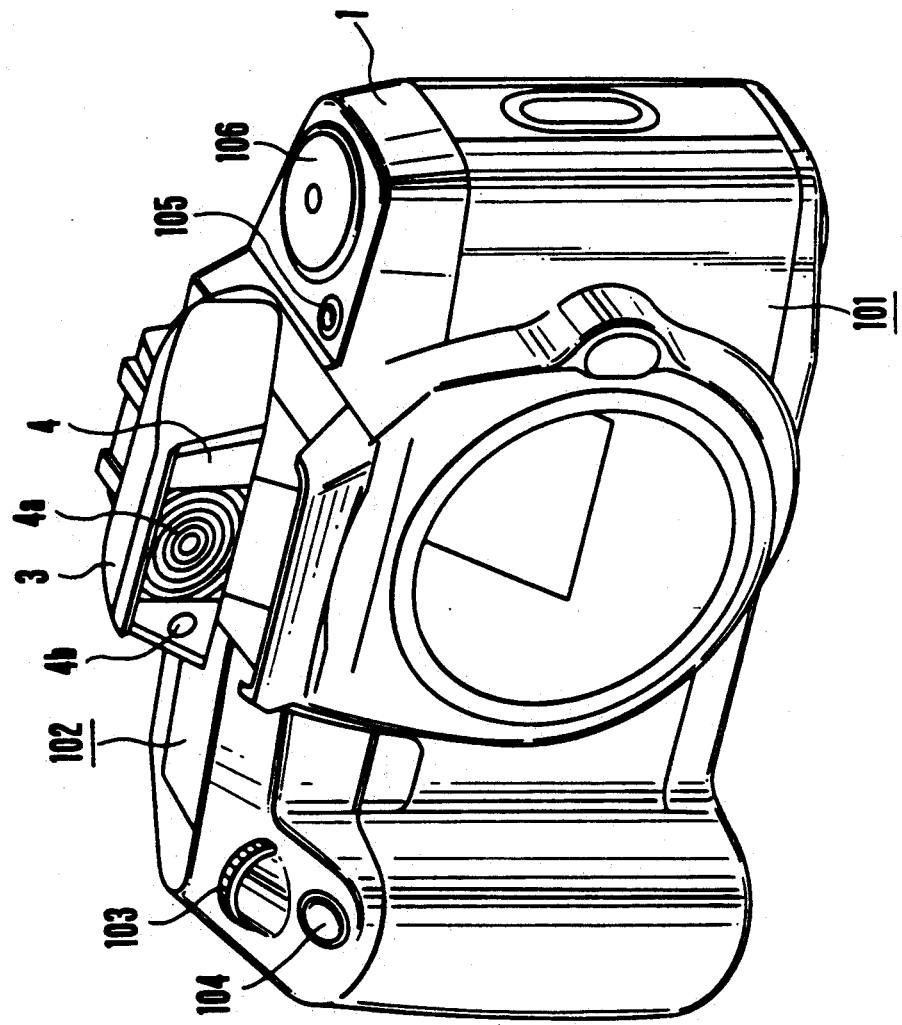
FIG. 32 is a perspective view of the entire camera constructed according to the present invention.
Figure 33:
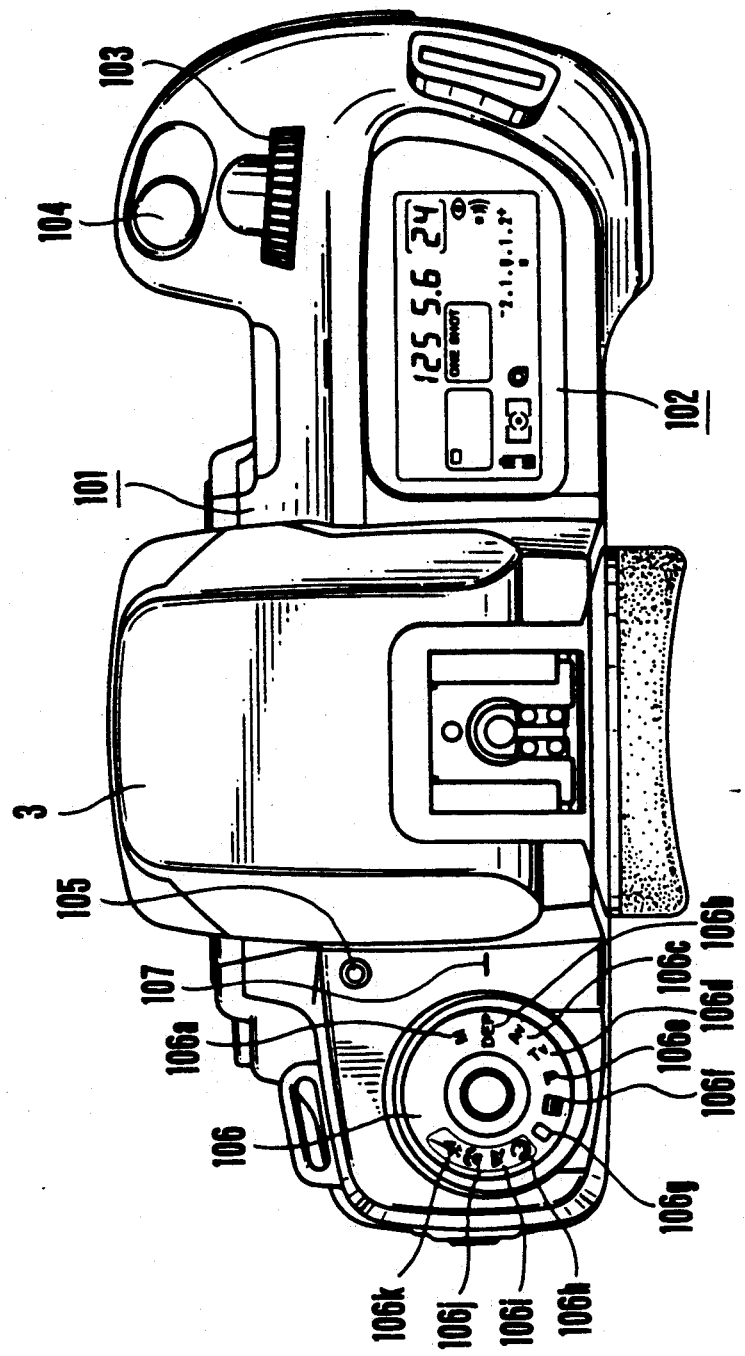
FIG. 33 is a top plan view of the camera.

An embodiment of a camera provided with an improved red-eye preventing function according to the present invention will be described below with reference to the accompanying drawings. First of all, the mechanical structures of a flash unit and other parts of the camera to which the present invention is applied will be described below with reference to FIGS. 32 through 41. Referring to FIGS. 32 and 33, a general camera body is indicated by reference numeral 101, and is provided with a camera information display 102, a dial 103 for inputting a set value such as a shutter speed, a release button 104, a flash pop-up button 105, a dial 106 for setting an exposure control mode for the camera, and a fixed mark 107. The camera information display 102 and the dials 103 and 106 for inputting information, etc., will be described later in detail.

Referring to FIGS. 32 through FIGS. 37(A), 37(B) and 37(C), a top cover 1 serves as an exterior member which constitutes part of the camera body 101. A case 2 for the flash unit is supported rotatably with respect to the top cover 1, and constitutes the skeleton of the flash unit. A slot 2a plays the role of routing a lead wire 40, to be described later, by allowing it to pass therethrough, and of absorbing the movement of members caused by a flash zooming operation. A flash cover 3 constitutes the external appearance of the flash unit, and is fixed to the case 2. A panel 4 covers the entire front face of the flash unit, and has a Fresnel lens portion 4a, for controlling flashed light, and a window portion 4b opposed to a red-eye preventing lamp which will be described later. A base plate 5 has a plurality of gear shafts, a bearing 5a having an outer circumference which serves as a rotating shaft for the case 2, a bearing 5b and a spring hook 5c. The base plate 5 is fixed to the top cover 1 on the reverse side thereof by screws.

A motor M2 is fixed to the camera body 101 of the camera or to a mirror box, and a gear 6 is meshed with a gear train which is coupled to the motor M2 and which includes a planetary clutch mechanism to be described later. Rotation in only one direction is transmitted to the gear 6 from the motor M2 through the gear train. The rotation of the gear 6 is rotationally transmitted to a gear 8 through a gear 7.

A gear 9 is meshed with the gear 8, and is rotatably fitted into the inner circumference of the bearing 5a of the base plate 5. A gear 10 is meshed with the gear 9, and has one side provided with a blade assembly 10a consisting of three blades which are arranged at equally spaced circumferential intervals as shown in each of FIGS. 37(A), 37(B) and 37(C). A lever 11 has a shaft portion 11a, a projection 11b, a spring hook 11c and a switch pressing portion 11d. The shaft portion 11a is supported for rotation with respect to the inner circumference of the bearing 5b. The switch pressing portion 11d turns on a switch SW3 (refer to FIG. 35) when the lever 11 moves during a pop-up operation. A retaining lever 12 has a claw 12b as well as a projection 12a in the vicinity of the claw 12b, and is fixed to the shaft portion 11a of the lever 11. A spring 13 is hooked on the spring hook 5c of the base plate 5 at one end and on the spring hook 11c of the lever 11 at the other end. The spring 13 urges the retaining lever 12 in a counterclockwise direction, i.e., so that the claw 12b rotates in its engagement direction. A bearing 14 is, in part, fixed to the top cover 1 and, in part, serves as a rotating shaft for the case 2.

Figure 36:
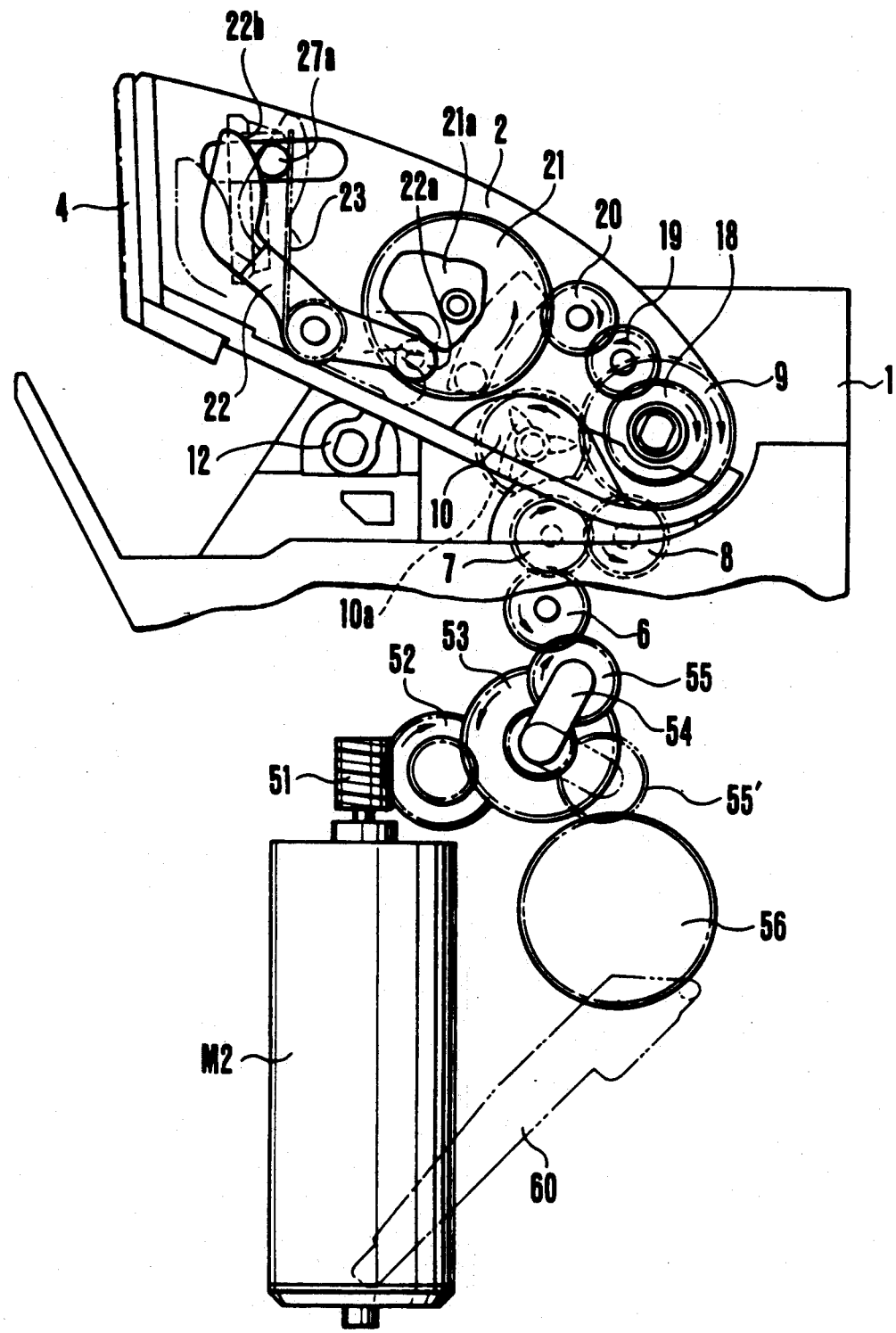
FIG. 36 is a side view of a flash zoom mechanism.
Figure 37A:
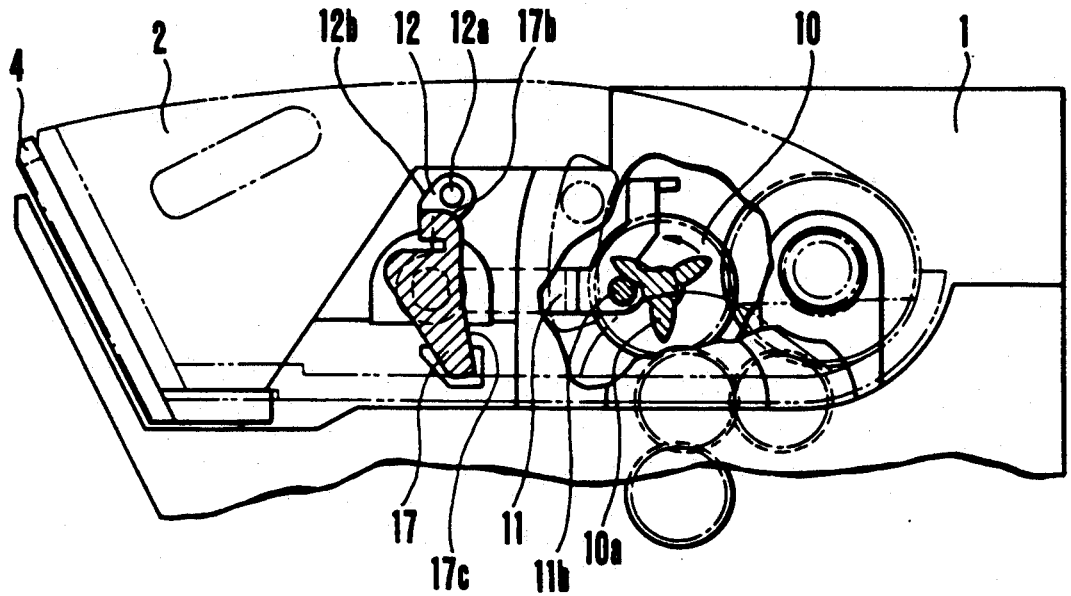
FIGS. 37(A) to 37(C) are side views showing a flash-unit pop-up mechanism.
Figure 37B:
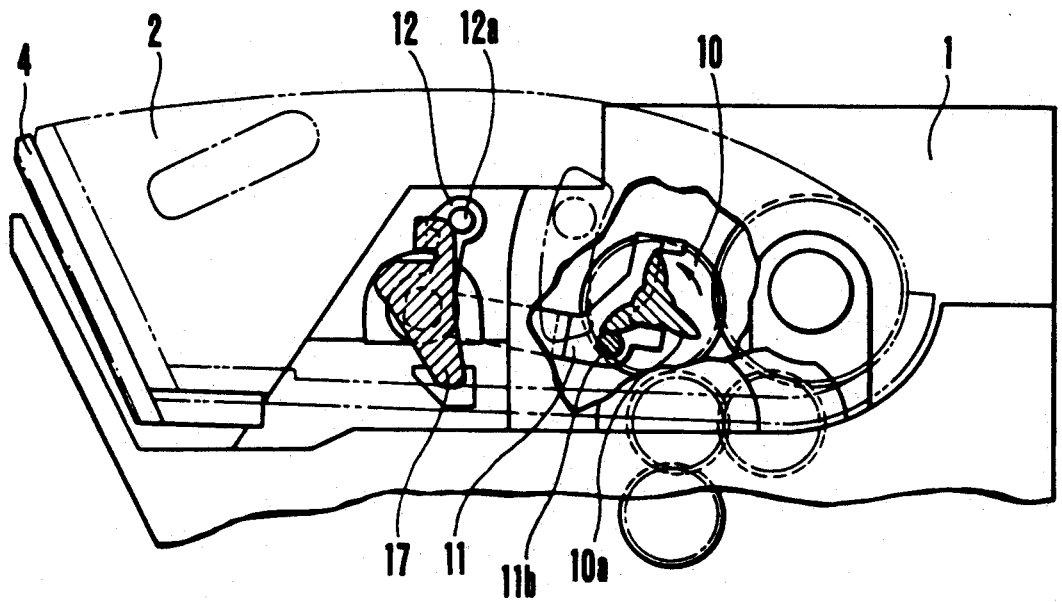
Figure 37C:
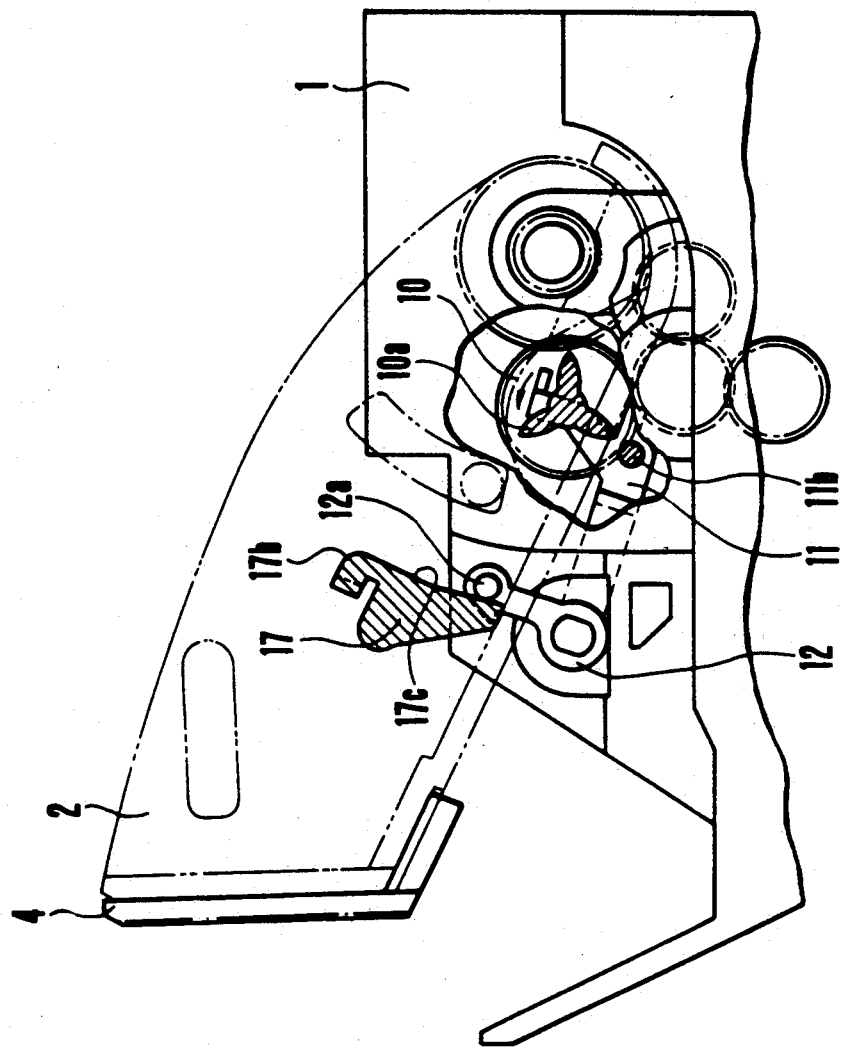

Screws 15L and 15R serve as stoppers when the case 2 rotates in the direction in which it projects from the top cover 1, and are fastened to the top cover 1. A spring 16 urges the case 2 in the pop-up direction, and is fitted onto a portion of the outer circumference of the bearing 14 with one arm hooked on the screw 15R and the other arm on the case 2. A fixed engagement member 17 has a hook 17a on which the claw 12b of the retaining lever 12 is hooked. As shown in FIGS. 37(A) through 37(C), the fixed engagement member 17 has cam portions 17b and 17c, and the cam portion 17c has an arc concentric to the rotational axis of the case 2. The fixed engagement member 17 is fixed to the case 2. As shown in FIG. 36 and FIGS. 37(A) to 37(C), when the motor M2 is activated, the rotation of the motor M2 is transmitted to the gear 10 through the gears 6 to 9, and the blade assembly 10a of the gear 10 pressed down the projection 11b of the lever 11 against the spring 13. Then, the retaining lever 12 is made to rotate in a clockwise direction which is the same as the direction of movement of the lever 11, and the claw 12b of the retaining lever 12 is released from the hook 17a of the fixed engagement member 17. The case 2 starts to turn in the projecting direction by the urging of the spring 16, thus bringing the projection 12a into abutment with the cam portion 17b of the fixed engagement member 17.

The case 2 turns further, and as it turns by the force of the spring 16, the case 2 presses the projection 12a of the retaining lever 12 through the cam portions 17b to 17c of the fixed retaining member 17. Thus, the retaining lever 12 is made to turn in the region of the cam portion 17c until the projection 11b of the lever 11 moves away from the rotating area of the blade assembly 10a of the gear 10 (refer to FIGS. 37(B) and 37(C)). In other words, the retaining lever 12 is released by the blade assembly 10a and the case 2 starts its upward movement. The retaining lever 12 is made to escape to a further extent by the upward movement of the case 2, and the projection 11b of the lever 11 is made to turn outward of the rotating area of the blade assembly 10a so that no further rotation of the motor M2 is transmitted to either of the lever 11 and the retaining lever 12. The case 2 further turns in the projecting direction until it comes into abutment with the screws 15L and 15R, with a constant frictional force produced between the projection 12a and the arcuate part of the cam portion 17c by the urging force of the spring 13 (refer to FIGS. 37(A) to 37(C)).

Figure 38:
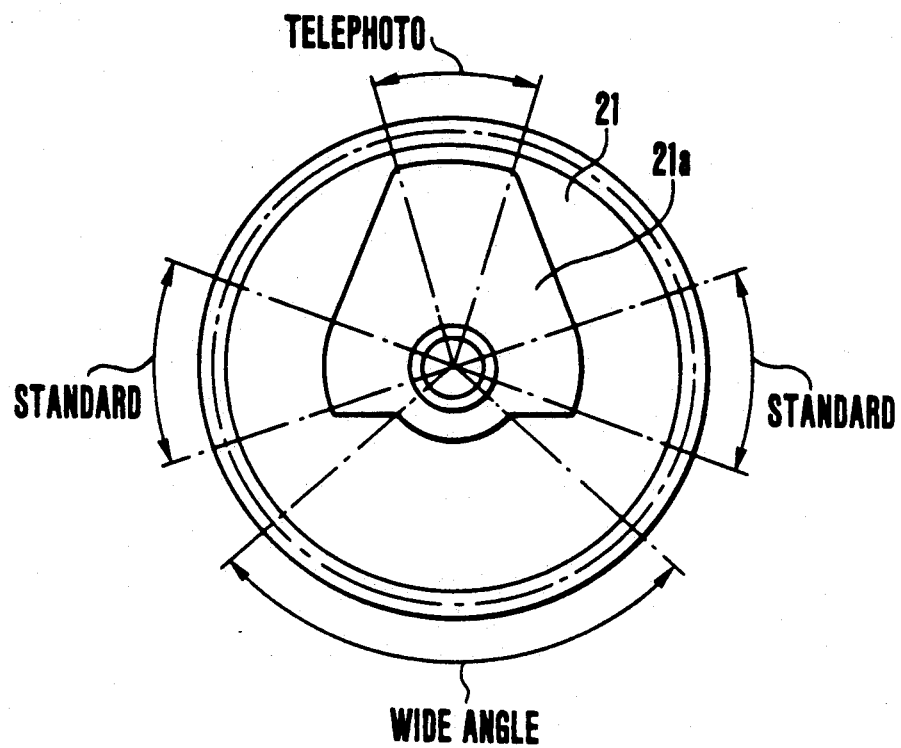
FIG. 38 is a view of a cam of the flash zoom mechanism.

A gear 18 is fixed coaxially to the gear 9, which is positioned within the top cover 1 and transmits drive to a mechanism inside of the case 2. Idlers 19 and 20 transmit the rotation of the gear 18 to a gear 21. The gear 21 has a cam 21a on one face (refer to FIGS. 35 and 40 as well as FIG. 41) and a contact piece 31 (refer to FIG. 35) fixed to the other face. As shown in FIG. 38, the cam 21a has four cam phases which are defined by a wide-angle portion, a telephoto portion and two standard portions, respectively.

Figure 35:
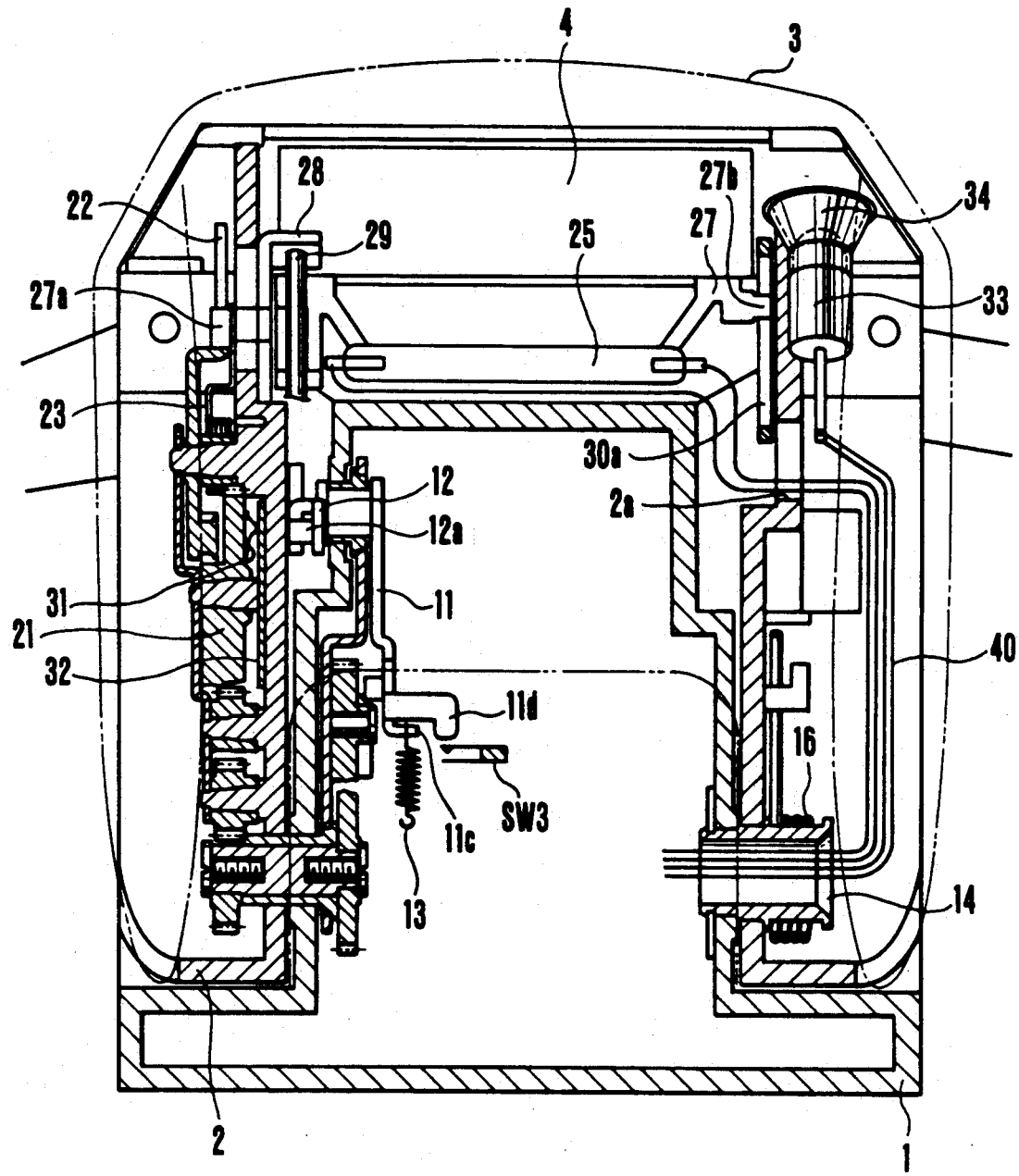
FIG. 35 is a cross-sectional, plan view of the flash mechanism.
Figure 39:
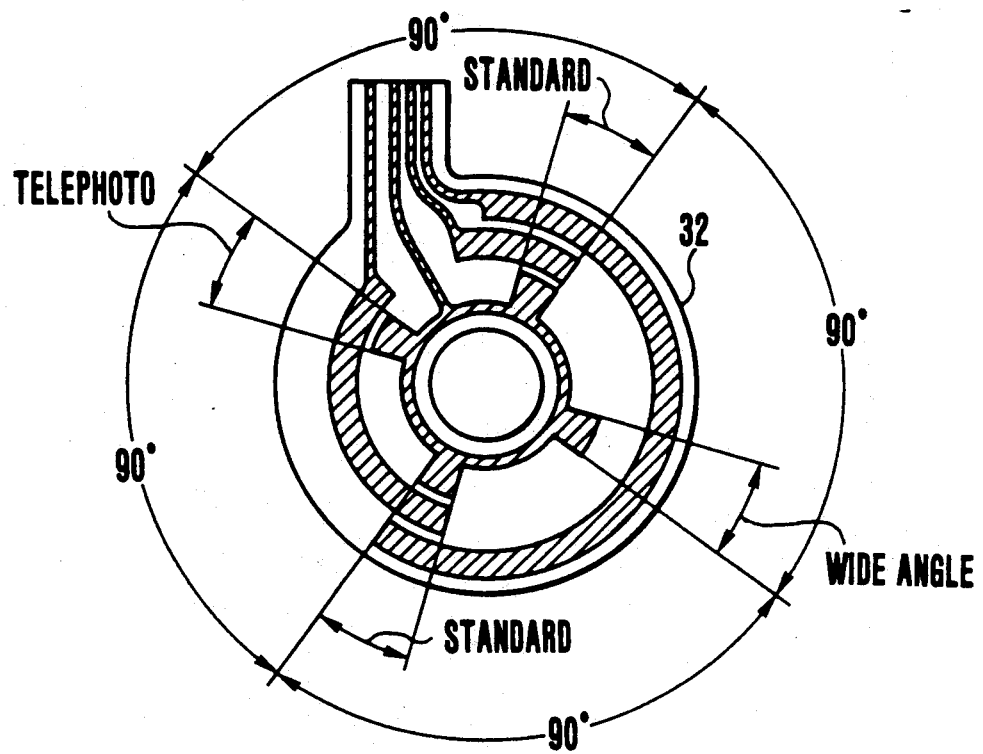
FIG. 39 is a view of a flash phase printed board.

The contact piece 31 is in slidable contact with a printed board 32 (refer to FIGS. 35 and 39). As shown in FIG. 39, the printed board 32 is provided with brakephase portions which are arranged at equally spaced intervals 90° apart so that they appear in the order of standard→telephoto→standard→wide angle→standard→. . . , as shown in FIG. 39. The turning phase of a transmission lever 22, having a roller 22a (refer to FIGS. 36 and 40) for detecting the phase of the cam 21a, is detected through the printed board 32 having such brake phases. The aforesaid gears 19 to 21 are supported for rotation about associated shafts on the case 2. The transmission lever 22 has a bearing which is rotatably fitted onto an associated shaft on the case 2, the roller 22a for tracing the motion of the cam 21a, and a pressure part 22b for pressing a holder 27. A spring 23 is fitted onto the outer circumference of the bearing of the transmission lever 22 with one end hooked on the case 2 and the other end, on the holder 27, which will be described later. A pressure plate 24 is fastened to the case 2 by screws that secure the gears 19 through 21 as well as the transmission lever 22 into position.

Figure 40:
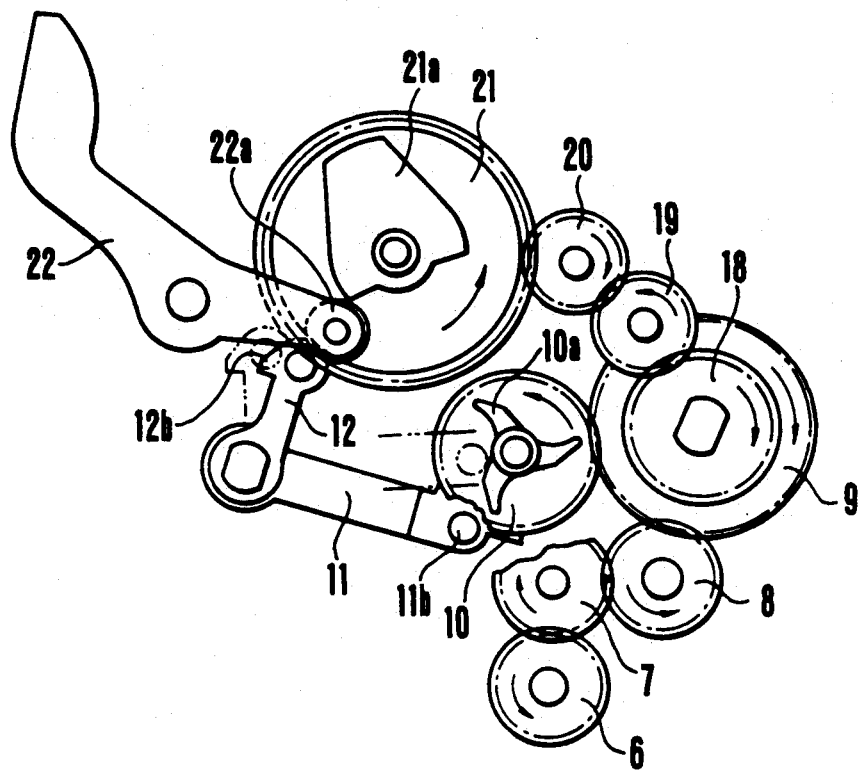
FIG. 40 is a view showing the start of braking when a standard illumination angle is selected.
Figure 41:
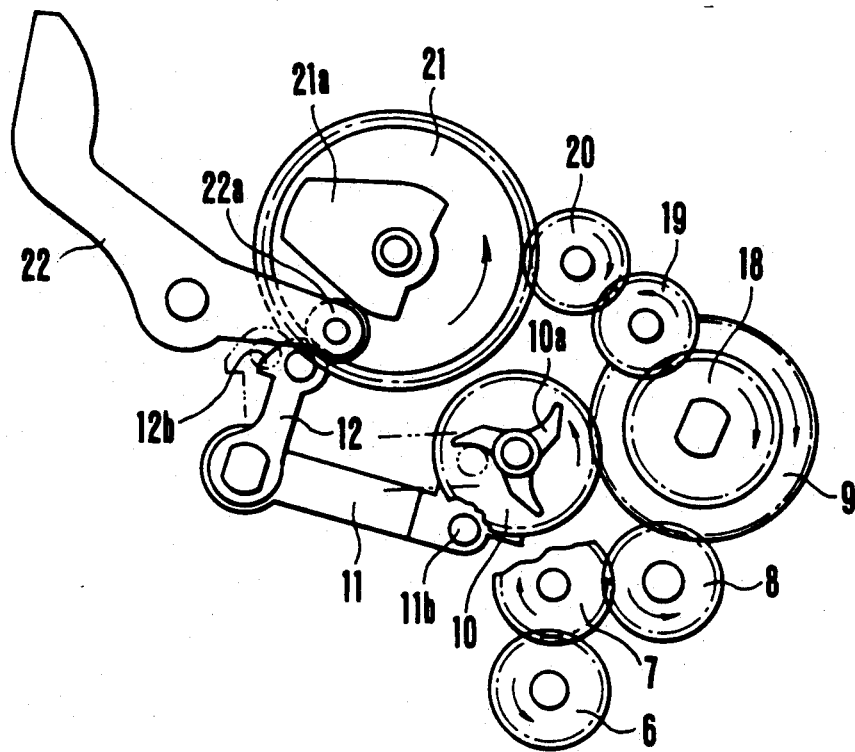
FIG. 41 is a view showing a stoppage after an overrun.

FIG. 40 shows the state in which each of the blade assembly 10a and the associated elements is placed at the start of a flash-zooming braking operation when a standard illumination angle is selected. FIG. 41 shows the state in which each of the blade assembly 10a and the associated elements is placed when the gear 10 stops after an overrun. The gear 21 having the cam 21a and the gear 10 having the blade assembly 10a are coupled to each other at a specific gear ratio through gear 9 and the gears 18 through 20. In the embodiment, the gear ratio is selected so that the gear 10 makes a ⅔ rotation for each ¼ rotation of the gear 21. Specifically, in accordance with the brake pattern formed on the printed board 32, each time the gear 21 rotates through 90° degrees (¼ rotation), the rotation of the gear 21 enters its brake phase and the blade assembly 10a of the gear 10 assumes the state shown in FIG. 40. Subsequently, the gear 10 overruns until the blade assembly 10a reaches its maximum allowable position as shown in FIG. 41. The gear ratio is, therefore, selected so that the overrun of the blade assembly 10a can be stopped between the state shown in FIG. 40 and the state shown in FIG. 41 whatever change may occur in operational conditions, which are determined by factors such as the motor M2, a power supply or temperature conditions. For example, if it is assumed that each brakephase portion formed as a brake pattern on the printed board 32 has an angular extent of 15°, the gear 10 stops after an overrun of about whichever of the standard, telephoto and wide-angle illumination angles is selected, the blade assembly 10a of the gear 10 can stop within a similar phase. As is apparent from the above description, even if the flash unit which is in a pop-up state is pressed down with any of the standard, telephoto and wide-angle illumination angles being selected, the projection 11b of the lever 11 does not interfere with the blade assembly 10a of the gear 10. Accordingly, the claw 12b of the retaining lever 12 is hooked on the hook 17a of the fixed engagement member 17 and the flash unit is secured in a retracted state.

In the above-described embodiment, the cam 21a of the gear 21 has four cam phases, the blade assembly 10a of the gear 10 has three blades, and the gear ratio is selected so that the gear 10 makes an 8/3 rotation for a rotation of the gear 21. However, the gear ratio may be ⅔, or the cam 21a of the gear 21 may have three cam phases, and the gear ratio of the gear 21 to the gear 10 may be selected to be an integral multiple of ⅓. For example, the cam phase of the gear 21 is made coincident with the rotational phase of the blade assembly 10a of the gear 10, and the number of stop positions of the gear 21 and the number of blades of the blade assembly 10a of the gear 10 as well as the gear ratio may be selected so that the blade assembly 10a of the gear 10 can assume a similar phase whichever of the stop positions the gear 21 may take.

Figure 34:
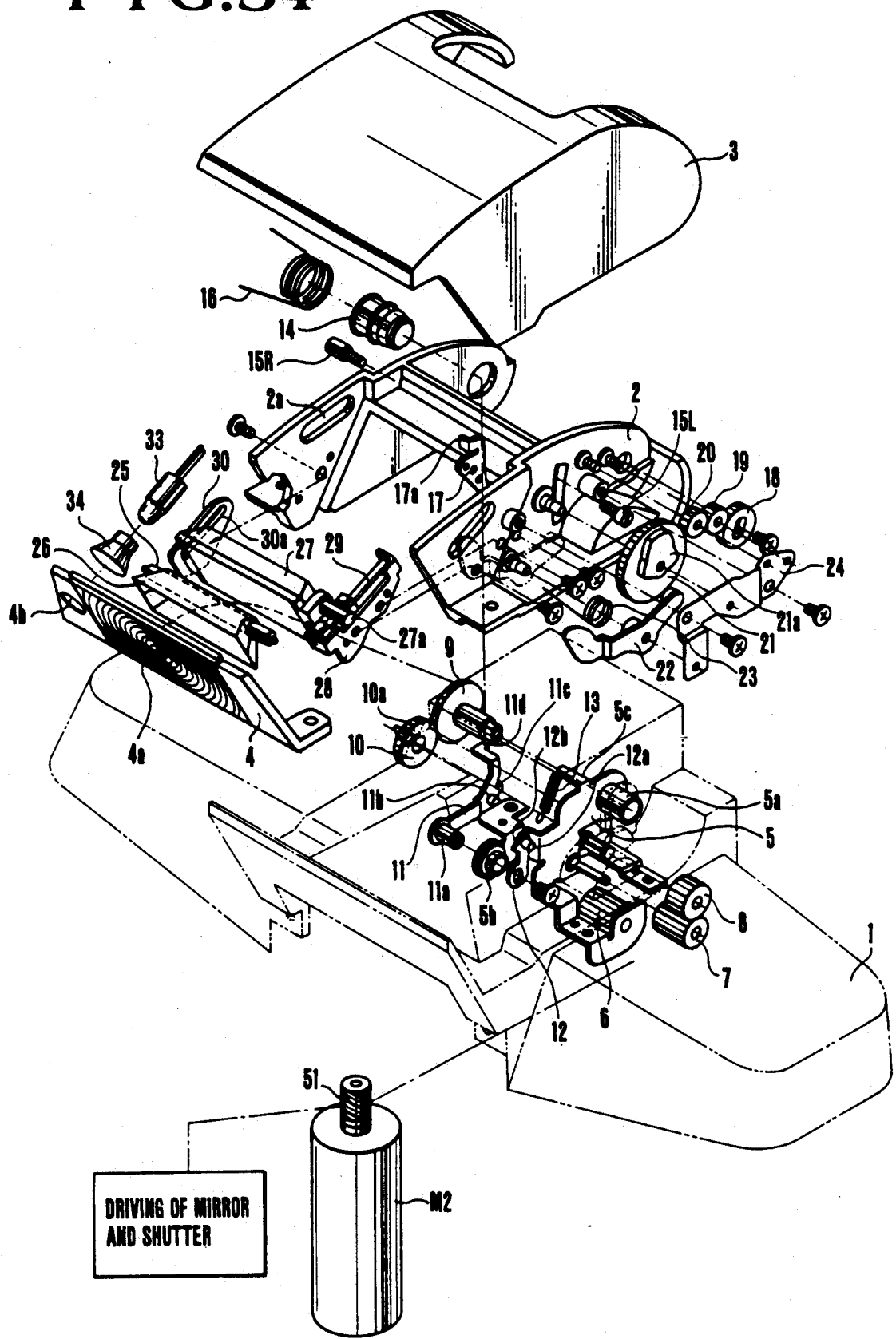
FIG. 34 is an exploded perspective view of a flash mechanism.

Referring to FIGS. 34 and 35, a xenon tube 25 is fixed to a reflector 26 by rubber which is not shown. The holder 27 holds the xenon tube 25 and the reflector 26. A holding member 28 is fixed in the inside of the case 2. A shaft 29 is held by the holding member 28 and is positioned to extend in a direction perpendicular to the plane of the panel 4. A rail member 30 has a rail-shaped slot 30a, which extends in parallel with the shaft 29, and is fixed in the inside of the case 2. As shown in FIG. 35, one end of the holder 27 is supported for sliding movement along the axis of the shaft 29, and the other end has a boss 27b, which is supported for sliding movement along the slot 30a in the rail member 30. One end of the spring 23 is hooked on a projection 27a of the holder 27, and the holder 27 is urged toward the panel 4 by the spring 23 and is also subjected to a restricting force acting in the opposite direction by the transmission lever 22.

More specifically, as shown in FIGS. 40 and 41, the transmission lever 22 is made to swing on the basis of the cam displacement of the cam 21a of the gear 21 to which the rotation of the motor M2 is transmitted. A pressure part 22b of the transmission lever 22 pushes the projection 27a of the holder 27 against the pull of the spring 23, thereby causing a flash part made up of the reflector 26 and the xenon tube 25, held by the holder 27, to move to and fro in opposite directions perpendicular to the plane of the panel 4.

Referring to FIGS. 34 and 35, a red-eye preventing lamp 33 and a reflector 34, for intensifying the light from the red-eye preventing lamp 33 by reflection, are fixed on the reverse side of the window portion 4b of the panel 4. As shown, the case 2 is divided into three sections, where the flash part made up of the members 25 through 27 is laid out in the middle section; a mechanism part including the elements 18 through 24 for driving the flash part, is in the left-hand side section; and a unit made up of the red-eye preventing lamp 33 and the reflector 34, is in the right-hand side section. A bundle of lead wires 40 extends through the bearing 14 into the right-hand side section of the case 2, and some of the lead wires 40 are connected to the lamp 33 with the others connected to the xenon tube 25 through the slot 2a.

A planetary clutch mechanism for transmission of the output of the motor M2 will be described below with reference to FIG. 36. The output of the motor M2 is transmitted to a sun gear 53 through an output gear 51 and a transmission gear 52. A planetary lever 54 is frictionally coupled to the central shaft of the planetary gear 53, and a planetary gear 55 is rotatably supported by the planetary lever 54. Thus, the sun gear 53, the planetary lever 54 and the planetary gear 55 constitute the planetary clutch mechanism.

Although a detailed illustration is omitted, a mirror driving gear 56 is provided. As the mirror driving gear 56 rotates in one direction, a main mirror 60 performs the motion of moving from the observation-enable position (down position) shown in FIG. 36 to an exposure-enable withdrawal position (up position) and then returning from the exposure-enable withdrawal position to the observation-enable position.

When the motor M2 is reversed, the sun gear 53 rotates in the counterclockwise direction to mesh the planetary gear 55 with the gear 6. When the motor M2 is forwarded, the planetary gear 55 meshes with the mirror driving gear 56.

The information setting dials 106 and 103 and associated structures as well as an information setting function will be described below with reference to FIGS. 33, 42(A) to 42(G) and 43(A) to 43(G).

As shown in FIG. 33, the dial 106 is arranged so that if a user turns the dial 106 and stops it when a desired one of the indications 106a through 106k is opposed to the fixed mark 107, the dial 106 is held at that position by a click force. The indication 106a indicates a manual exposure mode, and if the user sets the dial 106 to the manual exposure mode and turns the information setting dial 103, he or she can set a desired shutter speed. If the user is to set an aperture value, he or she turns the information setting dial 103 while depressing an aperture setting member (not shown). The indication 106b indicates a depth priority automatic exposure mode in which the camera determines an aperture value on the basis of AF information so as to control the depth of field and a shutter speed is determined so that a correct exposure can be obtained with respect to the aperture value. After the aperture value has been determined, if the user turns the information setting dial 103, he or she can cause the camera to execute a program shift according to an equivalent EV chart.

The indication 106c indicates an aperture priority automatic exposure mode. If the user turns the information setting dial 103 with the camera set to the aperture priority automatic exposure mode, he or she can set a desired aperture value. A shutter speed is determined so that a correct exposure can be obtained with respect to the set aperture value.

The indication 106d indicates a shutter priority automatic exposure mode. If the user turns the information setting dial 103 with the camera set to the shutter priority automatic exposure mode, he or she can set an arbitrary shutter speed. An aperture value is determined so that a correct exposure can be obtained with respect to the set shutter speed.

The indication 106e indicates a program exposure mode in which the camera determines a combination of an aperture value and a shutter speed. In the program exposure mode, a program shift is possible according to the operation of the information setting dial 103.

The indication 106f indicates a main-switch lock mode in which the camera is not operating.

The indication 106g indicates a full automatic mode in which not only is a combination of a shutter speed and an aperture value automatically determined but also a film transport mode is set to a single shooting mode while an AF mode is set to a one-shot AF mode. Even if the user touches any operating member other than the release button 104, the camera does not respond. The full automatic mode is suited to general beginners.

The indication 106h indicates a programmed portrait photography mode in which the aperture is set at a value close to a fully open aperture so that a subject such as a person is brought into sharp relief against a defocused background.

The indication 106i indicates a programmed landscape photography mode in which a limiter is utilized to inhibit the aperture from opening to an excessive extent beyond F5.6 so that the extent of depth of field increases compared to the programmed exposure mode indicated by the indication 106e.

The indication 106j indicates a programmed close-up photography mode in which the aperture value is fixed to F5.6 and if the shutter speed of the camera reaches its maximum shutter speed, the aperture value changes to a value larger than F5.6.

The indication 106k indicates a programmed sports photography mode in which a shutter speed is selected from a high-speed shutter range so that a fast moving subject can be photographed in a stationary state. In this programmed mode, the film transport mode is set to a continuous shooting mode while the AF mode is set to a servo AF mode.

FIGS. 42(A) to 42(G) and 43(A) to 43(G) are detailed explanatory views of the camera information display 102.

In FIGS. 42(A) to 42(G), a mark 301 is displayed when a red-eye preventing mode is set. A dot indication 302 indicates the amount of exposure compensation, and an exposure compensation scale 303 is displayed in the vicinity of the dot indication 302. An indication 304 indicates whether an electronic buzzer incorporated in the camera is on or off. If the indication 304 is displayed, the electronic buzzer generates sound when an in-focus state is reached during an AF operation or while a self-timer is in operation. An indication 305 represents a frame counter, an indication 306 indicates an aperture value, and an indication 307 indicates a shutter speed value. An indication 308 indicates the kind of AF mode, and the characters "ONE SHOT", which are shown in FIGS. 42(A) to 42(G) by way of example, indicate the selection of the one-shot AF mode in which when an in-focus state is reached, the AF system of the camera is locked. An indication 309 indicates the kind of film transport mode, and an indication representative of a single shooting mode is displayed in the shown example.

Figure 42A:
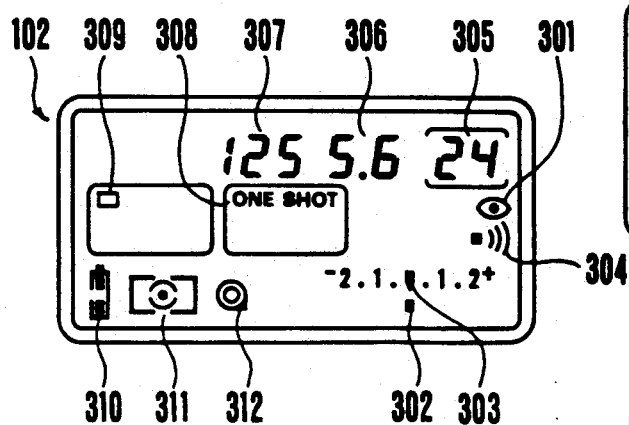
FIGS. 42(A) to 42(G) are views showing various pictures displayed on a camera information display.
Figure 42B:
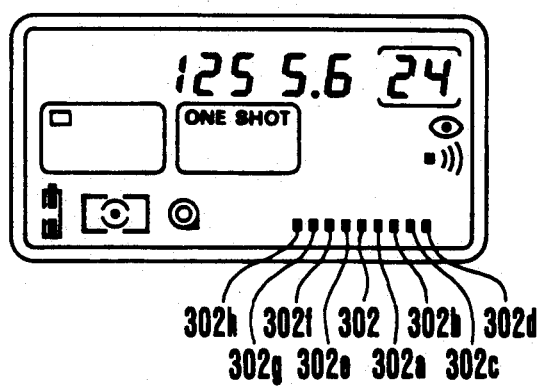
Figure 42C:
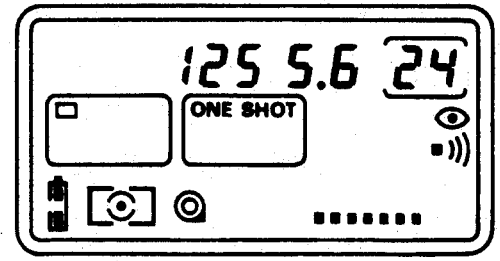
Figure 42D:
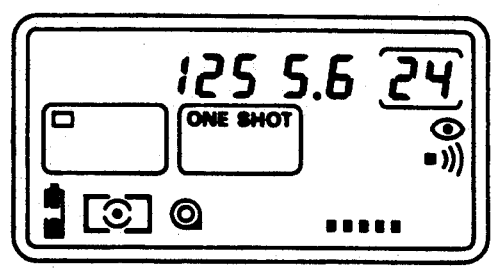
Figure 42E:
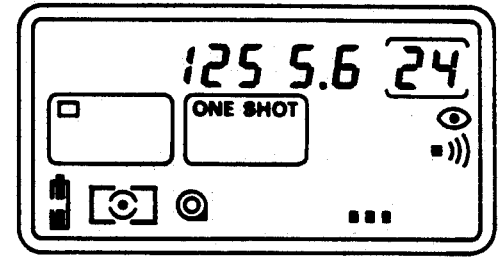
Figure 42F:
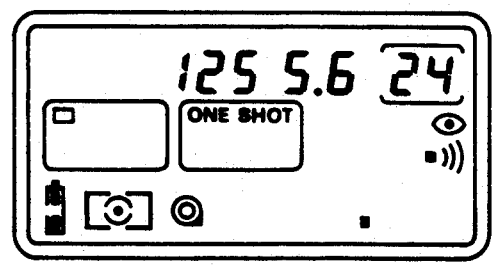
Figure 42G:
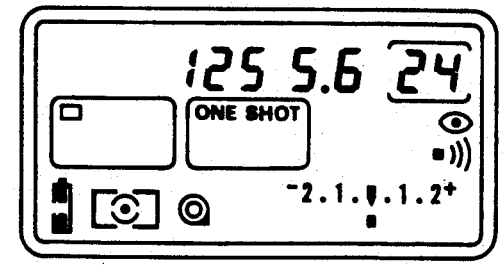

An indication 310 is a mark indicative of the capacity of a battery. An indication 311 is a mark indicative of a light measurement mode which is selected. An indication 312 is displayed when a film cartridge is loaded into the camera. In FIG. 42(B), the dot indication 302 indicative of the amount of exposure compensation, consists of nine dots 302 to 302h, which correspond to the exposure compensation scale 303. FIG. 42(B) shows the state of each indication which is displayed on the camera information display 102 immediately after the red-eye preventing lamp 33 starts to light up. The exposure compensation scale 303 disappears and the nine dots 302 to 302h are displayed. When a predetermined time passes, the camera information display 102 assumes the state of FIG. 42(C), and the dots 302h and 302d, positioned on the opposite ends, disappear. When another predetermined time passes, the camera information display 102 assumes the state of FIG. 42(D), and the dots 302g and 302c also disappear. When another predetermined time passes, the camera information display 102 assumes the state of FIG. 42(E), and the dots 302f and 302b also disappear. When another predetermined time passes, the camera information display 102 assumes the state of FIG. 42(F), and the dots 302e and 302a disappear leaving only the dot 302 positioned in the middle. When the time required to prevent red eyes passes, the camera information display 102 assumes the state of FIG. 42(G). The state of FIG. 42(G) is the same as that shown in FIG. 42(A), and represents that no exposure compensation is in operation. If exposure compensation is in operation, one of the dots 302a to 302h is selectively displayed in accordance with the amount of exposure compensation.

FIGS. 43(A) to 43(G) show indications provided in the viewfinder of the camera. An indication 401 is a mark which is displayed when the red-eye preventing mode is set, and is synchronized with the mark 301. A dot indication 402 indicates the amount of exposure compensation and is synchronized with the dot indication 302. Similarly, dots 402a to 402h are synchronized with the dots 302a to 302h, respectively. An exposure compensation scale 403 is displayed in the vicinity of the dot indication 402, and is synchronized with the exposure compensation scale 303. An indication 404 is a mark indicative of the completion of charging of the flash unit, and when the charging of the flash unit is completed, the mark 404 is displayed irrespective of whether the flash unit is a built-in flash unit or an external flash unit. An indication 405 indicates a shutter speed value and is synchronized with the indication 307. An indication 406 indicates an aperture value and is synchronized with the indication 306. An indication 407 is a mark which is displayed when a in-focus state is reached during an AF operation. FIGS. 43(A) to 43(G) respectively show the indications displayed in the viewfinder when the red-eye preventing lamp 33 is lit up, and the indications of FIGS. 43(A) to 43(G) are synchronized with those of FIGS. 42(A) to 42(G).

The arrangement and function of an electronic control system which constitutes the gist of the present invention will be described below with reference to FIGS. 1 through 31(A) and 31(B).

Figure 1:
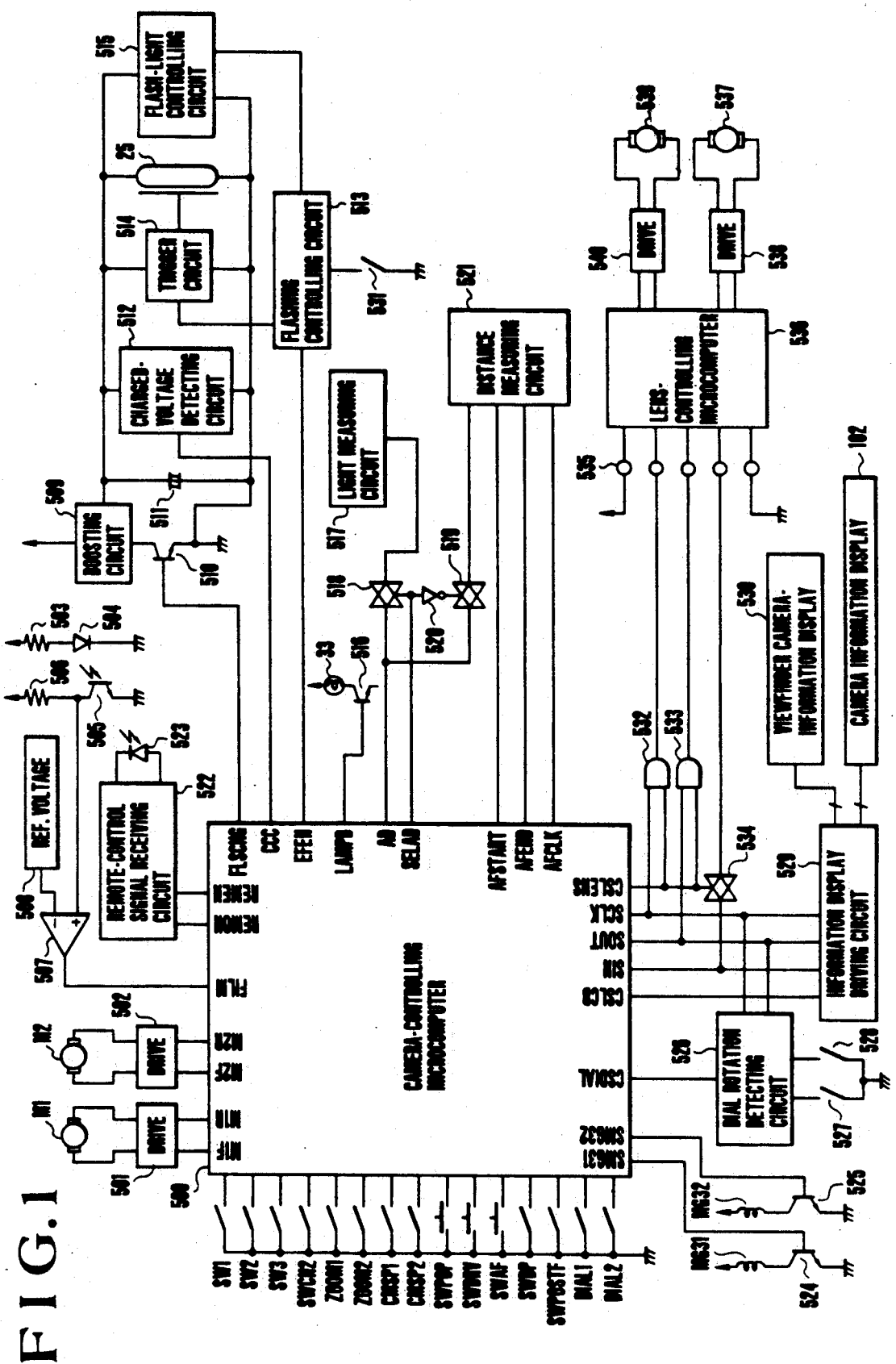
FIG. 1 is a circuit diagram of the electronic control system of a camera according to the present invention.

FIG. 1 is a diagram showing the electrical circuit construction of the camera. The arrangement shown in FIG. 1 includes a microcomputer 500 for controlling the camera, a motor M1 for producing motion for film winding during a forward run, a circuit 501 for driving the motor M1, a motor M2 which is forwarded to produce motion for moving up the main mirror of the camera and causing shutter charging and which is reversed to produce motion for popping up the flash unit and/or causing flash zooming, and a circuit 502 for driving the motor M2. Signals M1F and M1R serve to drive the motor M1, while signals M2F and M2R serve to drive the motor M2.

The arrangement of FIG. 1 also includes resistors 503 and 506, a light-emitting diode (LED) 504, a phototransistor 505 for receiving light emitted from the LED 504 through a film perforation (not shown) to detect the state of film, a comparator 507, a comparative reference voltage source 508, elements 509 to 515 which constitute a flash circuit. The flash circuit includes a boosting circuit 509, a transistor 510 arranged to start a boosting operation when a signal FLSCHG goes to its high level, a main capacitor 511 for causing the flash unit to flash, a charged-voltage detecting circuit 512 for detecting the voltage of the main capacitor 511 and outputting "1" as a signal CCC if the voltage at which the flash unit can flash is detected, a trigger circuit 514 for generating a trigger signal for causing the flash unit to flash, a flash-light controlling circuit 515 for controlling the amount of flash light, and a flashing controlling circuit 513 for causing the trigger circuit 514 to output the trigger signal, on the basis of AND processing of a signal EFEN and an ON signal from an X-sync contact 531, and for causing the flash-light controlling circuit 515 to output a signal to stop the flashing of the flash unit.

The arrangement of FIG. 1 also includes a transistor 516 for lighting up the red-eye preventing lamp 33, a light measuring circuit 517 for measuring the luminance of a subject, analog switches 518 and 519, and an inverter 520.

A circuit 521 is a distance measuring circuit such as a CCD for storing image information indicative of a subject. When a signal AFSTART goes to its high level, the distance measuring circuit 521 starts to store an image. When the storage of the image is completed, the distance measuring circuit 521 outputs "1" as a signal AFEND to inform the microcomputer 500 of the completion of the storage.

The arrangement of FIG. 1 also includes a remote-control signal receiving photodiode 523 and a remote-control signal receiving circuit 522. When a signal REMEN s at its high level, the remote-control signal receiving circuit 522 is set to a remote-control enable state, and when a release signal transmitted from a remote control circuit (not shown) by a photographer is received, the remote-control signal receiving circuit 522 sets a signal REMON to its high level. Transistors 524 and 525 serve to energize shutter electromagnets MG31 and MG32, respectively. A dial rotation detecting circuit 526 detects and memorizes the amount and direction of rotation of a set-value input dial, and transmits a signal indicative of the amount of rotation of the set-value input dial by serial communication in accordance with a signal CSDIAL from the microcomputer 500. Signal contacts 527 and 528 are turned on or off with the rotation of the set-value input dial to inform the dial rotation detecting circuit 526 of the amount and direction of rotation of the set-value input dial.

The shown arrangement also includes the camera information display 102, a viewfinder camera-information display 530, and an information display driving circuit 529 for controlling the driving of the information display 102 and that of the viewfinder camera-information display 530.

The X-sync contact 531 is turned on when the running of a shutter leading curtain is completed.

AND gates 532 and 533 and an analog switch 534 are arranged to connect the corresponding serial communication paths to a lens when a signal CSLENS is at its high level. Five contacts 535 are used to transmit signals or electrical power between the lens and the camera.

An element 536 is a lens-controlling microcomputer.

A diaphragm driving motor is indicated by reference numeral 537, a driving circuit for driving the motor 537 is indicated by reference numeral 538, a distance-ring driving motor is indicated by reference numeral 539, and a driving circuit for driving the motor 539 is indicated by reference numeral 540.

When the release button 104 is pressed down to a first stroke position, a switch SW1 is turned on. When the release button 104 is pressed down to a second stroke position, a switch SW2 is turned on.

A switch SW3 is a switch for detecting whether the flash unit is popped up. The off state of the switch SW3 indicates that the flash unit is popped up, while the ON state of the switch SW3 indicates that the flash unit is popped down. A switch SWCN2 is turned on when the running of the trailing curtain of the shutter is completed. Signals ZOOM1 and ZOOM2 are the zoom phase signals shown in FIG. 39, and switches CMSP1 and CMSP2 are arranged to produce shutter-charging and mirror-up phase signals.

A switch SWPOP is turned on when a flash pop-up button is pressed down. A switch SWDRV is turned on when a film-transport-mode selecting button is pressed down. A switch SWAF is turned on when an AF mode selecting button is pressed down. A switch SWBP serves to detect whether a back lid is open or closed. The output "1" of the switch SWBP indicates the closed state of the back lid, while the output "0" of the switch SWBP indicates the open state of the back lid.

A switch SWPOSTF is a switch for selecting either a leading-curtain sync flash mode in which flashing is performed immediately after the completion of running of the shutter leading curtain or a trailing-curtain sync flash mode in which flashing is performed immediately before the start of running of the shutter trailing curtain. Examples of shutters having leading and trailing members can be found in the specifications of U.S. Pat. Nos. 4,977,421 and 4,963,908, which are incorporated herein by reference. In the case of "1", the switch SWPOSTF selects the leading-curtain sync flash mode, and in the case of "0", the switch SWPOSTF selects the trailing-curtain sync flash mode.

Switches DIAL1 and DIAL2 are interlocked with an exposure control mode dial.

Figure 2:
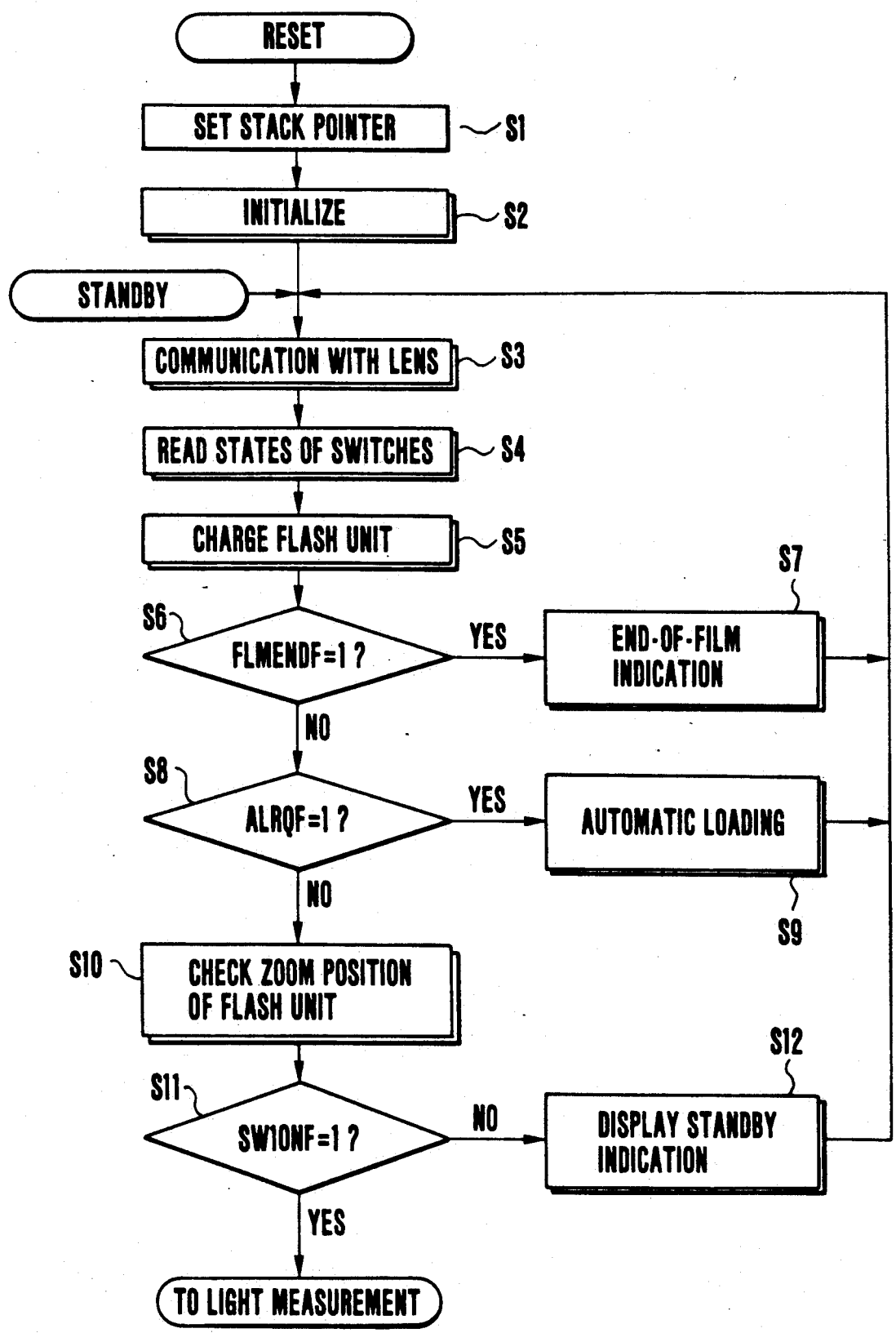
FIG. 2 is a flowchart of the control operation of the electronic control system.

When electrical power is supplied from a power source circuit (not shown), the microcomputer 500 initiates a control operation which starts from the terminal symbol "RESET" shown in FIG. 2. It is assumed here that the camera has no film or that film winding is completed and that none of the switches are on.

Step S1: A stack pointer is set.

Figure 3:
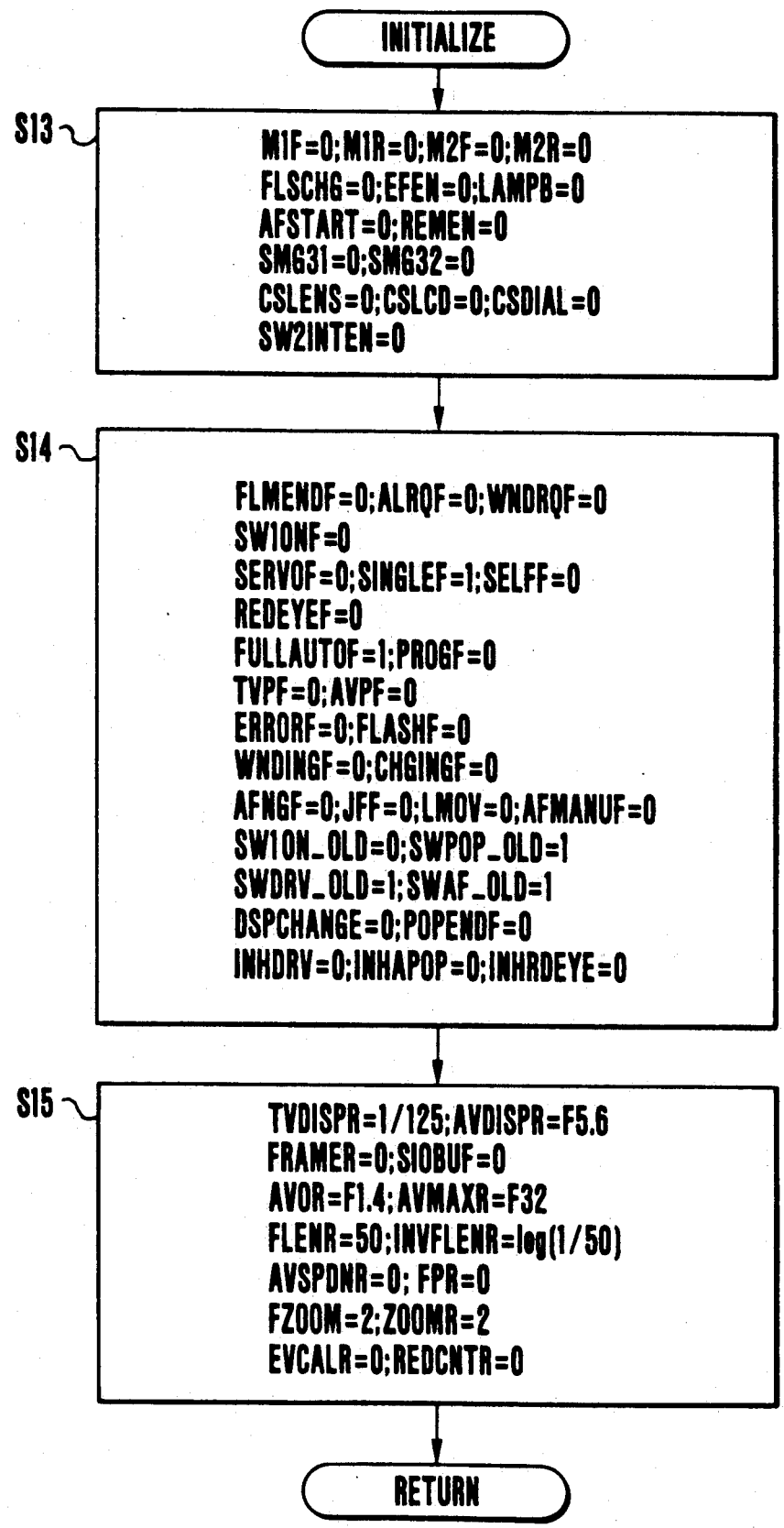
FIG. 3 is a flowchart of the subroutine "Initialize".
Figure 4C:
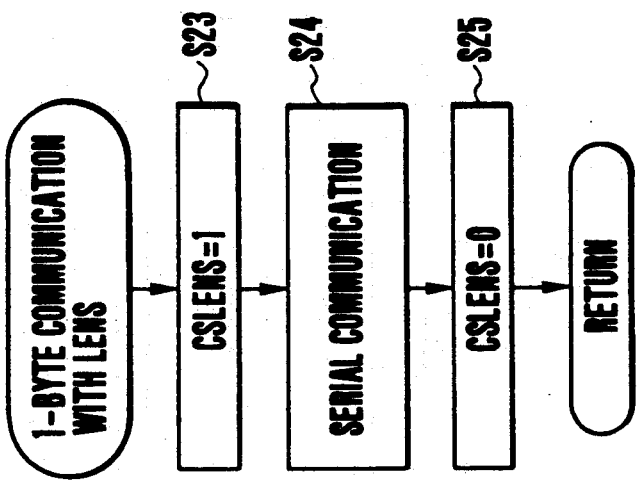
FIGS. 4(A) to 4(E) are flowcharts of the subroutines for "Communication with lens".
Figure 4B:
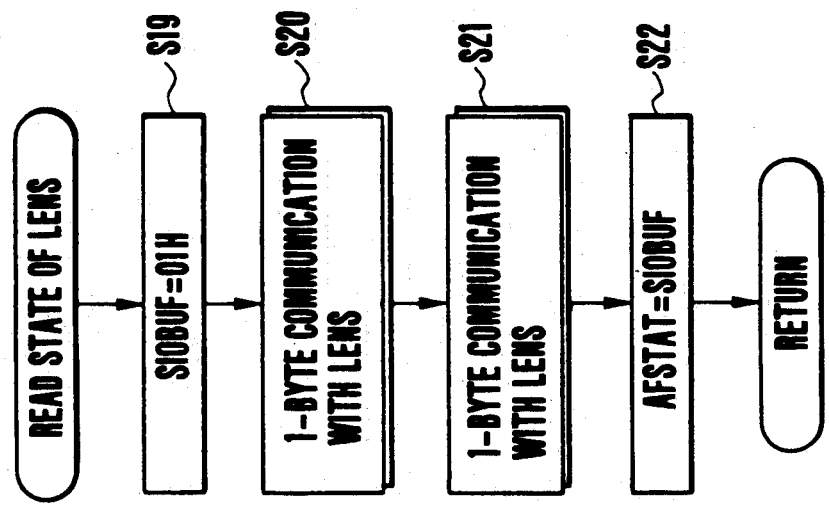
Figure 4A:
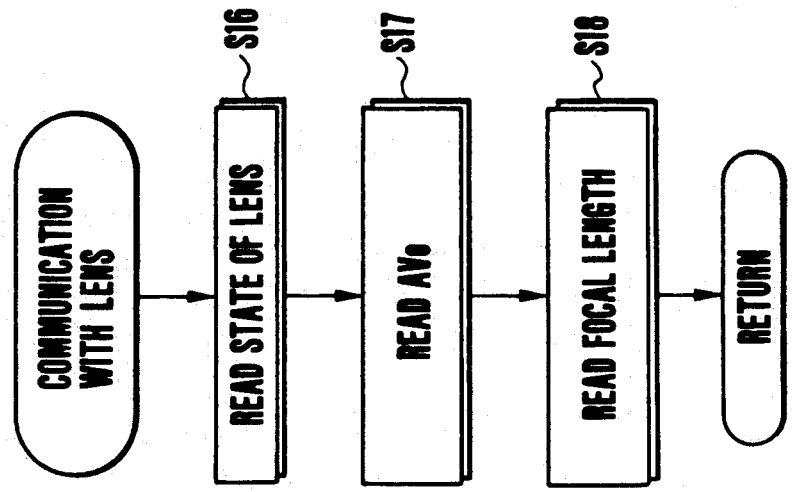
Figure 4D:
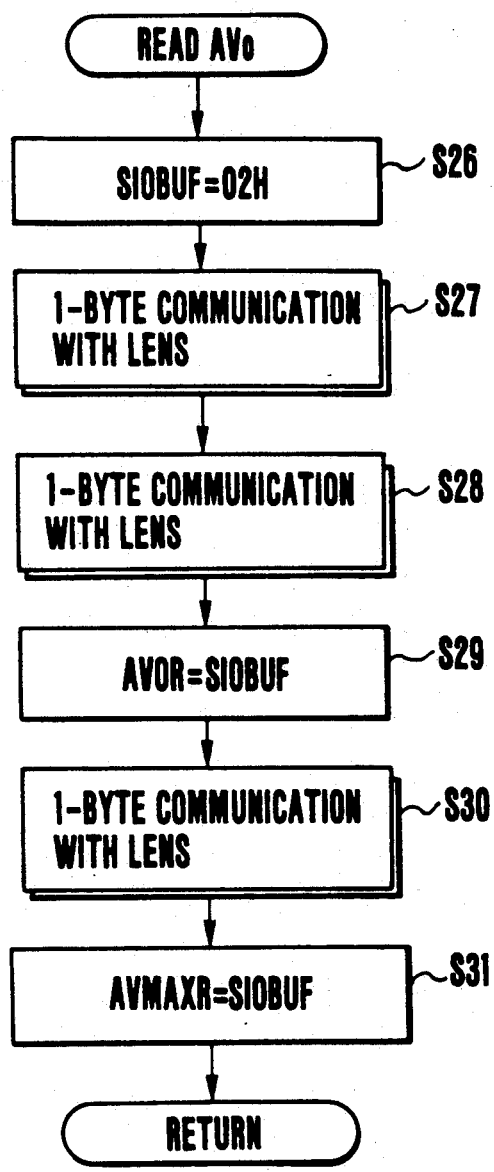
Figure 4E:
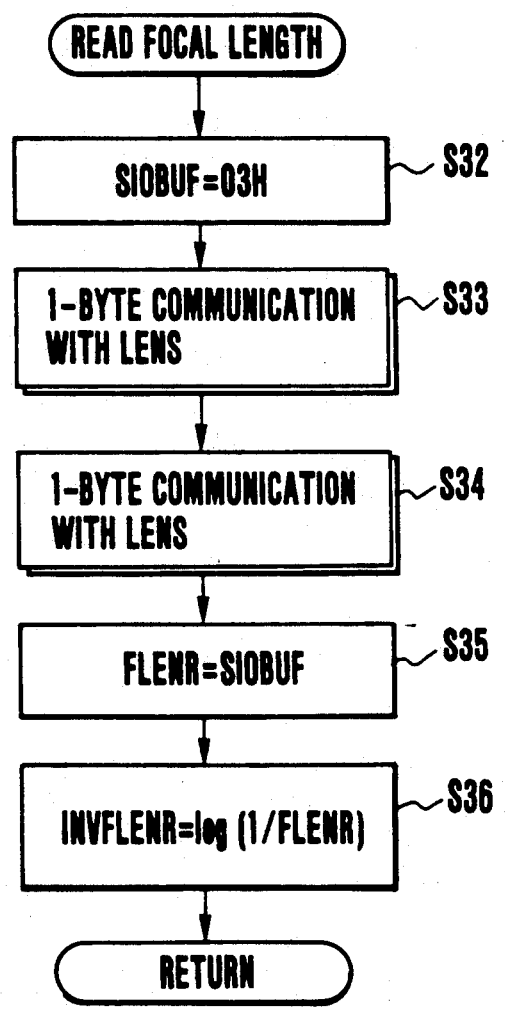
Figure 5B:
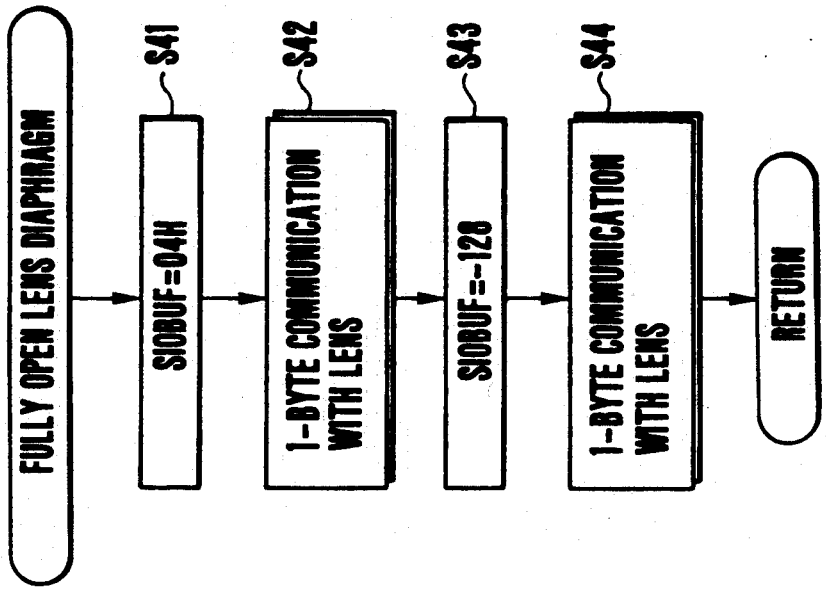
FIGS. 5(A) to 5(D) are flowcharts of the subroutines for "Lens driving".
Figure 5A:
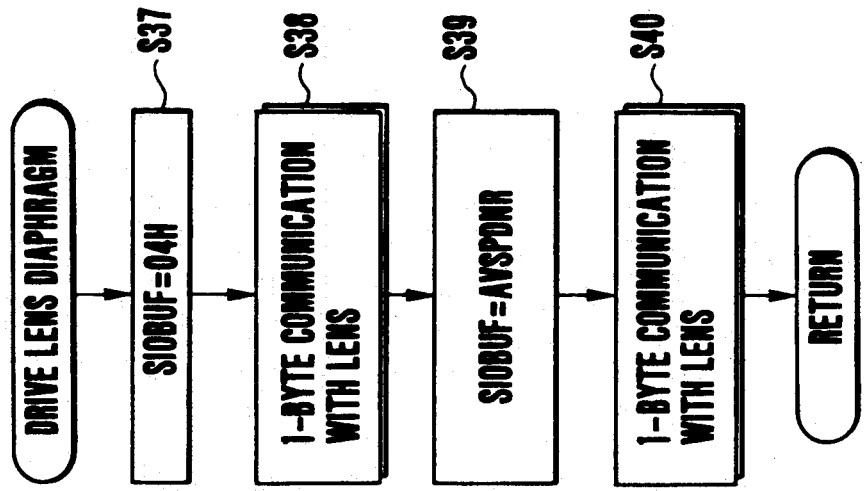
Figure 5D:
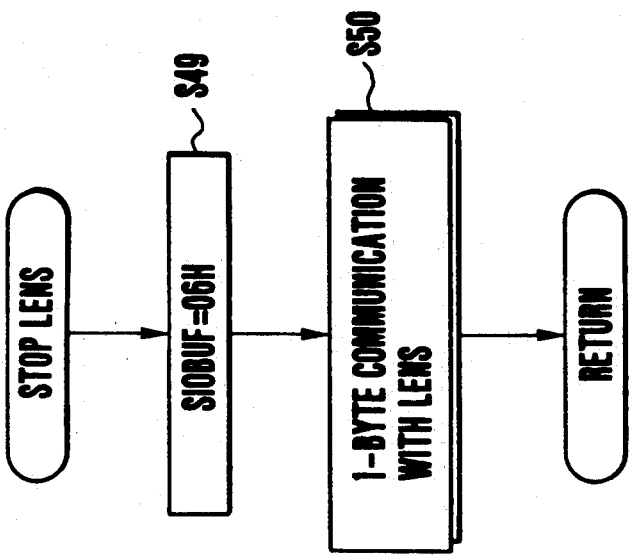
Figure 5C:
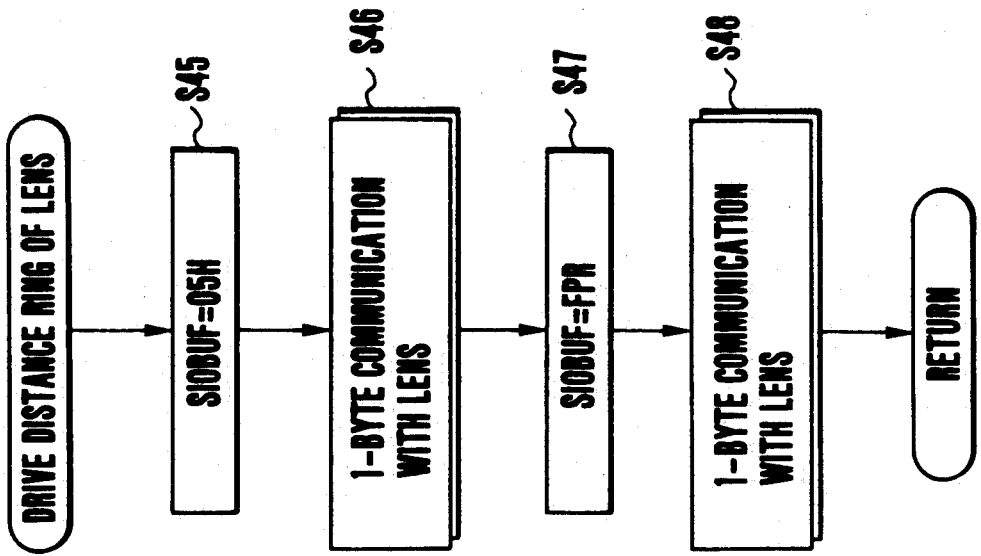

Step S2: Peripheral circuits, registers and flags are initialized. FIG. 3 is a detailed flowchart showing the subroutine "INITIALIZE".

Step S13: Each port of the microcomputer 500 is initialized. When all of the motor-driving signals M1F, M1R, M2F and M2R are set to "0", the terminals of the respective motors M1 and M2 are opened and the motors M1 and M2 are placed in their non-driven states.

The boosting start signal FLSCHG is set to "0" to stop the boosting circuit 509. The flashing control signal EFEN is set to "0" to inhibit flashing.

The red-eye-preventing-lamp light-up signal LAMPB is set to "0" to put off the red-eye preventing lamp 33.

The storage start signal AFSTART is cleared. The reception-of-remote-control-signal enable signal REMEN is cleared to inhibit reception of a remote control signal.

Signals SMG31 and SMG32 are control signals for the respective shutter-operating electromagnets MG31 and MG32. In this example, the signals SMG31 and SMG32 are cleared to "0" to stop the energization of the respective shutter-operating electromagnets MG31 and MG32.

The serial communication select signals CSLENS and CSDIAL as well as a serial communication select signal CSLCD are all cleared.

A signal SW2INTEN is a control signal for an interrupt generated at the falling edge of a signal outputted from the switch SW2. When the signal SW2INTEN is at a "1" level, the interrupt is enabled, while in the case of a "0" level, the interrupt is inhibited. In this example, the interrupt is inhibited.

In the above-described manner, each port of the microcomputer 500 is set to a ready state.

Step S14: Each flag in the microcomputer 500 is initialized. An end-of-film flag FLMENDF indicating that the film has been exposed up to the last frame is cleared. An automatic-loading request flag ALRQF indicating that automatic loading is requested is cleared. A film-winding request flag WNDRQF indicating that film winding is requested is cleared. A flag SW1ONF is cleared which indicates that light measurement is required, for example, when the release button is pressed down to the first stroke position or when a remote-control signal is received. A flag SERVOF, indicative of the state of the AF mode, is cleared. If the value of the flag SERVOF is "0", one-shot AF is performed, while if it is "1", servo AF is performed. In this example, one-shot AF is set. Flags SINGLEF and SELFF, which memorize the selection of the film transport mode (the single shooting mode, the continuous shooting mode or the self-timer mode), are set. If SINGLEF="1", the single shooting mode is selected; if SELFF="1", the self-timer mode is selected; or if both SINGLEF and SELFF indicate "0", the continuous shooting mode is selected. In this example, the single shooting mode is set. A red-eye-preventing mode flag REDEYEF, indicating that the red-eye preventing mode is set, is cleared. If the value of the red-eye-preventing mode flag REDEYEF is "1", the red-eye preventing lamp 33 is lit up before photography in order to prevent red eyes. In this example, a normal flash operation is set. A full-automatic mode flag FULLAUTOF is set which indicates that a full automatic mode is selected, and a program-mode flag PROGF, indicating that the program mode is set, a shutter-priority-mode flag TVPF, indicating that the shutter priority mode is set, and an aperture-priority-mode flag AVPF, indicating that the aperture priority mode is set, are all cleared. A film-winding flag WNDINGF indicating that film winding is being performed and a shutter-charging flag CHGINGF, indicating that shutter charging is being performed, are all cleared.

An autofocus-impossible flag AFNGF, indicating that autofocus is impossible, an in-focus flag JFF, indicating that the AF system is in focus, a distance-ring drive flag LMOV, indicating that a distance ring of the lens is being driven, and a flag AFMANUF, indicating that the focusing of the lens is set to manual focusing, are all cleared.

A flag SW1ON_OLD, for memorizing the state of the light measurement flag SW1ONF, is cleared. A flag SWPOP_OLD, for memorizing the state of the flash pop-up switch SWPOP, is set. A flag SWDRV_OLD, for memorizing the state of the film-transport-mode setting switch SWDRV, is set. A flag SWAF_OLD, for memorizing the state of the AF mode setting switch SWAF, is set.

An inhibit-release-after-single-shooting flag INHDRV, an inhibit-release-before-automatic-flashing-decision flag INHAPOP, which indicates that shutter release is inhibited before a decision as to automatic flashing is made, and an inhibit-release-during-red-eye-prevention flag INHRDEYE indicating that the shutter release is inhibited during a red-eye preventing operation, are all cleared.

Step 15: Each register in the microcomputer 500 is initialized. Data indicative of 1/125 second is set in a shutter-speed storing register TVDISPR, and data indicative of F5.6 is set in an aperture storing register AVDISPR. A frame counter FRAMER is cleared. A serial communication buffer SIOBUF is cleared.

Data indicative of F1.4 is set in a fully open aperture value register AVOR, and data indicative of F32 is set in a maximum aperture value register AVMAXR. Data indicative of 50 mm is set in a focal-length register FLENR, and data indicative of a logarithmic compression value of 1/50 is set in an inverse focal-length register INVFLENR. An aperture stopped-down difference register AVSPDNR and an AF distance-ring driving amount register FPR are cleared. The value "2" is stored in a register FZOOM as well as a position register ZOOMR, and is obtained by converting a focal length into a zoom position. A subject luminance register EVCALR and a red-eye prevention counter REDCNTR are cleared.

In the above-described manner, the camera is initialized.

Step S3: The camera communicates with the lens and fetches the required data on the lens.

Step S4: The camera reads and interprets the state of each of the switches and the dials.

Step S5: If the flash unit has not yet completely been charged, the charging is continued.

Step S6: If the film has been exposed up to the last frame, an end-of-film indication is displayed in Step S7.

Step S8: If the automatic-loading request flag ALRQF is set up, automatic loading is performed in Step S9.

Step S10: It is checked whether the zoom position of the flash unit corresponds to the focal length of the lens. If no correspondence is obtained, flash zooming is executed.

Step S11: If the switch SW1 is on, the process proceeds to the subroutine "LIGHT MEASUREMENT". If the switch SW11 is not on, a photography standby indication is displayed in Step S12 and the process returns to Step S3. Subsequently, the operation of Steps S3 to S12 is repeated to wait for the next operation.

The communication with the lens performed in Step S3 will be described below in detail.

FIGS. 4(A) to 4(E) are detailed flowcharts showing the subroutine "COMMUNICATION WITH LENS".

In Steps S16, S17 and S18, information on the state of the lens, information on the open F number of the lens and information on the focal length of the lens are read, respectively.

Steps S19 to S22 constitute the subroutine "READ STATE OF LENS".

Step S19: 01H is read into the serial communication buffer SIOBUF.

Step S20: 1-byte serial communication with the lens is performed.

Steps S23 to S25 constitute the subroutine "1-BYTE COMMUNICATION WITH LENS".

Step S23: "1" is outputted to the lens communication select signal CSLENS, and the serial communication paths of the lens controlling microcomputer 536 are connected to those of the camera controlling microcomputer 500.

Step S24: The value of the serial communication buffer SIOBUF is outputted from a serial communication circuit (not shown) of the microcomputer 500. Simultaneously, data from the lens is written into the serial communication buffer SIOBUF.

Step S25: If the communication is completed, "0" is outputted as the lens communication select signal CSLENS and the serial communication paths are disconnected from the lens controlling microcomputer 536.

In the above-described manner, a command of "01" is transmitted to the lens. The lens receives the command of "01" and determines that the state of the lens needs to be read out. The lens sets up the flag AFMANUF indicating whether the lens is in the state of automatic focusing or manual focusing, in bit 7 of a code to be transmitted by serial communication, and the distance-ring drive flag LMOV is set up, in bit 6 of the code to be transmitted by the serial communication.

Step S21: The bits of the respective flags AFMANUF and LMOV set by the lens are read out.

Step S22: The read-out values are stored in an AF state register AFSTAT.

Steps S26 to S31: Similarly, in the subroutine "READ AVo", a command of "02" is transmitted to the lens. Data indicative of the fully open aperture value and data indicative of the maximum aperture value are stored in the registers AVOR and AVMAXR, respectively.

Steps S32 to S35: In the subroutine "READ FOCAL LENGTH", a command of "03" is transmitted to the lens, and data indicative of the focal length is stored in the register FLENR.

Step S36: The logarithmic value of 1/(focal length) is obtained and stored in the register INVFLENR. For example, in the case of a 100-mm lens, data indicative of an APEX value of 1/100 second is stored in the register INVFLENR.

Subroutines associated with lens driving will be described below with reference to FIGS. 5(A) to 5(D).

Steps S37 to S40 constitute the subroutine "DRIVE LENS DIAPHRAGM".

A command of "04" is transmitted to the lens, and data indicative of the amount of aperture stored in the aperture stopped-down difference register AVSPDNR is transmitted in the next communication. The amount of aperture is represented by 8-bit data with a sign (1 bit corresponds to a ⅛ step). If the sign is positive, the diaphragm is driven in the direction in which the aperture is closed, while if the sign is negative, the diaphragm is driven in the direction in which the aperture is fully opened.

Steps S41 to S44 constitute the subroutine "FULLY OPEN LENS DIAPHRAGM".

This subroutine is substantially the same as the subroutine "DRIVE LENS DIAPHRAGM" except that data to be transmitted is "−128" and the aperture of the diaphragm is opened by a maximum number of steps. If the lens does not have 128 aperture steps or more, the lens is necessarily fully opened.

Steps S45 to S48 constitute the subroutine "DRIVE DISTANCE RING OF LENS".

A command of "05" is transmitted to the lens, and the distance ring is driven by the number of comb teeth indicated by data stored in the register FPR.

Steps S49 and S50 constitute the subroutine "STOP LENS".

A command of "06" is transmitted to the lens, and the driving of the distance ring is stopped immediately.

The subroutine "COMMUNICATION WITH LENS" of Step S3 is as described above.

The following is a description of the subroutine "READ STATES OF SWITCHES" of Step S4.

Figure 6:
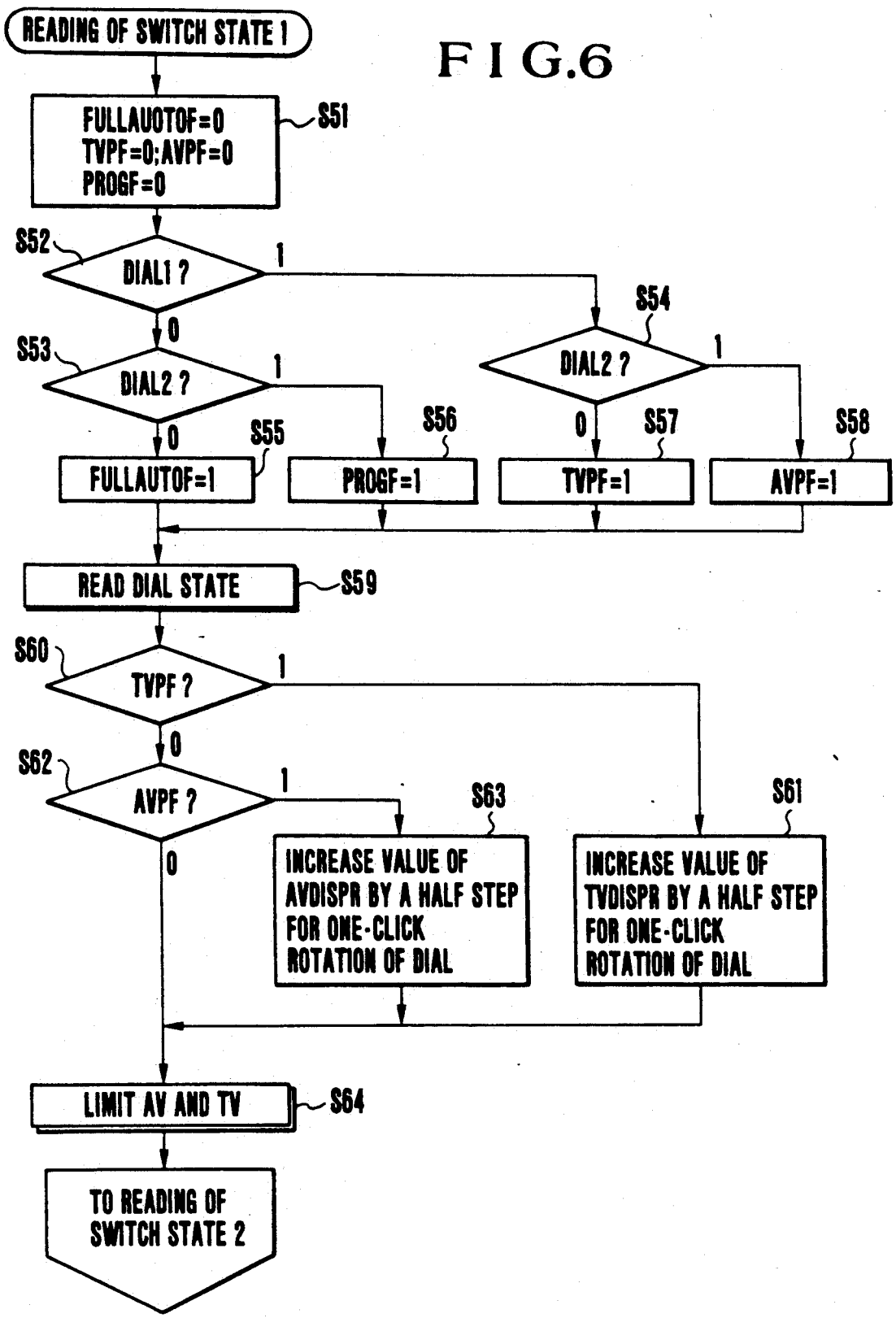
FIG. 6 is a flowchart of the subroutine "Read states of switches".
Figure 7:
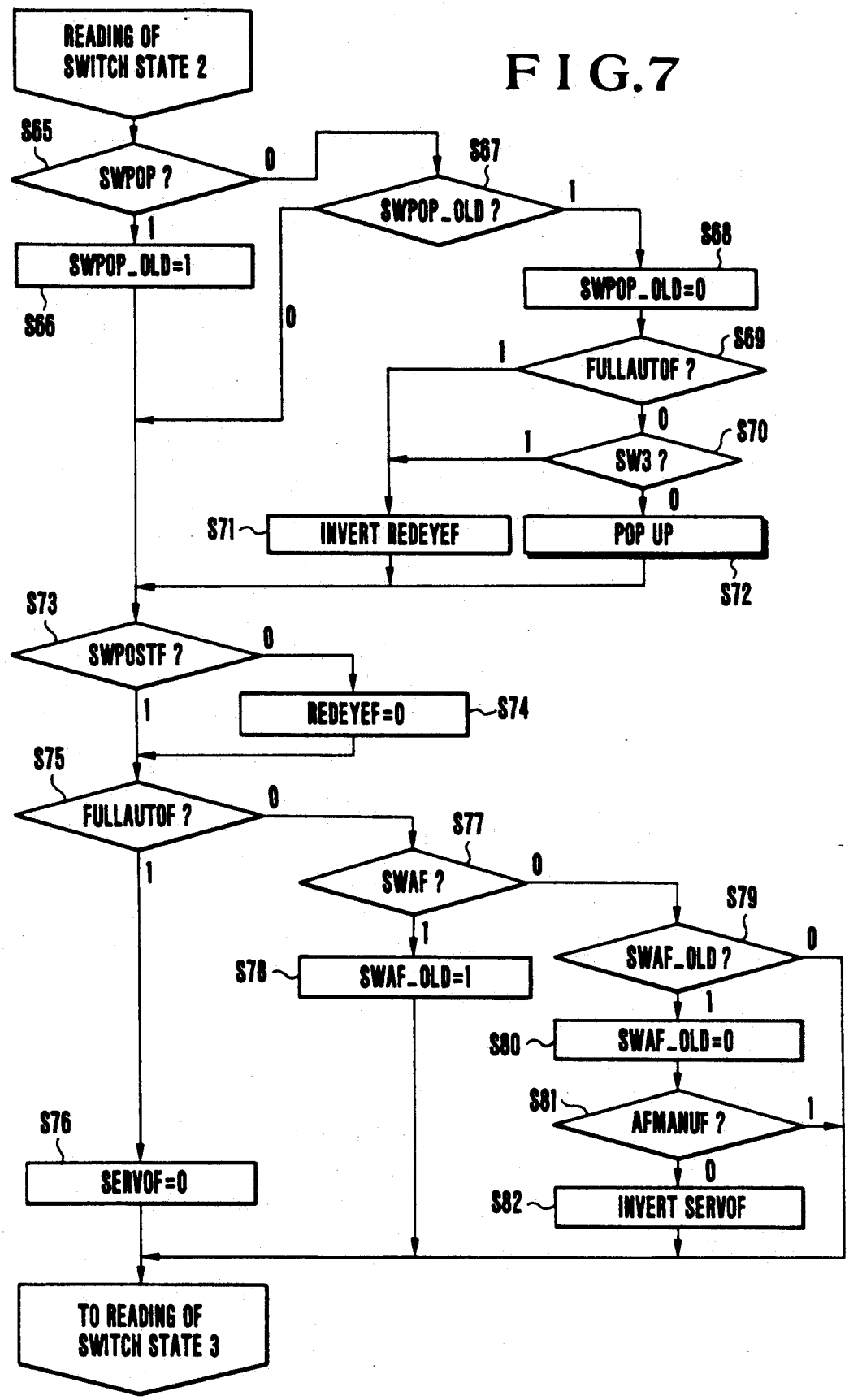
FIG. 7 is a flowchart of the subroutine "Read states of switches".
Figure 8:
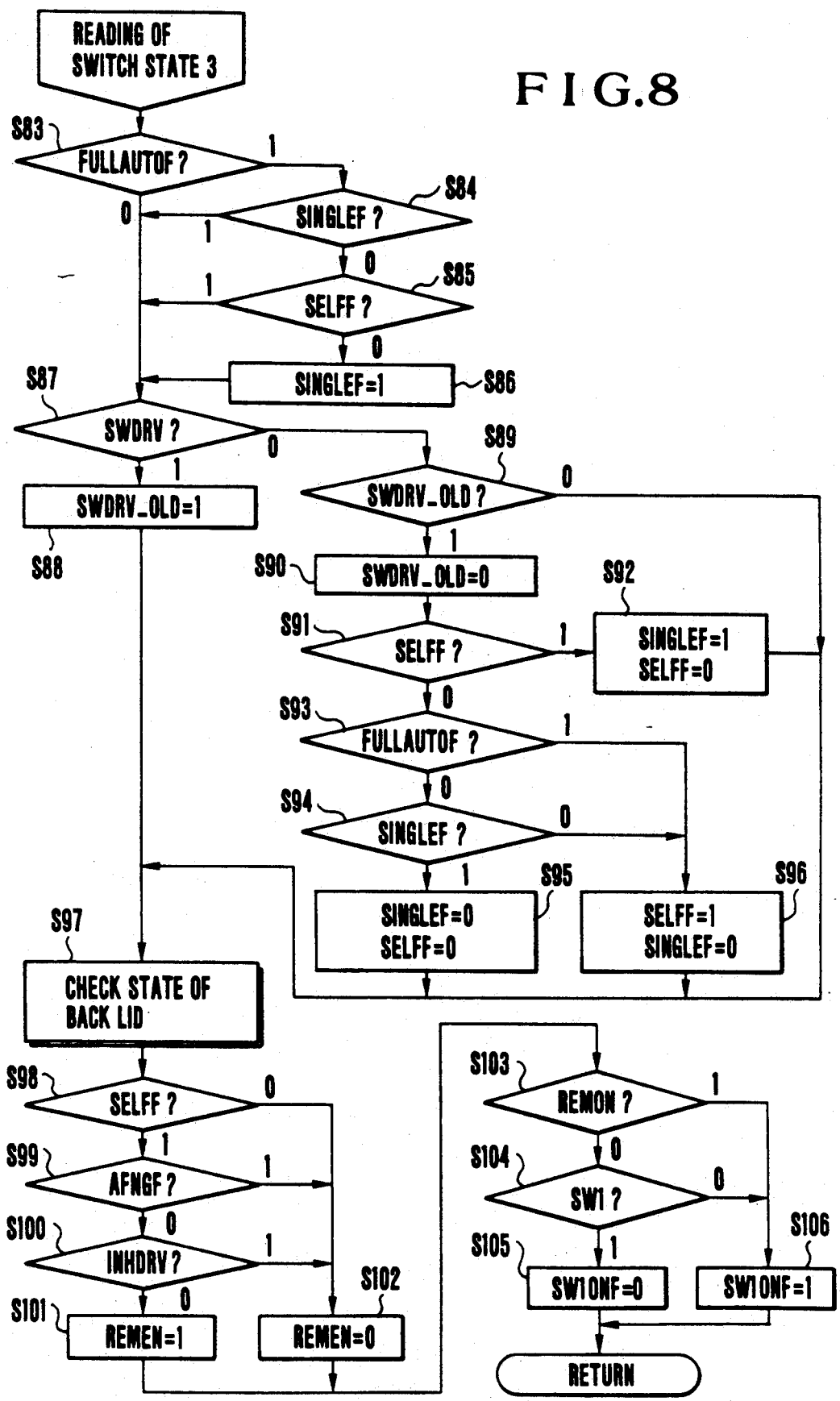
FIG. 8 is a flowchart of the subroutine "Read states of switches".

FIGS. 6 to 8 are detailed flowcharts of the subroutine "READ STATES OF SWITCHES".

Steps S51 to S58: The position of the exposure mode setting dial 106 is read through the exposure-mode setting dial switches DIAL1 and DIAL2 each having a 2-bit output. If a combinational output from the switches DIAL1 and DIAL2 is "00", the full-automatic-mode flag FULLAUTOF is set to "1" in Step S55. The full automatic mode is a mode which provides a simple operating method suited t beginners and whose operation differs from the operation of any of the shutter priority mode, the aperture priority mode and the program mode.

If such an combinational output is "01", the program-mode flag PROGF is set up; if it is "10", the shutter-priority-mode flag TVPF is set up; or if it is "11", the aperture-priority-mode flag AVPF is set up.

Step S59: The amount of rotation of the set-value input dial is read through the dial rotation detecting circuit 526 by serial communication in a manner similar to that explained in connection with the subroutine "COMMUNICATION WITH LENS".

Steps S60 to S63: If the shutter priority mode is selected, the process proceeds from Step S60 to Step S61. The value of the shutter-speed storing register TVDISPR is varied by a half step for each predetermined amount of rotation of the set-value input dial. If the direction of rotation of the dial is clockwise, the value of the shutter-speed storing register TVDISPR varies in the positive direction. If the direction of rotation of the dial is counterclockwise, the value of the shutter-speed storing register TVDISPR varies in the negative direction. In the case of the aperture-priority-mode as well, the value of the aperture storing register AVDISPR is varied by an amount corresponding to the amount of rotation of the set-value input dial.

Step S64: If the value of the shutter-speed storing register TVDISPR exceeds its controllable range (for example, the range between a maximum speed of 1/2000 second and a minimum speed of 2 seconds), the value of the shutter-speed storing register TVDISPR is limited within the controllable range. Similarly, the value of the aperture storing register AVDISPR is limited within the range between the value of the fully open aperture value register AVOR and the value of the maximum aperture value register AVMAXR. In the above-described manner, an arbitrary shutter speed and an arbitrary aperture value can be set during each of the shutter priority mode and the aperture priority mode.

Steps S65 to S72: Control associated with the flash pop-up button 105 is performed. If the flash pop-up button 105 is not pressed, the flash-pop-up-button state flag SWPOP_OLD is always set to "1" in Step S66. While the subroutine "READ STATES OF SWITCHES" is being called in the state of waiting for the operations of Steps S3 to S12, if the flash pop-up button 105 is turned on, the process proceeds from Step S67 to Step S68 since the value of the flash-pop-up-button state flag SWPOP_OLD is "1".

If the full automatic mode is not selected and the flash unit is not popped up, the subroutine "POP UP FLASH UNIT" is called in Step S72 and the flash unit is popped up. That is to say, if the flash pop-up button 105 is depressed, the flash unit is popped up.

When the flash pop-up button 105 is pressed once, the process passes through Step S68. After that, therefore, the process proceeds from Step S67 to Step S73 without passing through Step S68. If the pressing of the flash pop-up button 105 is stopped, the flash-pop-up-state-button state flag SWPOP_OLD is set to "1" in Step S66. Accordingly, if the flash pop-up button 105 is again pressed, the process is allowed to pass through Step S68. That is to say, each time the flash pop-up button 105 is pressed, the process passes through Step S68 only once.

If the flash unit is in the popped-up state, the process proceeds from Step S70 to Step S71, in which the red-eye preventing-mode flag REDEYEF is inverted. That is to say, after the flash unit has been popped up, each time the flash pop-up button 105 is turned on, the red-eye preventing mode is switched between a set state and a cancelled state.

In the above-described manner, the flash pop-up operation and the setting of the red-eye preventing mode can be achieved by means of a common button.

In the case of the full automatic mode, the process proceeds from Step S69 to Step S71 irrespective of the state of the flash unit. Accordingly, since the flash unit cannot be popped up, only the setting of the red-eye preventing mode is possible.

Steps S73 and S74: If the trailing-curtain-sync-flash setting switch SWPOSTF is on, the red-eye preventing mode is cancelled in Step S74. Accordingly, even if the red-eye preventing mode is set in Steps S65 to S72, the camera never comes into the red-eye preventing mode if the trailing-curtain sync flash mode is set.

Steps S75 and S76: If the full automatic mode is selected, the AF-mode flag SERVOF is necessarily set for one-shot AF in Step S76.

Steps S77 to S82: If the full automatic mode is not selected, the AF-mode flag SERVOF is inverted each time the AF setting switch SWAF is turned on in a manner similar to that performed in Steps S65 to S72. It is, therefore, possible to switch the AF mode between the servo AF mode and the one-shot AF mode. However, if the lens is in the state of manual focusing, the AF setting is not altered in Step S81.

Steps S83 to S86: In the case of the full automatic mode, if both the single-shooting-mode flag SINGLEF and the self-timer-mode flag SELFF have "0", that is, in the case of the continuous-shooting mode, the single-shooting-mode flag SINGLEF is set up to set the single shooting mode. In the case of the full automatic mode, only the single shooting mode and the self-timer mode are selectable for the convenience of beginners. For this reason, in each of the shutter priority mode, the aperture priority mode and the program mode, if the exposure-control-mode setting dial 106 is rotated to select the full automatic mode with the continuous shooting mode active, the single shooting mode is again set in these steps.

Steps S87 to S96: Each time the drive-mode setting switch SWDRV is turned on, the film transport mode is switched, as in the case of the input operation of the flash pop-up button 105. In the case of the full automatic mode, the self-timer mode and the single shooting mode can be switched therebetween. During the other modes, the single shooting mode, the continuous shooting mode, the self-timer mode and the single shooting mode are selected in that order.

In the above-described manner, in the case of the full automatic mode, the film transport mode is set to the single shooting mode or to the self-timer mode, the AF mode is automatically set to the one-shot AF mode, and the flash unit cannot be popped up. In contrast, in each of the shutter priority mode, the aperture priority mode and the program mode, the film transport mode can be selectively set to the single shooting mode, the continuous shooting mode or the self-timer mode, the AF mode can be switched between the servo AF mode and the one-shot AF mode, and the flash unit can be popped up through the flash pop-up button 105. The red-eye preventing mode can be selected through the flash pop-up button 105 irrespective of the kind of mode.

Step S97: A subroutine for detecting the state of a back lid is executed.

Steps S98 to S102: The remote-control signal receiving circuit 522 is set to a reception-of-remote-control-signal enable state on the conditions that the self-timer mode is set and AF is not impossible and that a shutter release after single shooting is not inhibited.

Steps S103 to S106: If a release signal from a remote controller is received or if the release button 104 is pressed down to the first stroke position, the light measurement flag SW1ONF is set to "1"; otherwise, it is set to "0". If the light measurement flag SW1ONF is set up, the process proceeds from Step S11 to a light measurement routine.

The remote controller is set to a reception enable state only when the self-timer mode is set. However, if the AF system fails to attain an in-focus state although the shutter is to be released through the remote controller, the shutter is not able to be released and light measurement is performed endlessly. To prevent such a problem, if AF is impossible, the signal REMEN is cleared and the reception of a remote-control signal is inhibited. When the signal REMEN is cleared, the remote-control signal receiving circuit 522 can clear the signal REMON so that the light measurement flag SW1ONF is cleared and the light measurement can be stopped. Inhibition of shutter release after single shooting is performed in a similar manner.

Figure 9:
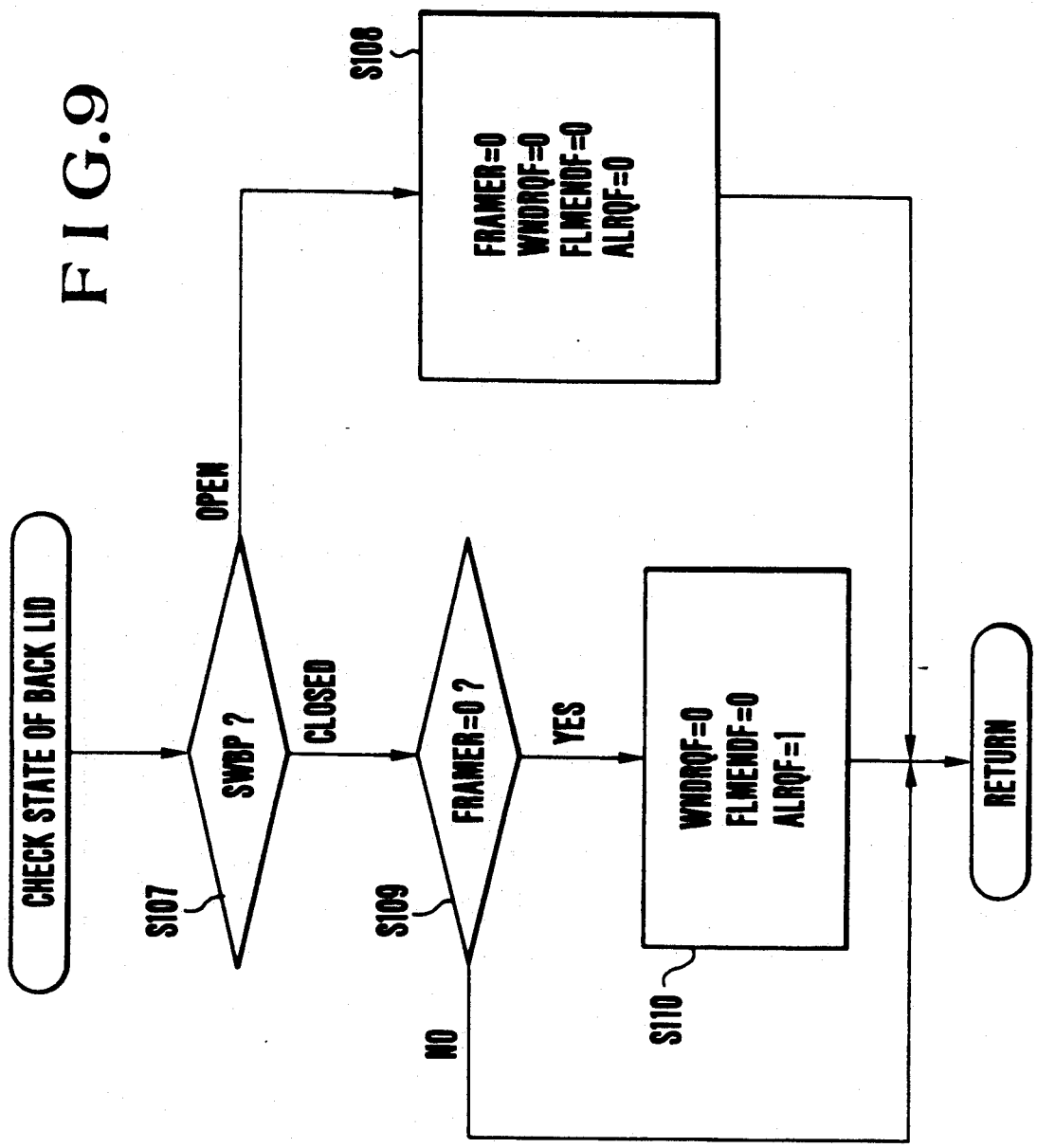
FIG. 9 is a flowchart of the subroutine "Check back lid".

FIG. 9 is a detailed flowchart of the subroutine "CHECK BACK LID" of Step S97.

Steps S107 and S108: If the back lid is open, the process proceeds to Step S108, in which the number-of-frames register FRAMER is cleared to "0", and the film-winding request flag WNDRQF, the automatic-loading request flag ALRQF and the end-of-film flag FLMENDF are all cleared.

Steps S109 and S110: If a film is loaded and the back lid is closed, since the number-of-frames register FRAMER is cleared in Step S108, the automatic-loading request flag ALRQF is set up in Step S109. Therefore, the process proceeds from Step S8 to Step S9 in which automatic loading is executed. After the automatic loading the number of frames of the film is counted, and the process does not pass through Step S110 until the back lid is again opened.

In the above-described manner, each mode of the camera can be set through operating elements such as a main dial, an electronic dial and a mode setting button.

Figure 10:
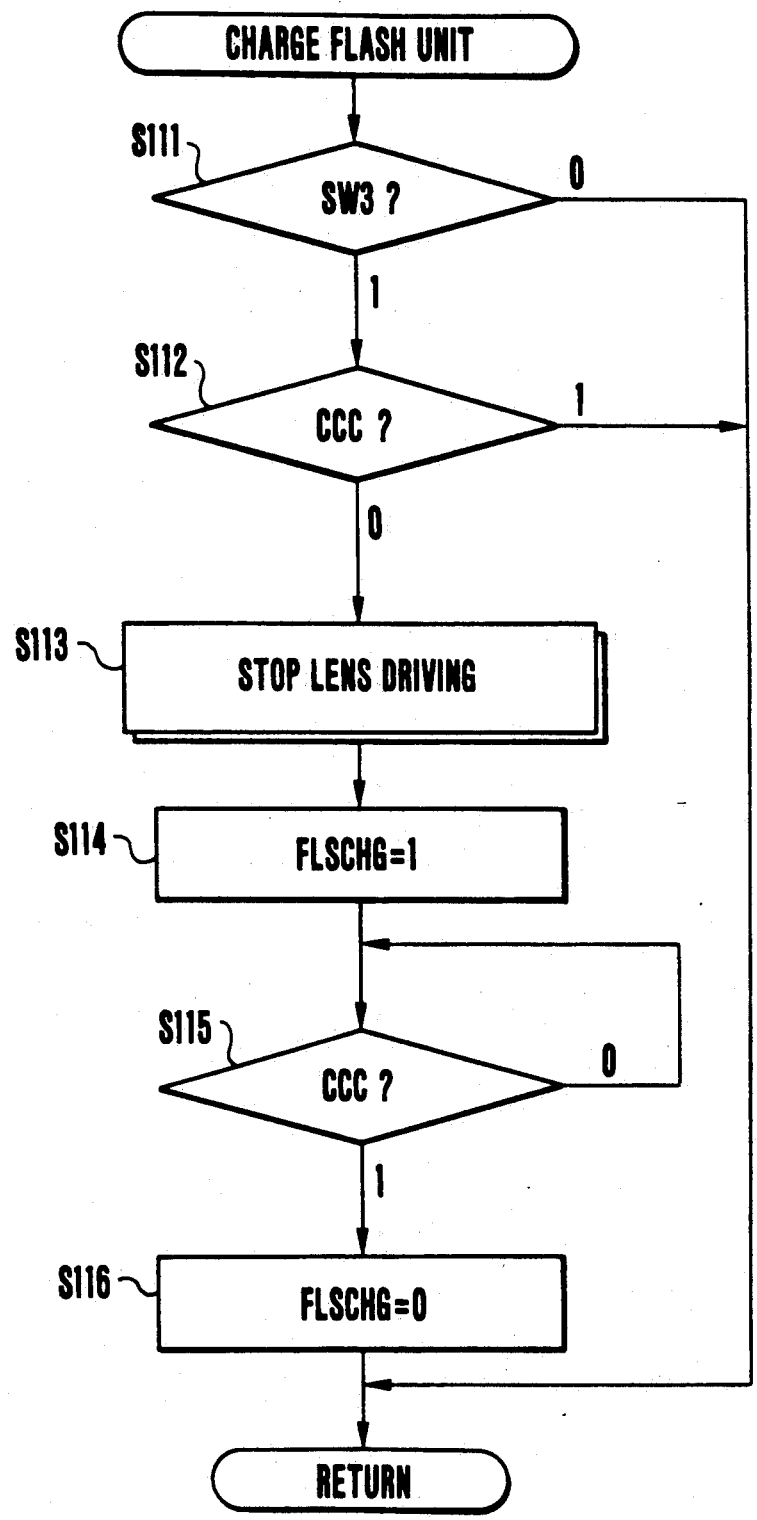
FIG. 10 is a flowchart of the subroutine "Charge flash unit".

FIG. 10 is a detailed flowchart of the subroutine "CHARGE FLASH UNIT".

Steps S111 and S112: If the flash unit is popped up and the flash-charging completion signal CCC is not at "1", a flash charging operation starting at Step S113 is performed.

Steps S113: A lens-driving stop command is communicated to the lens. For example if the flash unit is popped up and charging of the flash unit is needed during an AF operation, lens driving is stopped in this step. This step is intended to prevent an erroneous operation in which if lens driving is performed during the charging of the flash unit, which requires a large amount of electrical power, the electrical power required to drive a lens motor is not obtained and the lens driving stops.

Steps S114 to S116: The flash charging control signal FLSCHG is set to "1" and the process waits for the flash-charging completion signal CCC to go to "1". If the charging of the flash unit is completed, the signal FLSCHG is reset to "0" and the process returns to the main routine of FIG. 2.

In the above-described manner, the charging of the flash unit is performed.

Figure 11:
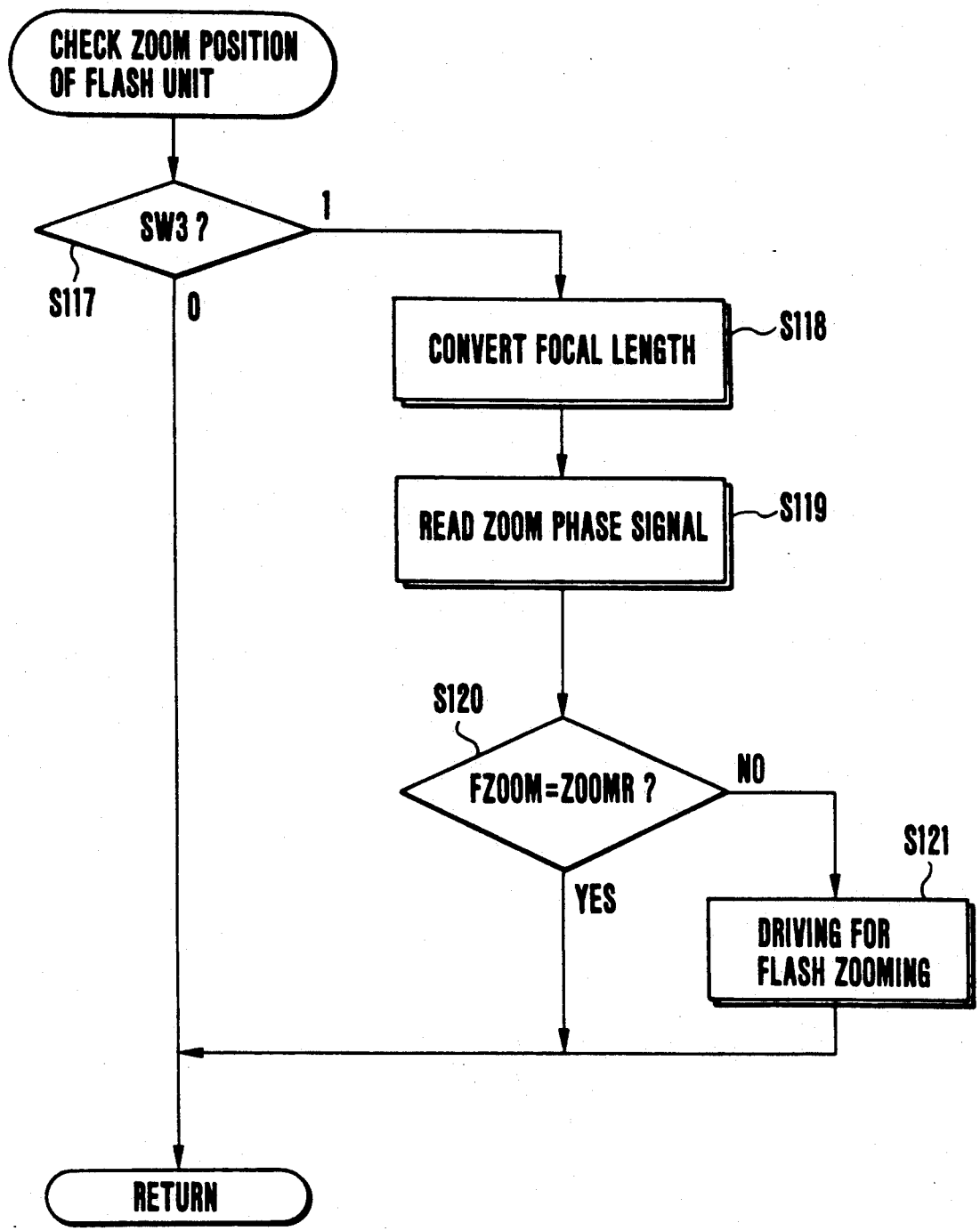
FIG. 11 is a flowchart of the subroutine "Check zoom position of flash unit".

FIG. 11 is a detailed flowchart showing the subroutine "CHECK ZOOM POSITION OF FLASH UNIT".

Step S117: If the flash unit is not popped up, the process immediately returns to the main routine.

Step S118: The subroutine "CONVERT FOCAL LENGTH" is called.

Figure 12:
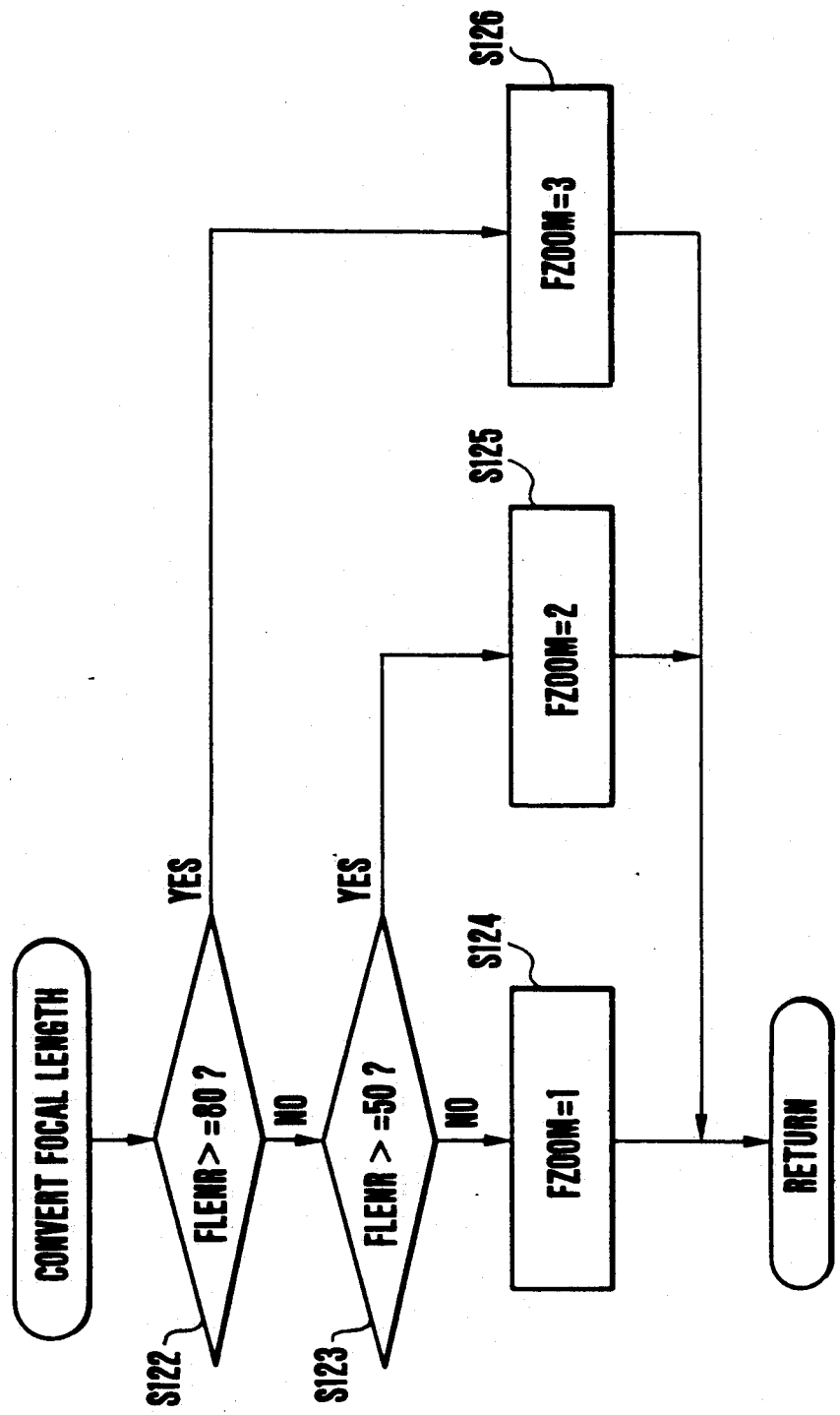
FIG. 12 is a flowchart of the subroutine "Convert focal length".

FIG. 12 is a detailed flowchart of the subroutine "CONVERT FOCAL LENGTH". First of all, it is determined from the focal length of the lens which of a telephoto range, a standard range and a wide-angle range corresponds to the current angle of view of the lens.

Steps S122 to S126: If the focal length is more than 80 mm, it is determined that the current angle of view of the lens is in the telephoto range, and data of "3" is stored in the focal-length converting register FZOOM. If the focal length is between 50 mm and 80 mm, it is determined that the current angle of view is in the standard range, and data of "2" is stored in the focal-length converting register FZOOM. Similarly, in the case of 50 mm or less, data of "1" indicative of the wide-angle range is stored in the focal-length converting register FZOOM.

Step S119 is the subroutine "READ ZOOM PHASE SIGNAL".

FIG. 13 is a detailed flowchart of the subroutine "READ ZOOM PHASE SIGNAL". It is determined which of a telephoto range, a standard range and a wide-angle range corresponds to the current zoom phase of the flash unit.

Steps S127 to S133: If the zoom phase signals ZOOM1 and ZOOM2 assume "1" and "0", respectively, it is determined that the zoom phase of the flash unit is in the telephoto range, and data of "3" is stored in the zoom position register ZOOMR. If the signals ZOOM1 and ZOOM2 assume "0" and "0", respectively, it is determined that the zoom phase of the flash unit is in the standard range, and data of "2" is stored in the zoom position register ZOOMR. Similarly, in the case of "0" and "1", it is determined that the zoom phase is in the wide-angle range, and data of "1" is stored in the zoom position register ZOOMR. If the zoom phase of the flash unit assumes an intermediate position between each phase, the signals ZOOM1 and ZOOM2 assume "1" and "1", and data of "0" is stored in the zoom position register ZOOMR.

Step S120: The value of the flash-unit zoom position register ZOOMR is compared with that of the lens-focal-length converting register FZOOM. If these value differ, the subroutine "DRIVING FOR FLASH ZOOMING" is called so that the focal length of the lens and the zoom phase of the flash unit are made to coincide with each other. Since the subroutine "CHECK ZOOM POSITION OF FLASH UNIT" is called at all times, whenever the photographer varies the focal length of the lens, flash zooming is immediately executed in accordance with the varied focal length.

Figure 14A:
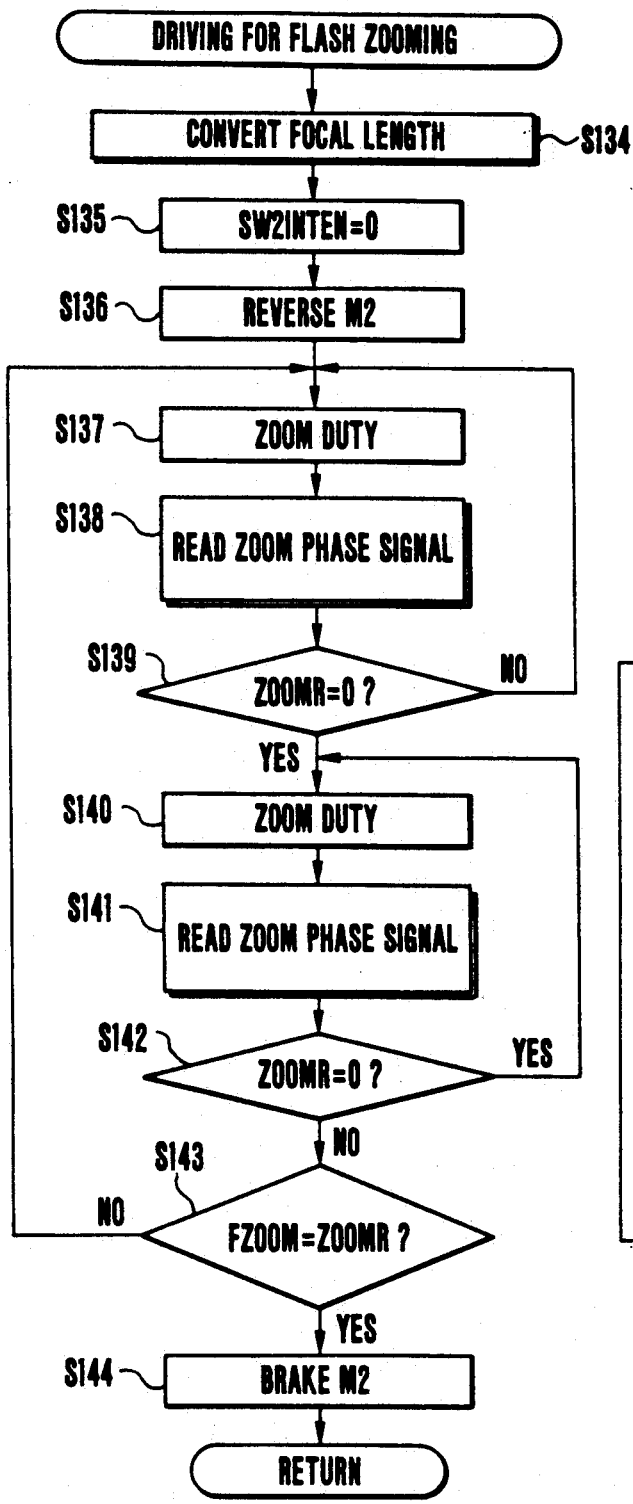
FIGS. 14(A) and 14(B) are flowcharts of the subroutine for "Driving for flash zooming".
Figure 14B:
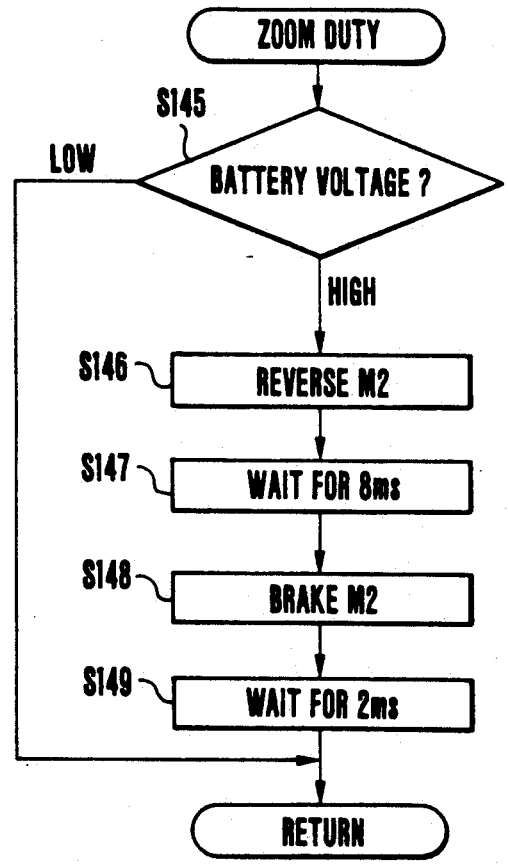

FIGS. 14(A) and 14(B) are detailed flowcharts of the subroutine "DRIVING FOR FLASH ZOOMING".

Step S134: The focal length of the lens is converted and the obtained data is stored in the focal-length converting register FZOOM.

Step S135: An interrupt is inhibited from being caused by the signal of the switch SW2. During the driving for flash zooming, an interrupt is inhibited from being caused by a shutter release so that the flash unit is prevented from flashing at the time of the shutter release in the state where the flash illumination angle does not correspond to the lens focal length.

Step S136: The motor M2 is reversed and the driving for flash zooming is started.

Step S137: The subroutine "ZOOM DUTY" is called.

Step S138: The subroutine "READ ZOOM PHASE SIGNAL" is called.

Step S139: Steps S137 to S139 are looped until the zoom phase reaches an intermediate phase, that is, the process waits until the flash unit moves out of the zoom phase indicated by the zoom phase signal that was provided at the start time of the driving.

The subroutine "ZOOM DUTY" is described below.

Step S145: The voltage of the battery is checked. If the voltage is high, Steps S146 to S149 are executed.

Steps S146 and S147: The motor M2 is reversed for 8 ms.

Steps S148 and S149: The motor M2 is braked for 2 ms.

This subroutine is executed while Steps S137 to S139 are being repeated. Accordingly, the motor M2 is driven with a cycle of 10 ms and a duty of 80%. If the battery voltage is low, the process does not pass through Steps S146 to S149, and the flash unit is driven at a full power with the motor M2 reversed. Accordingly, if the battery voltage is high, the rotating speed of the motor M2 is reduced with a duty of 80% to enhance the controllability of the driving for flash zooming. If the battery voltage is low, the flash unit is driven by the full power of the motor M2 so that the speed of driving for flash zooming does not lower.

Steps S140 to S142: The flash unit is driven until the zoom phase reaches any stop position of the wide-angle, standard and telephoto phases.

Step S143: If the value of the flash-unit zoom position register ZOOMR is the same as the value of the lens-focal-length converting register FZOOM, the process proceeds to Step S144. Otherwise, the process returns to Step S137.

Step S144: The motor M2 is braked.

In the above-described manner, the flash illumination angle is made to correspond to the lens focal length. In the driving for flash zooming, the flash unit is necessarily driven until the zoom phase leaves one stop-position phase and reaches another stop-position phase. Accordingly, the amount of overrun from the above-described pattern switching position can be kept constant.

Figure 15:
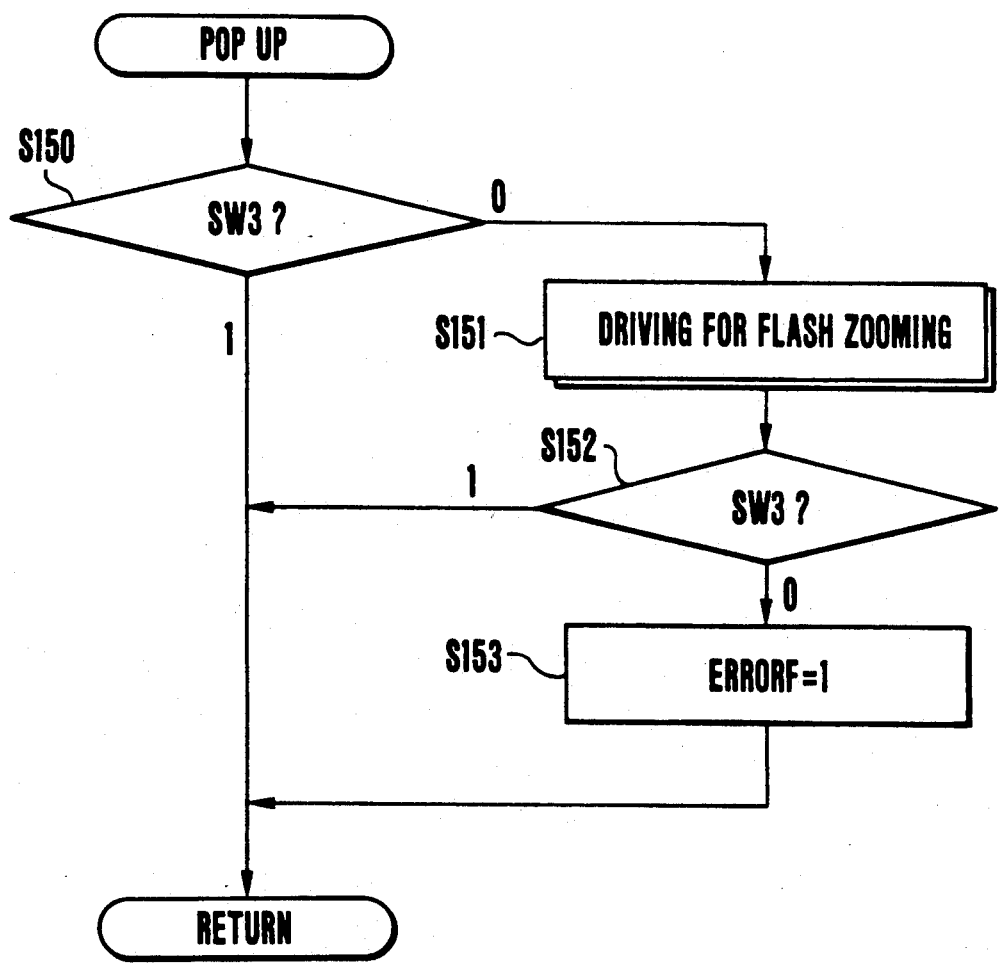
FIG. 15 is a flowchart of the subroutine "Pop up".

FIG. 15 is a detailed flowchart of the subroutine "POP UP". If the flash unit is not popped up, the subroutine "DRIVING FOR FLASH ZOOMING" is activated.

Step S151: As described above in connection with the subroutine "DRIVING FOR FLASH ZOOMING", the flash unit is necessarily driven until it leaves a stop position. Since the retaining lever 12 is unlocked and the flash unit is popped up at an intermediate time during the driving, zoom phase matching and a flash pop-up operation can be realized by a common routine.

Step S152: The state of the pop-up switch SW3 is checked after the driving for flash zooming. If the flash unit fails to be popped up, an error flag ERRORF is set to "1".

The operation executed in the state of standby is as described above.

If the release button 104 is depressed to the first stroke position or if a remote-control signal is transmitted during the self-timer mode, the light measurement flag SW1ONF is set up and the process proceeds from Step S11 to the light measurement routine.

Figure 16:
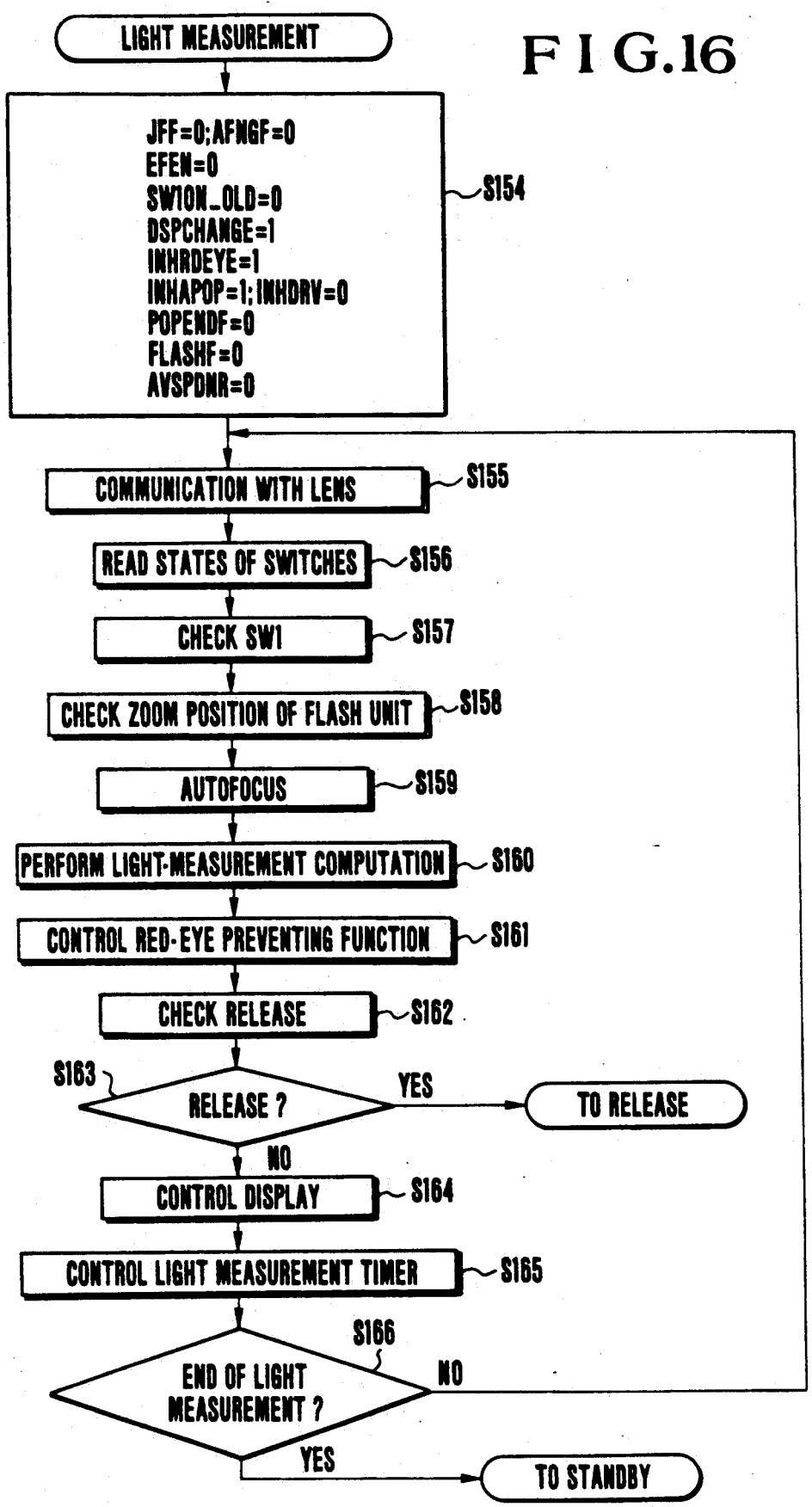
FIG. 16 is a flowchart of the subroutine "Light measurement".

FIG. 16 is a detailed flowchart of the subroutine "LIGHT MEASUREMENT".

Step S154: Flags and registers for use in light measurement and distance measurement are initialized. The in-focus flag JFF and the distance-measurement impossible flag AFNGF are cleared. The flashing control signal EFEN is cleared to inhibit flashing. The flag SW1ON_OLD for memorizing the state of the light measurement flag SW1ONF is cleared, and a display-update request flag DSPCHANGE is set to "1".

The inhibit-release-during-red-eye-prevention flag INHRDEYE is set, the inhibit-release-before-automatic-flashing-decision flag INHAPOP is set, the inhibit-release-after-single-shooting flag INHDRV is cleared, and an automatic-pop-up completion flag POPENDF is cleared. A flash mode flag FLASHF is cleared and data of "0" is stored in the aperture stopped-down difference register AVSPDNR.

Steps S155 and S156: The subroutines "COMMUNICATION WITH LENS" and "READ STATES OF SWITCHES" are called, as in the case of the standby state.

Step S157: The routine "CHECK SW1" for checking the state of the switch SW1 is called.

Step S158: As in the case of the standby state, a check is made as to whether the zoom position of the flash unit corresponds to the focal length of the lens. If no correspondence is obtained, driving for flash zooming is executed.

Step S159: Autofocus is performed.

Step S160: The luminance of the subject is measured to compute a correct shutter speed and aperture value.

Step S161: The red-eye preventing function is controlled.

Steps S162 and S163: Various release conditions are checked and if shutter release is possible, the process proceeds from Step S163 to the subroutine "RELEASE".

Step S164: The display is updated.

Steps S165 and S166: A light-measurement timer is controlled and if an end-of-light-measurement condition is satisfied, the process proceeds to the standby state. Otherwise, the process returns to Step S155 and light measurement and distance measurement are repeatedly executed.

Figure 17:
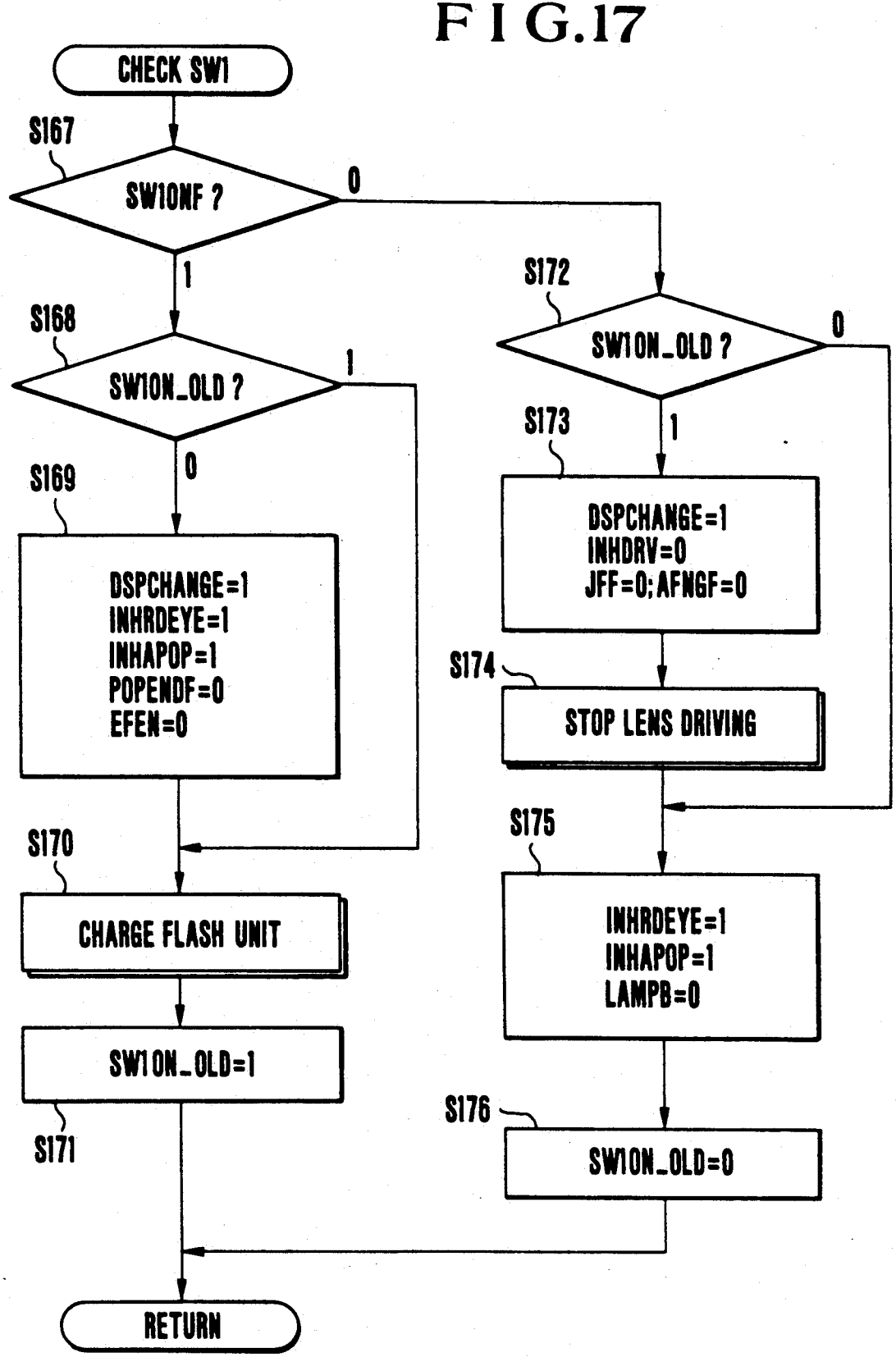
FIG. 17 is a flowchart of the subroutine "Check switches".

The subroutine "LIGHT MEASUREMENT" will be described below in detail. FIG. 17 is a flowchart of the subroutine "CHECK SW1".

Step S167: The state of the light measurement flag SW1ONF is checked. Since "1" was detected in Step S11 and the process proceeded to the subroutine "LIGHT MEASUREMENT", the process proceeds to Step S168.

Step S168: The state of the flag SW1ON_OLD for memorizing the state of the light measurement flag SW1ONF is checked. Since the light measurement flag SW1ONF is cleared in Step S154, Step S169 is executed. Step S169 is executed each time the flag SW1ONF changes from "0" to "1".

Step S169: The display-update request flag DSPCHANGE is set to "1". The inhibit-release-during-red-eye-prevention flag INHRDEYE is set, the inhibit-release-before-automatic-flashing-decision flag INHAPOP is set, and the automatic-pop-up completion flag POPENDF is cleared.

The flashing control signal EFEN is cleared to inhibit flashing.

Step S170: If the flash unit is popped up but has not yet been charged, the main capacitor 511 is charged, as in the case of the standby state.

Step S171: The flag SW1ON_OLD for memorizing the state of the light measurement flag SW1ONF is set.

After that, if the switch SW1 is on, only Steps S170 and S171 are executed.

If the flag SW1ONF goes to "0", the process proceeds to Step S172.

Step S172: Since the flag SW1ON_OLD for memorizing the state of the light measurement flag SW1ONF has been set to "1" in Step S171, Step S173 is executed.

Step S173: The display-update request flag DSPCHANGE is set to "1".

The inhibit-release-after-single-shooting flag INHDRV is cleared. When the release button SW1 is turned off after a shutter release in the single shooting mode, the release inhibition is cancelled.

Step S174: The lens driving is inhibited and the AF operation is stopped.

Step S175: The inhibit-release-during-red-eye-prevention flag INHRDEYE is set, and the inhibit-release-before-automatic-flashing-decision flag INHAPOP is set.

Step S176: The flag SW1ON_OLD for memorizing the state of the light measurement flag SW1ONF is cleared. As described above, each time the switch SW1 is turned on or off, each flag is set. If the light measurement flag SW1ONF is on, the flash unit is charged, while if it is off, the AF operation is stopped.

Figure 18:
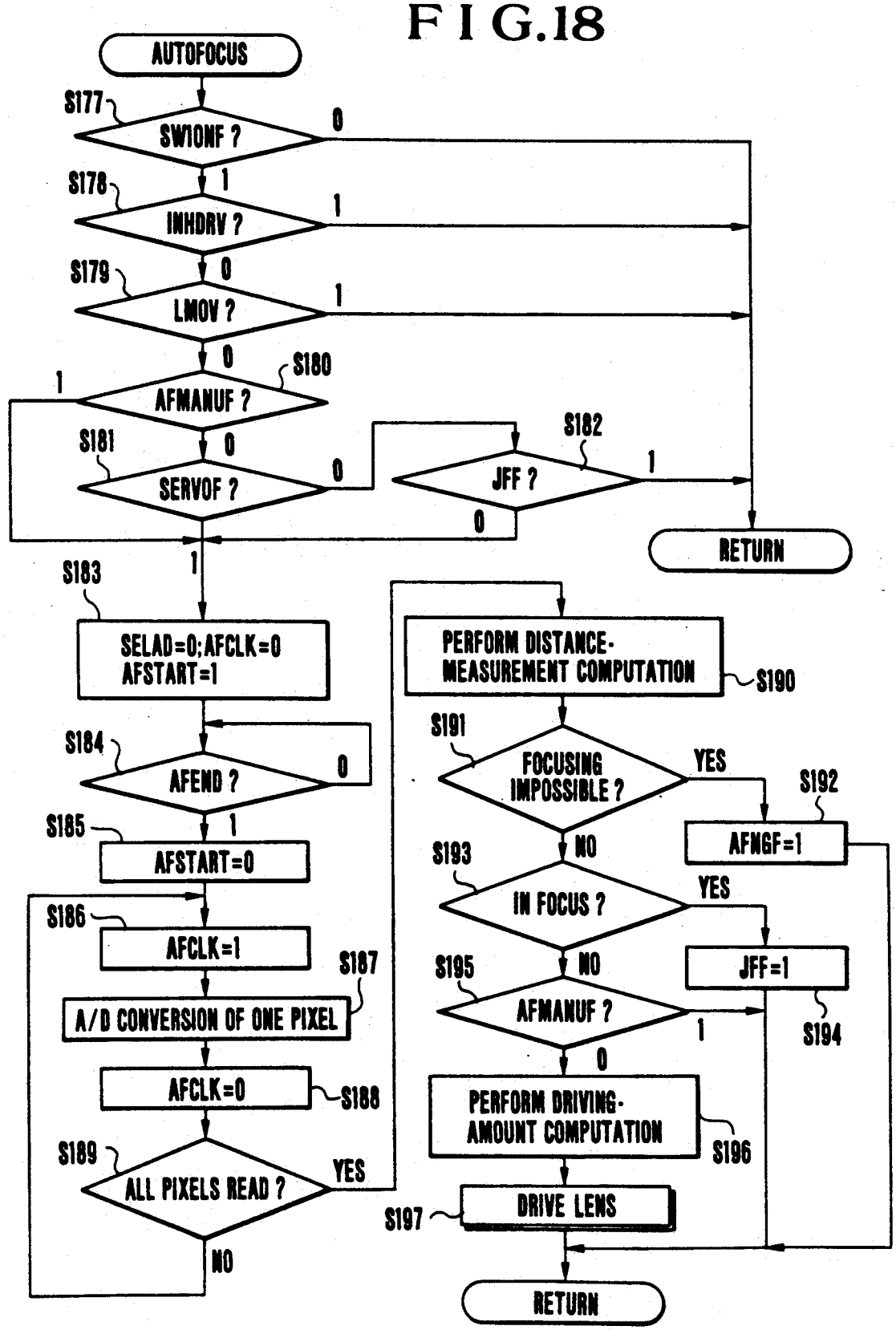
FIG. 18 is a flowchart of the subroutine "Auto focus".

FIG. 18 is a detailed flowchart of the subroutine "AUTOFOCUS".

Steps S177 to S182: An AF operation is not performed and the process immediately returns to the main routine if any one of the following conditions is satisfied: (1) the light measurement flag SW1ONF is off; (2) the distance ring of the lens is being driven; (3) single shooting has been performed; and (4) an in-focus state has been achieved in the one-shot AF mode.

Step S183: "0" is outputted as a selecting signal SELAD, and an A/D conversion port is connected to the distance measuring circuit 521. The AF readout clock signal AFCLK is cleared to cause a distance-measuring sensor to start storage.

Step S184: The process waits until the storage is completed.

Step S185: The storage of the distance-measuring sensor is stopped.

Steps S186 to S188: Each pixel data is converted from analog to digital form in accordance with whether the level of the AF readout clock signal AFCLK is high or low.

Step S189: Steps S186 to S189 are looped until all the pixels' data are read out.

Step S190: Distance-measurement computations are performed by using the read-out pixel information.

Steps S191 and S192: If it is determined that autofocus is impossible, the autofocus-impossible flag AFNGF is set up.

Steps S193 and S194: If an in-focus state has been achieved, the in-focus flag JFF is set up.

Step S195: In the case of manual focusing, lens driving is not performed.

Steps S196 and S197: The amount of lens driving is computed from the amount of defocus and stored in the combtooth register FPR. A drive command is transmitted to the lens.

In the above-described manner, autofocus control is executed.

Figure 19:
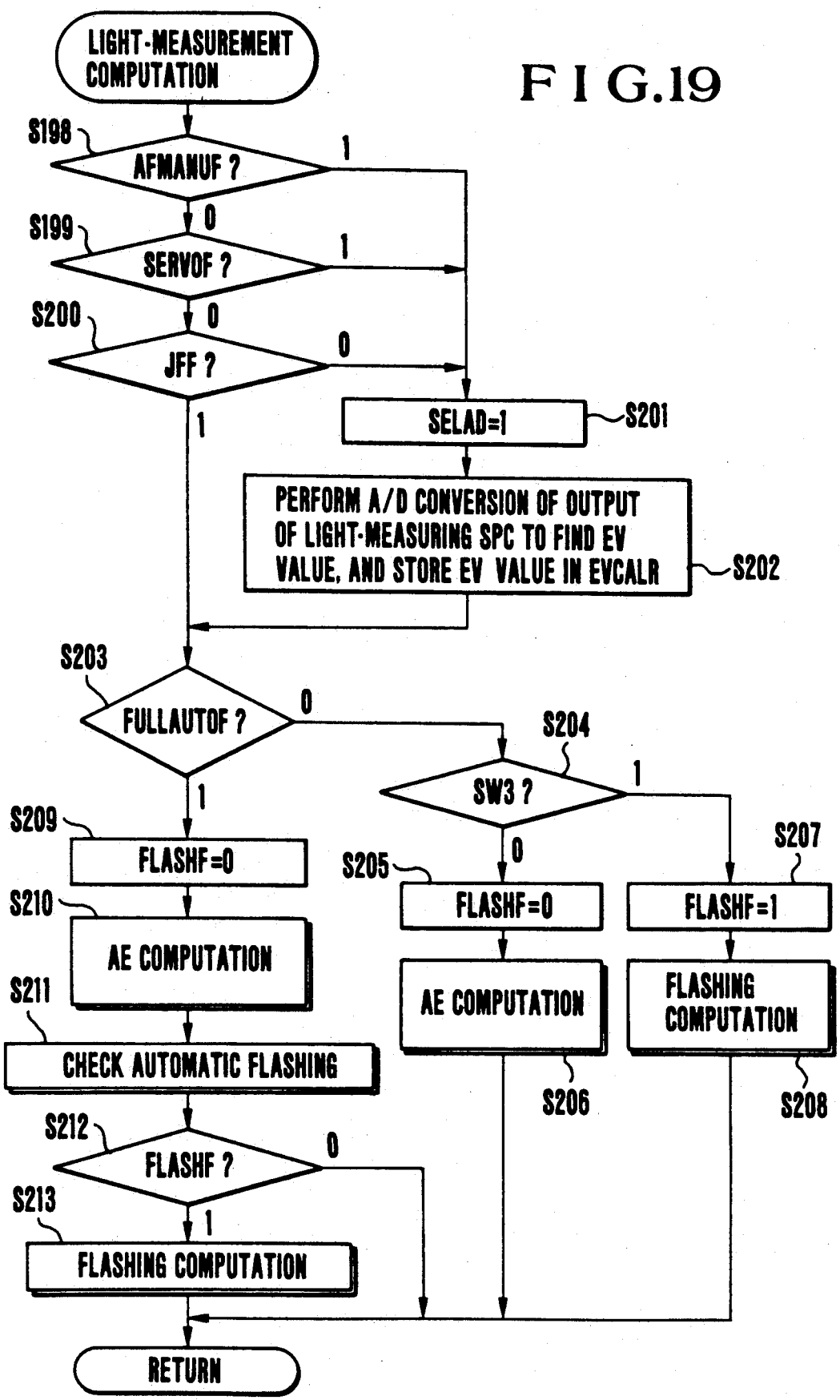
FIG. 19 is a flowchart of the subroutine "Light-measurement computation".

FIG. 19 is a detailed flowchart of the subroutine "LIGHT-MEASUREMENT COMPUTATION".

Steps S198 to S202: Except after an in-focus state has been achieved in the one-shot AF mode, the luminance of the subject is measured in Step S202 and an Ev value is obtained. After an in-focus state has been achieved in the one-shot AF mode, light-measurement computations are performed by using an Ev value obtained by light measurement immediately before the in-focus state is reached. In other words, during the one-shot AF mode, AE lock is applied when an in-focus state is achieved.

Step S203: If the full automatic mode is not selected, Step S204 and the subsequent steps are executed.

Step S204: The state of the flash pop-up switch SW3 is checked. Since the full automatic mode is not selected, the flash unit can be popped up in the subroutine "READ STATES OF SWITCHES". If the flash unit is not popped up, AE computations are performed in Step S206 while if it is popped up, flashing computations are performed in Step S208. In other words, the AE computations or the flashing computations can be selected in accordance with whether the flash unit is popped up.

Step S206: The AE computations are performed in accordance with each exposure control mode. In the shutter priority mode, the shutter speed TVDISPR is subtracted from the light-measurement value EVCALR to find the aperture value AVDISPR. In the aperture priority mode, the set aperture value AVDISPR is subtracted from the light-measurement value EVCALR to find the shutter speed TVDISPR. In the program mode or the full automatic mode, the aperture value AVDISPR and the shutter speed TVDISPR are found by using known programmed computations.

Step S208: The flashing computations are performed in accordance with each exposure control mode. In the shutter priority mode, the shutter speed TVDISPR is limited to an X-sync shutter speed or less and an appropriate aperture value AVDISPR is obtained from the subject luminance value EVCALR. In the aperture priority mode, the shutter speed TVDISPR is set to the X-sync shutter speed. In the program mode or the full automatic mode, the aperture value AVDISPR and the shutter speed TVDISPR are found by using the known programmed computations.

If the full automatic mode is selected in Step S203, Step S209 is executed.

Steps S209 and S210: Computations are performed on the basis of the AE mode.

Step S211: It is determined whether automatic flashing is needed. If flashing is needed, the flash mode flag FLASHF is set to "1".

Steps S212 and S213: If the flash mode is selected, flashing computations are performed; otherwise, control is executed on the basis of the AE value computed in Step S210.

Figure 20:
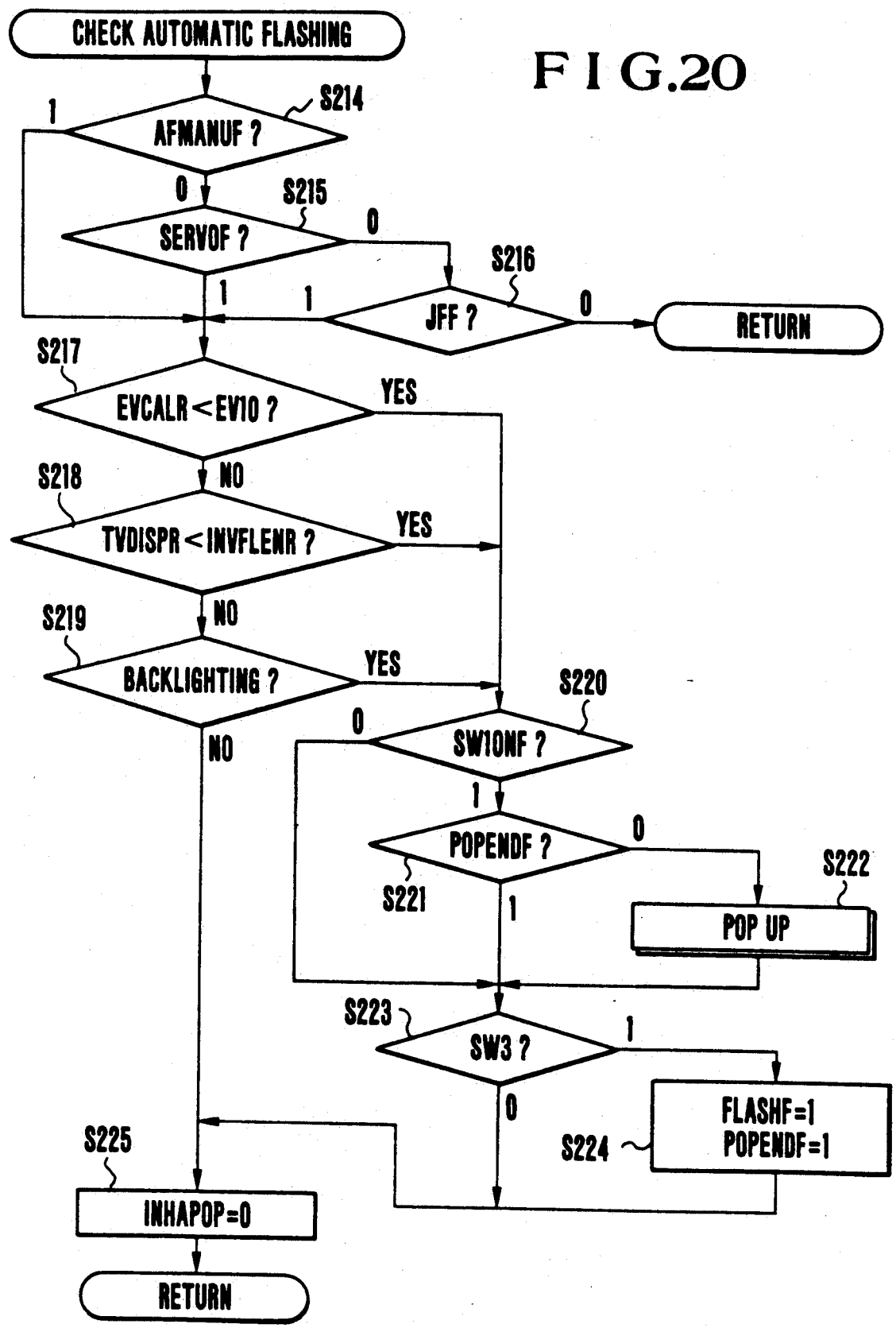
FIG. 20 is a flowchart of the subroutine "Check automatic flashing".

FIG. 20 is a detailed flowchart of the subroutine "CHECK AUTOMATIC FLASHING".

Steps S214 to S216: If the AF mode is the one-shot AF mode and an in-focus state has not yet been reached, the process immediately returns to the main routine. An AE-computation indication is displayed until an in-focus state has been reached. If the in-focus state is achieved, a decision as to automatic flashing is made after an AE lock state has been reached.

Steps S217 to S219: The conditions of automatic flashing are checked. If the subject luminance EV-CALR is not greater than Ev 10, or if the shutter speed TVDISPR obtained through the AE computations is not greater than 1/(focal length), or in the case of backlighting, the process proceeds to Step S220. Otherwise, it is determined that a flash is not needed, and the process proceeds to Step S225.

Steps S220 to S222: If the light measurement flag SW1ONF is at "1" and the flash unit has not yet been popped up, the flash unit is popped up.

Steps S223 and S224: If the flash unit has already been popped up, the flash mode flag FLASHF is set up. The flag POPENDF, indicating that the flash unit has been popped up once, is also set up.

Accordingly, if the switch SW1 is off, the flash unit does not pop up even under conditions suited to automatic flashing. If the photographer manually presses down the flash unit after the flash unit has been popped up once, the process proceeds from Step S221 to Step S223. Since the flash pop-up switch SW3 goes to "0" in Step S223, the subject is photographed on the basis of the result of the AE computations. In other words, if the user desires AE photography using no flashing under conditions suited to automatic flashing and presses down the flash unit, the flash unit does not pop up until the user releases the release button 104 and turns it on to clear the automatic-pop-up completion flag POPENDF in Step S169.

Step S225: The inhibit-release-before-automatic-flashing (pop-up)-decision flag INHAPO is cleared. Accordingly, during the one-shot AF mode, the flash unit does not pop up or shutter release is inhibited until an in-focus state is achieved. After a decision has been made as to a flash-unit pop-up operation, shutter release becomes possible.

Figure 21:
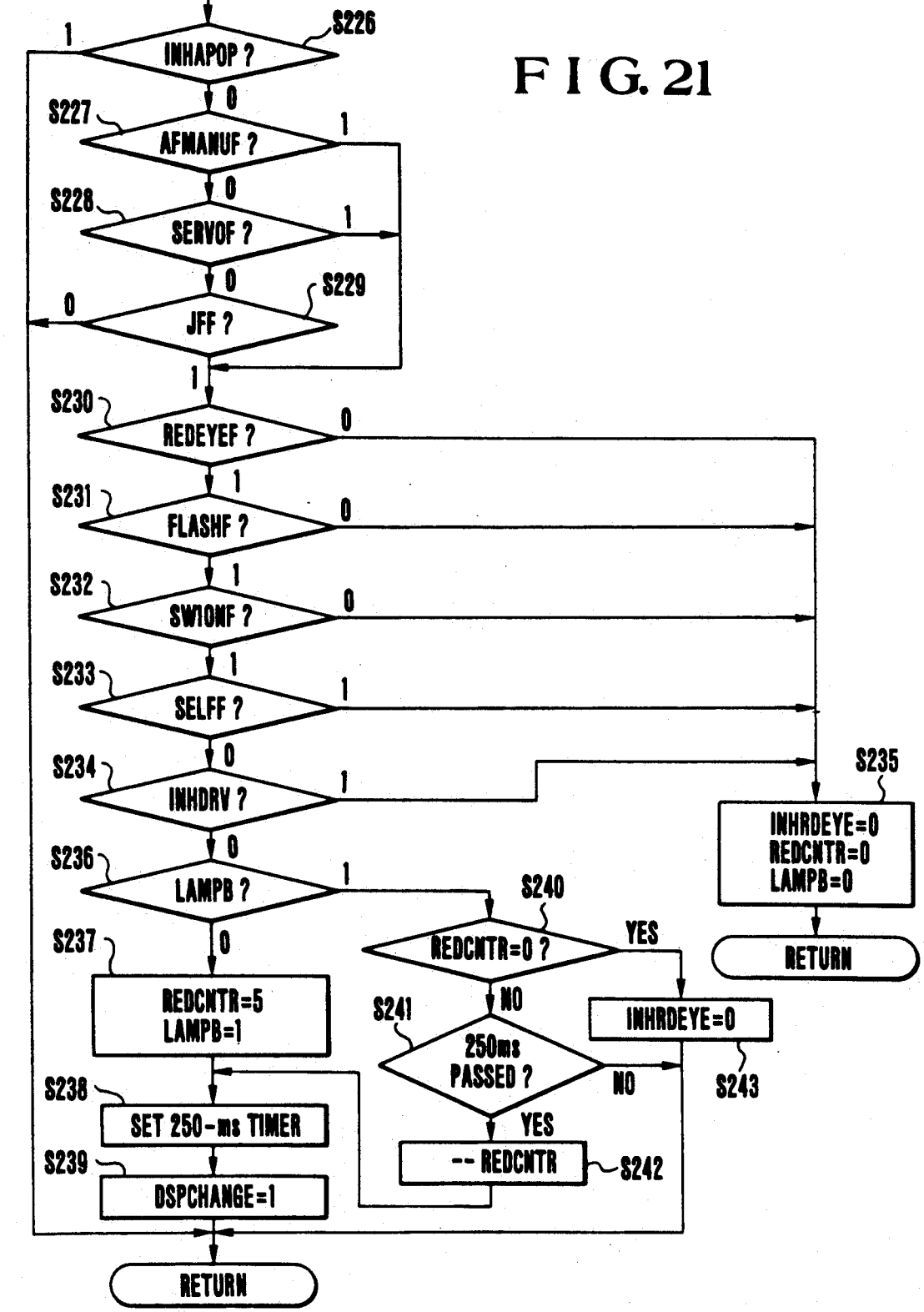
FIG. 21 is a flowchart of the subroutine "Control red-eye preventing function".

FIG. 21 is a flowchart of the subroutine "CONTROL RED-EYE PREVENTING FUNCTION".

Steps S226 to S229: If the inhibit-release-before-automatic-flashing-decision flag INHAPOP is set up or no in-focus state is achieved in the one-shot AF mode, no processing is performed and the process returns to the main routine. Accordingly, the inhibit-release-during-red-eye-prevention flag INHRDEYE remains on and shutter release is impossible.

Steps S230 to S235: A decision as to red-eye prevention control is made. In Step S235, the red-eye prevention counter REDCNTR and the inhibit-release-during-red-eye-prevention flag INHRDEYE are cleared if any of the following conditions is satisfied: (1) the red-eye preventing mode is not set; (2) the flash unit is not popped up; (3) the switch SW1 is off; (4) the self-timer is set; and (5) the inhibit-release-after-single-shooting signal INHDRV is set. In addition, the red-eye-preventing-lamp light-up signal LAMPB is cleared. Accordingly, if the self-timer is set or the red-eye preventing function is not used, shutter release can be immediately performed.

Step S236: If the red-eye preventing lamp 33 has already been lit up, the process proceeds to Step S240. If it is not lit up, the process proceeds to Step S237.

Step S237: Data of "5" is stored in the red-eye prevention counter REDCTR and the red-eye preventing lamp 33 is lit up.

Step S238: A 250 ms-timer is set.

Step S239: The display-update request flag DSPCHANGE is set up.

The setup of the display-update request flag DSPCHANGE updates the current indication to an indication which represents that a red-eye preventing operation is being executed.

Since the loop of Steps S155 to S166 is repeated while the light measurement flag SW1ONF is on, control returns to the subroutine "CONTROL RED-EYE PREVENTING FUNCTION".

Since the red-eye preventing lamp 33 has been lit up in Step S237, the process proceeds from Step S236 to Step S240.

Step S240: Since the value of the red-eye prevention counter REDCNTR is not "0", the process proceeds to Step S241.

Step S241: If 250 ms have not yet passed, the process immediately returns to the main routine.

Step S242: If 250 ms pass, the count value of the red-eye prevention counter RECNTR is decremented by "1". In Step S238, the 250 ms-timer is again set, and in Step S239, the display is updated.

When the red-eye prevention counter REDCNTR counts down and reaches "0", the process proceeds from Step S240 to Step S243. After that, the process passes through Step S243 until the switch SW1 is turned off or the shutter release is performed.

Step S243: The inhibit-release-during-red-eye-prevention flag INHRDEYE is cancelled.

Figure 22:
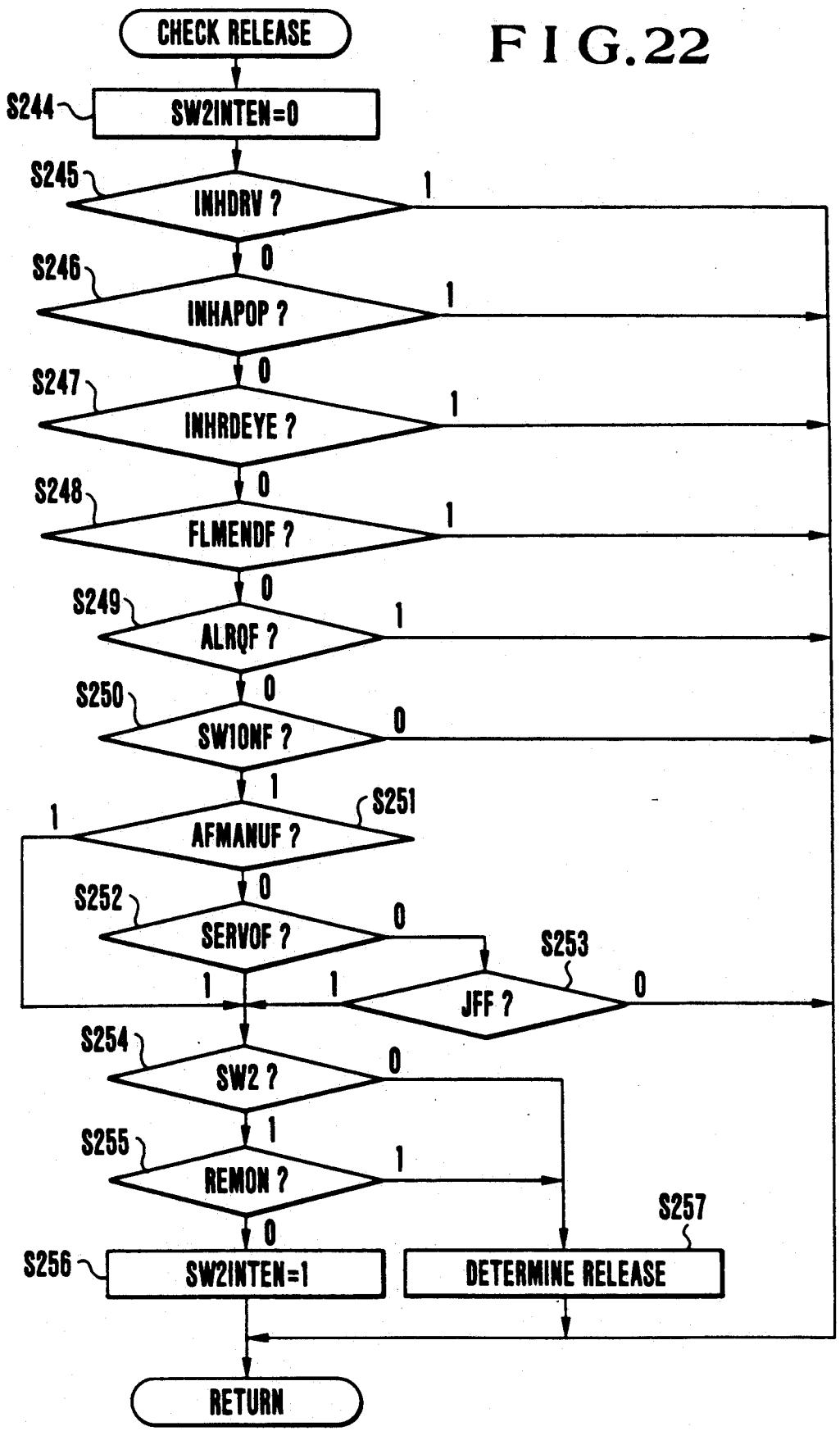
FIG. 22 is a flowchart of the subroutine "Check release".

FIG. 22 is a flowchart of the subroutine "CHECK RELEASE".

Step S244: An interrupt for shutter release caused by the falling of a signal outputted from the switch SW2 is inhibited.

Steps S245 to S253: A decision is made as to each condition under which shutter release is impossible.

Shutter release is not performed under any of the following conditions: (1) after single shooting has been performed; (2) before a decision as to automatic flashing is performed; (3) while a red-eye preventing operation is being performed; (4) when the end of the film is detected; (5) when the back lid is closed; (6) when the switch SW1 of the release button is off; (7) when a remote-control signal is not being received; and (8) when no in-focus state is achieved in the one-shot AF mode.

Steps S254 and S255: If the switch SW2 is on or if a remote-control signal is being received, execution of shutter release is determined in Step S257. The process proceeds from Step S163 to the subroutine "SHUTTER RELEASE".

Step S256: If the conditions required to execute shutter release are established, and if the switch SW2 of the release button is off and a remote-control signal is not being received, the camera is set so that an interrupt for shutter release can be generated by the falling of a signal outputted from the switch SW2. If the interrupt for shutter release is generated, the process immediately starts to execute the shutter release.

Accordingly, after that, if the switch SW2 of the release button is turned on during the execution of the loop of Steps S155 to S166, an operation which is being executed at that time is interrupted and the process jumps to the subroutine "SHUTTER RELEASE".

However, as described in connection with the subroutine "DRIVING FOR FLASH ZOOMING", if it is determined that a driving for flash zooming is being executed, the shutter release is inhibited and a release of the shutter is then impossible during the driving for flash zooming.

Figure 23:
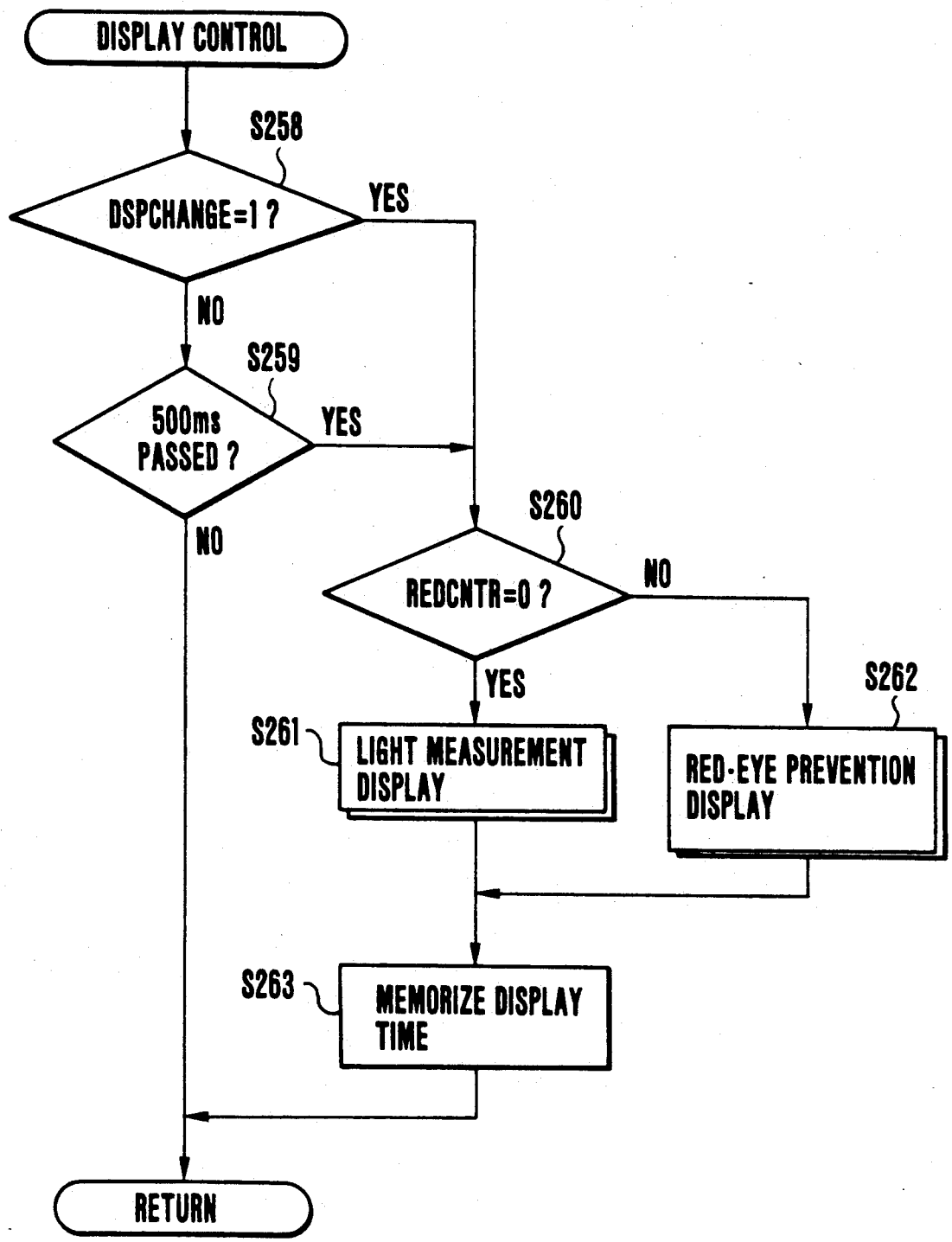
FIG. 23 is a flowchart of the subroutine "Display control".

FIG. 23 is a flowchart of the subroutine "DISPLAY CONTROL".

Step S258: If the process proceeds to this routine for the first time, the process jumps to Step S260 since the flag DSPCHANGE has been set up in Step S154.

Steps S260 to S262: If the value of the red-eye prevention counter REDCNTR is not "0", an indication representing that the red-eye preventing operation is being executed is displayed; otherwise, a light-measurement indication is displayed.

Step S263: Displayed time is memorized.

After that, if the flag DSPCHANGE is not set up, the loop of Steps S155 to S166 is repeated. Then, the process proceeds to Step S259.

Step S259: It is determined whether 500 ms have passed from the memorized displayed time. If 500 ms have passed, updating of the display is performed. Accordingly, since the display is updated at intervals of 500 ms, even if a light-measurement value varies frequently during the light-measurement computations, the display does not flicker. However, if the flag DSPCHANGE is set up by any cause, the display is updated and 500 ms are again counted.

Figure 24:
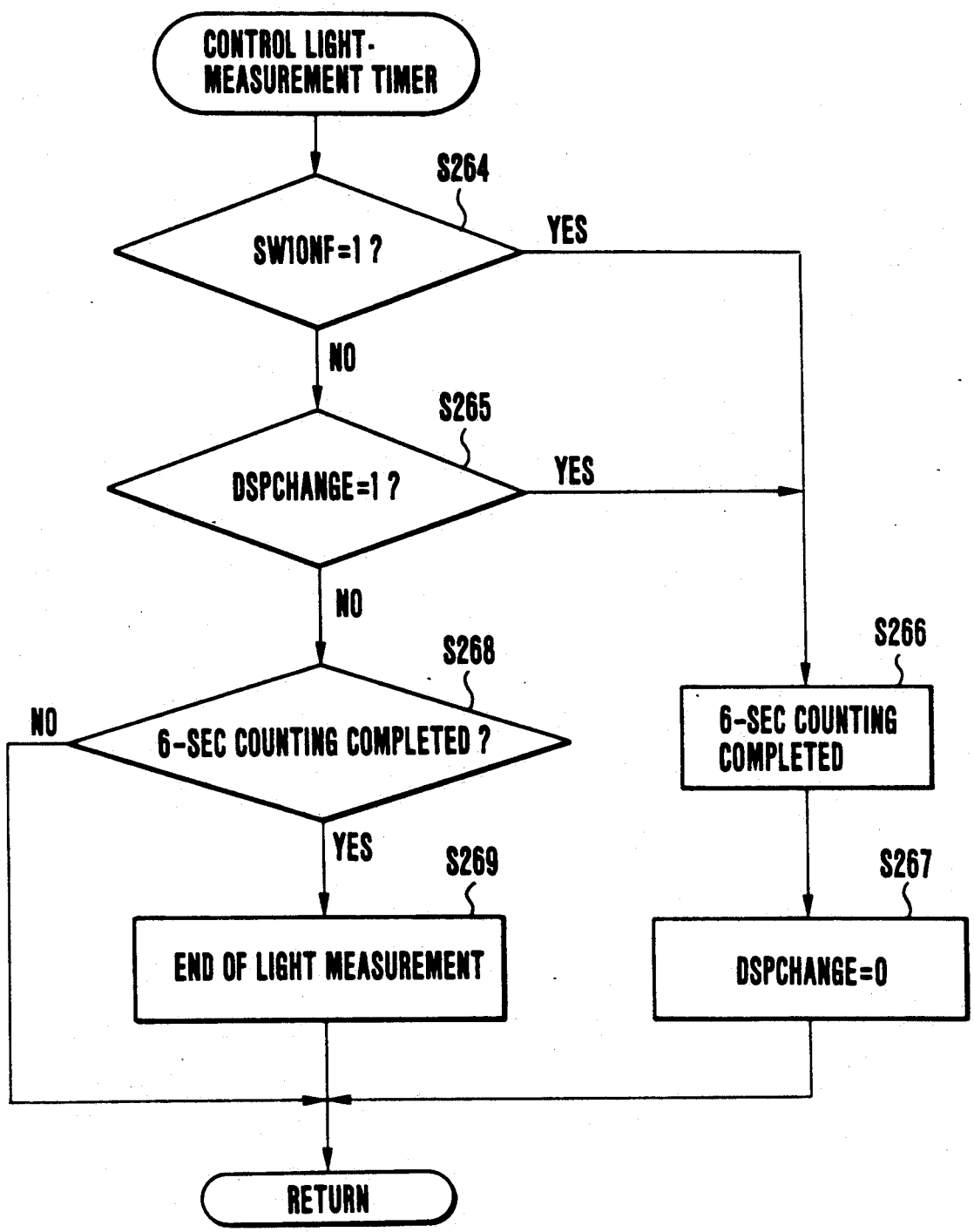
FIG. 24 is a flowchart of the subroutine "Control light-measurement timer".

FIG. 24 is a flowchart of the subroutine "CONTROL LIGHT-MEASUREMENT TIMER".

Steps S264 to S267: If the light measurement flag SW1ONF is set up or the display is updated, then the time to be counted is set to 6 seconds in Step S266. The display-update request flag DSPCHANGE is cleared in Step S267.

Steps S268 and S269: If 6 seconds have passed with the light measurement flag SW1ONF remaining in the "0" state and the display-update request flag DSPCHANGE remaining in the "0" state, it is determined that the light-measurement timer has timed out. The process returns from Step S166 to the standby state.

In other words, if the switch SW1 of the release button is turned on once to execute a light measurement, the 6-second light-measurement timer is activated after the switch SW1 has been turned off. The light measurement is continued while the 6-second light-measurement timer is counting. When 6 seconds have passed, the process returns to the standby state.

The operation of the camera when both the full automatic mode and the red-eye preventing function are set will be described below in brief.

If the photographer aims the camera at a subject and presses the release button 104 down to the first stroke position, the program proceeds from Step S11 to the subroutine "LIGHT MEASUREMENT". In Step S154, initializing is performed, that is, the in-focus flag JFF is cleared, and the inhibit-release-during-red-eye-prevention flag INHRDEYE as well as the inhibit-release-before-automatic-flashing-decision flag INHAPOP are set.

In Step S159, a one-shot AF operation is initiated. When distance-measurement computations have been completed and the lens starts moving, light-measurement computations are performed in Step S160. At this time, since no in-focus state has yet been reached, the process immediately returns from Step S216 in the case of the subroutine "CHECK AUTOMATIC FLASHING". Accordingly, the aperture value AVDISPR and the shutter speed TVDISPR are obtained through AE computations. The process also returns from Step S229 in the case of the subroutine "CONTROL RED-EYE PREVENTING FUNCTION". Accordingly, a shutter release is impossible in Step S162 for a release check. Then, in Steps S261 for the display control, a display of a light-measurement indication is executed to provide the visual displays shown in FIGS. 42(A) and 43(A).

Figure 43A:
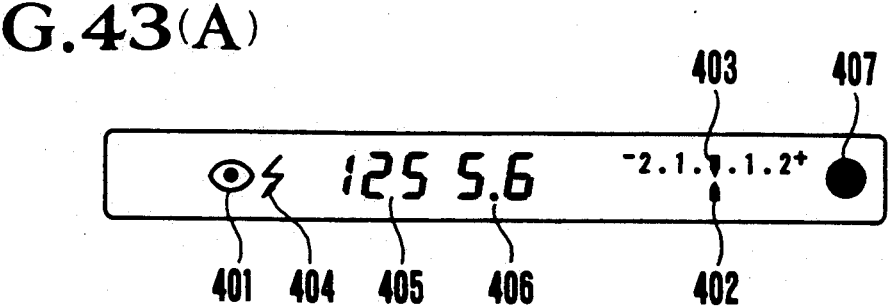
FIGS. 43(A) to 43(G) are views showing various displays provided in a viewfinder.
Figure 43B:
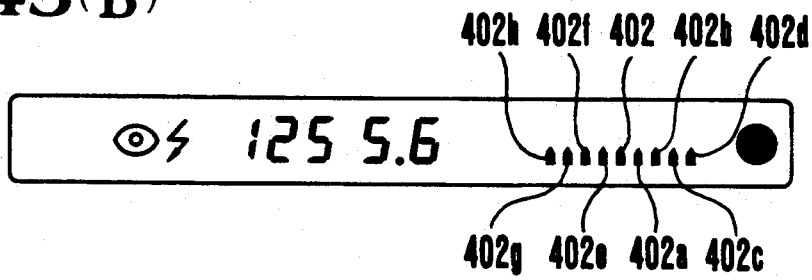
Figure 43C:
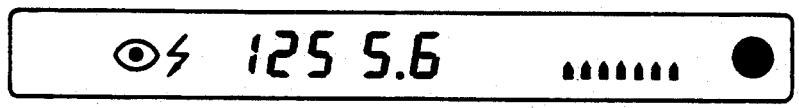
Figure 43D:
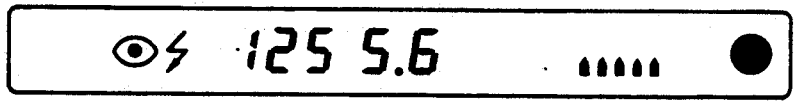
Figure 43E:
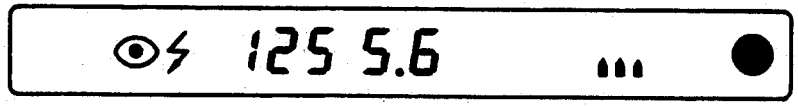
Figure 43F:
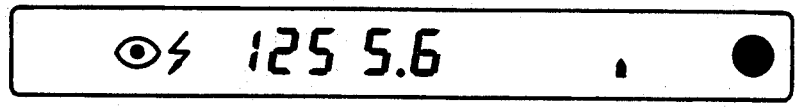
Figure 43G:
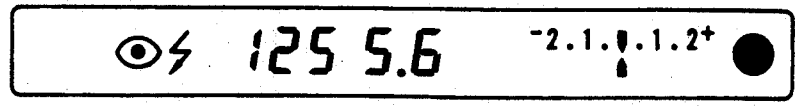

When the lens is driven to reach an in-focus position, the in-focus flag JFF is set to "1" in Step S194, and a check of the automatic flash is performed. If it is determined in the check of the automatic flash that the conditions of the automatic flash are satisfied, then the flash unit is automatically popped up in Step S222. Since the flash unit is popped up, the flash mode flag FLASHF is set up in Step S224, and in Step S213 flash-mode computations are performed. Then, in the subroutine "CONTROL RED-EYE PREVENTING FUNCTION", the red-eye preventing lamp 33 is lit up in Step S237 for the first time. At the same time that the red-eye preventing lamp 33 is lit up, a indication representing that a red-eye preventing operation is being executed is displayed in Step S262 of the subroutine "DISPLAY CONTROL". Since the value of the red-eye prevention counter REDCNTR is "5", the respective visual displays shown in FIGS. 42(B) and 43(B) are provided. While the indication of the execution of the red-eye preventing operation is being displayed, the inhibit-release-during-red-eye-prevention flag INHRDEYE remains on and the shutter release is inhibited. When 250 ms pass after the indication that is shown in FIG. 42(B) has been displayed, the red-eye prevention counter REDCNTR is decremented in Step S242. Simultaneously, the displays switch from those of FIGS. 42(B) and 43(B) to those of FIGS. 42(C) and 43(C), respectively. Similarly, each time 250 ms pass, the red-eye prevention counter REDCNTR is decremented and the respective displays switch accordingly. When the red-eye prevention counter REDCNTR is decremented to "0", the inhibit-release-during-red-eye-prevention flag INHRDEYE is cleared in Step S243.

Since the red-eye preventing lamp 33 is kept lighting up during a predetermined time in the above-described manner, the pupils of the subject shrink in reaction to the light of the red-eye preventing lamp 33 so that red eye does not easily occur. During this time, the display is updated at intervals of 250 ms to warn the photographer that the red-eye preventing operation is being executed. During a period of time in which the effect of the red-eye preventing operation is not obtained, shutter release is inhibited. If 1.25 seconds have passed and occurrence of the red eye is prevented, the inhibit-release-during-red-eye-prevention flag INHRDEYE is cancelled and shutter release is enabled. When the switch SW1 of the release button is turned off, the red-eye preventing lamp 33 is put out in Step S175. If the release button is again depressed, an identical operation is again performed.

If the conditions of automatic flashing are not satisfied, the inhibit-release-before-automatic-flashing-decision flag INHAPOP is cleared in Step S225. Since the flash mode flag FLASHF remains cleared by the subroutine "CONTROL RED-EYE PREVENTING FUNCTION", the inhibit-release-during-red-eye-prevention flag INHRDEYE is cleared in Step S235 and shutter release is enabled with AE active in the subroutine "CHECK RELEASE".

If the exposure setting mode is any one of the shutter priority mode, the aperture priority mode, or the program mode, the flash unit does not automatically pop up, and is popped up by pressing down the flash pop-up button 105. Accordingly, if the red-eye preventing mode is set, the red-eye preventing function is performed only when the flash unit is popped up.

If the AF mode is in the servo AF mode or a manual focusing mode, the automatic pop-up operation of the flash unit and the emission of a red-eye preventing light are executed at the same time that the switch SW1 of the release button is pressed down.

If the film transport mode is the self-timer mode, the red-eye preventing lamp 33 does not operate during the light measurement. The operation of the camera in the self-timer mode will be described later.

Figure 25:
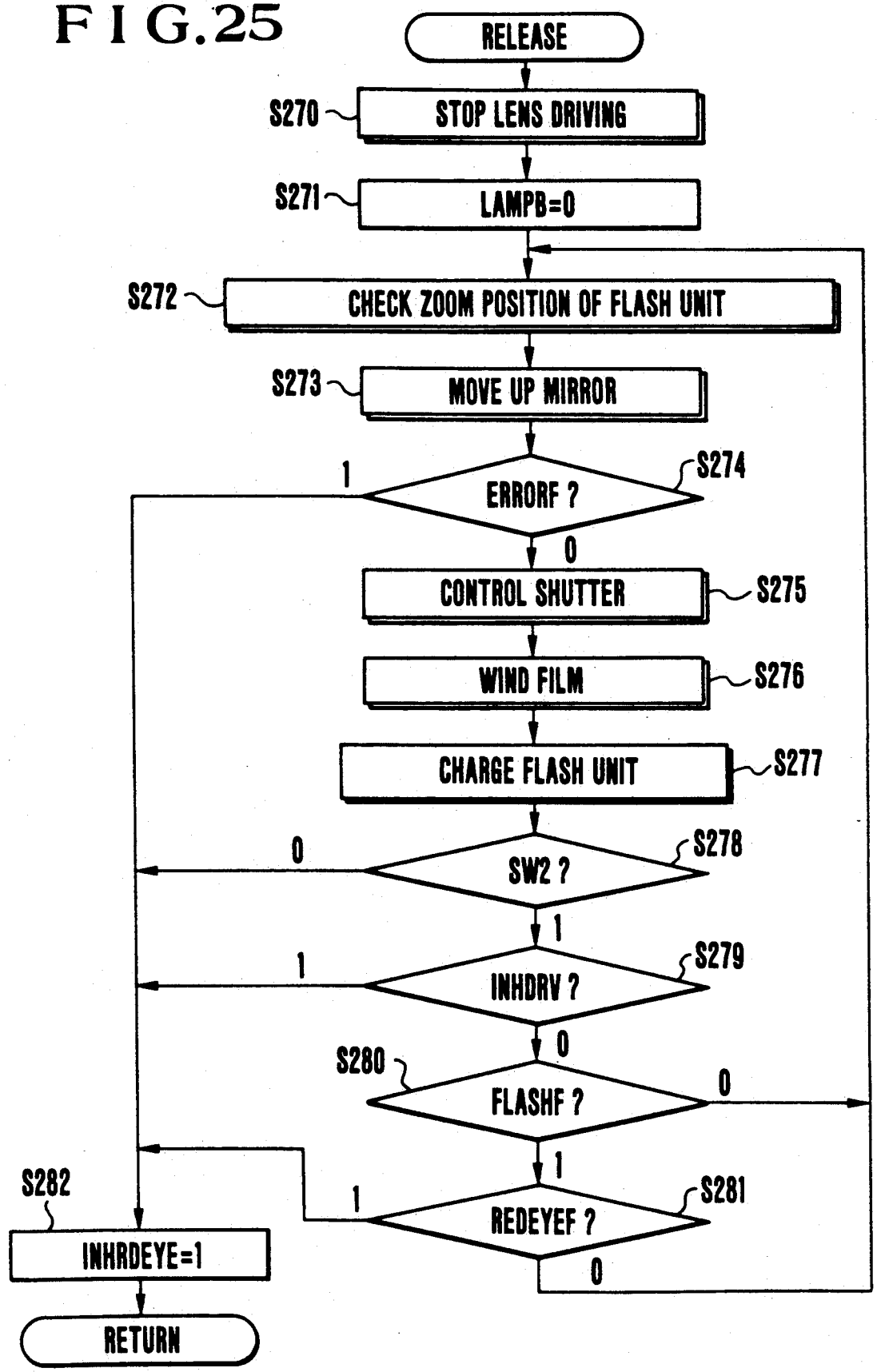
FIG. 25 is a flowchart of the subroutine "Release".

FIG. 25 is a flowchart of the subroutine "RELEASE".

Step S270: The driving of the lens is stopped since the lens may be moving in the servo AF mode.

Step S271: The red-eye preventing lamp 33 is put out.

Step S272: The zoom position of the flash unit is checked.

Step S273: The main mirror is moved up.

Step S274: If any error occurs, the process returns from Step S282.

Step S275: The shutter leading and trailing curtains are made to run.

Step S276: The film is wound and the shutter is charged.

Step S277: The flash unit is charged if flashing has been performed.

Step S278: If the switch SW2 is off, the shutter release operation is brought to an end.

Step S279: In the case of the state of release inhibition after single shooting, the process brings the shutter release operation to an end and proceeds to Step S282 without performing continuous shooting.

Steps S280 and S281: If the red-eye preventing mode is set with the flash mode selected, the process returns to the standby state without performing continuous shooting.

Step S282: The inhibit-release-during-red-eye-prevention flag INHRDEYE is set up.

Accordingly, even if the film transport mode is the continuous shooting mode, when the switch SW2 is held in the on state during the red-eye preventing mode, the process returns to the standby stat each time the film is transported by one frame. In the subroutine "LIGHT MEASUREMENT", the red-eye preventing lamp 33 is lit up for 1.25 seconds and then a shutter release operation is executed. If the red-eye preventing mode has not been selected, the process repeats the loop of Steps S272 to S281 while the switch SW2 is being held in the o state with the continuous shooting mode selected as the film transport mode.

Figure 26:
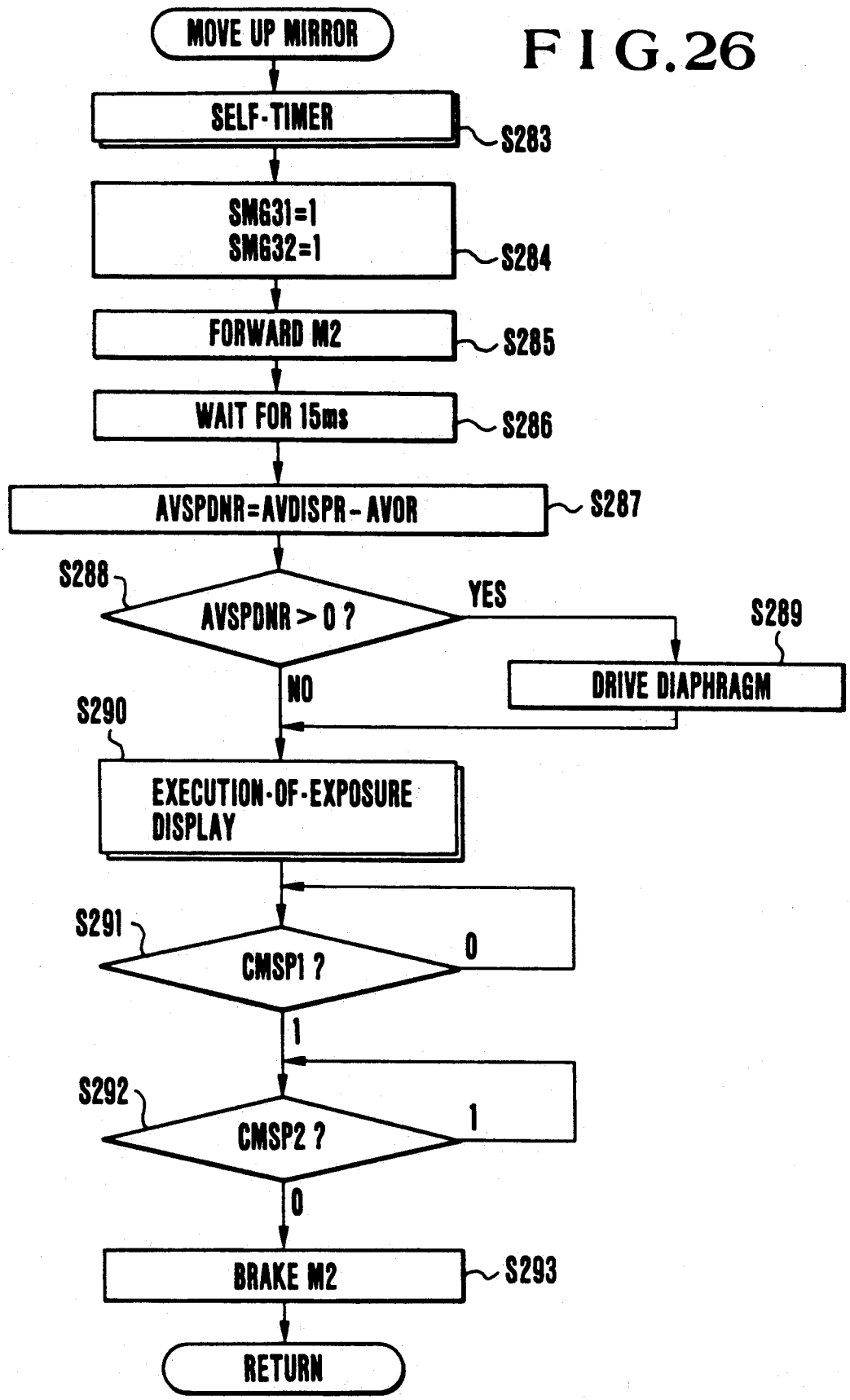
FIG. 26 is a flowchart of the subroutine "Move up mirror".

FIG. 26 is a detailed flowchart of the subroutine "MOVE UP MIRROR".

Step S283: Processing of the self-timer mode is performed. If the self-timer mode has been set, the process waits for 10 seconds.

Step S284: Since the shutter is of the release type, the shutter-operating electromagnets MG31 and MG32 are energized before the retention of the shutter is released.

Step S285: The motor M2 is made to run in the forward direction.

Step S286: The process waits for 15 ms to avoid a rush current in the energization of the motor M2.

Steps S287 to S289: A computed difference in aperture is stored in the aperture stopped-down difference register AVSPDNR. If the computed difference in aperture is greater than "0", then a diaphragm drive command is transmitted to the lens.

Step S290: An indication indicating that exposure is being performed is displayed.

Step S291: The state of the shutter-charging and mirror-up phase switch CMSP1 is checked. If the shutter-charging and mirror-up phase switch CMSP1 is on, the loop of Step S291 is repeated. When the switch CMSP1 is turned off, Step S292 is executed.

Step S292: The process loops until the shutter-charging and mirror-up phase switch CMSP2 is turned on.

Step S293 Since the shutter-charging and mirror-up phase switch CMSP2 is turned on and the upward movement of the main mirror is completed, the motor M2 is braked.

Figure 27:
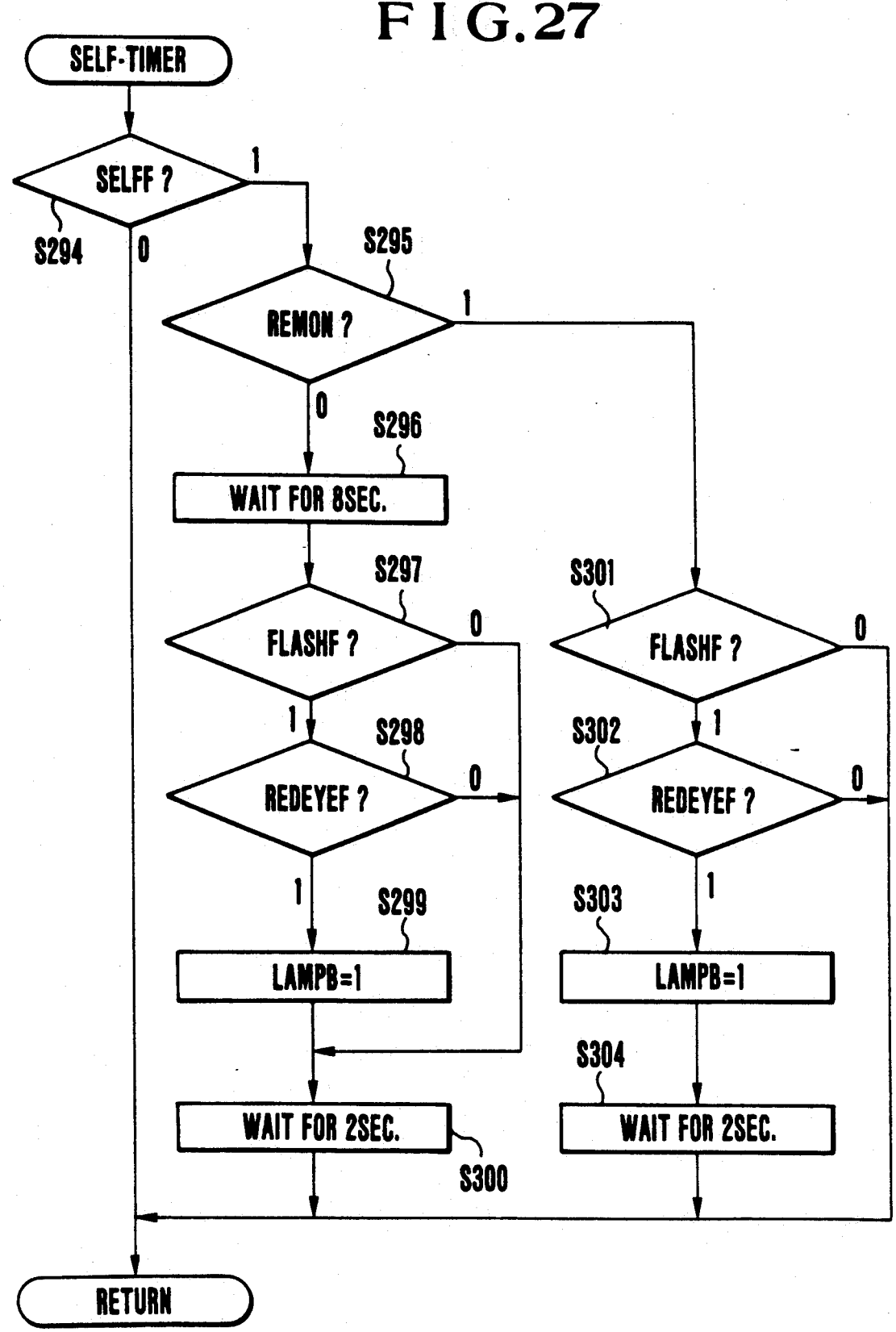
FIG. 27 is a flowchart of the subroutine "Self-timer".

FIG. 27 is a detailed flowchart of the subroutine "SELF-TIMER".

Step S294: If the self-timer mode is not set, the process returns immediately.

Step S295: It is determined whether the shutter-release operation has been performed by means of the remote controller or by turning on the switch SW2. If the remote controller is not used, then Step S296 and the subsequent steps are executed.

Step S296: The process waits for the self-timer to count 8 seconds.

Steps S297 to S299: If the red-eye preventing mode is set with the flash mode active, the red-eye preventing lamp 33 is lit up. In the subroutine "CONTROL RED-EYE PREVENTING FUNCTION", the red-eye preventing lamp 33 is not lit up at the time of setting the self-time mode. This processing is intended to improve the operability of the camera by lighting up the red-eye preventing lamp 33 for the last 2 seconds in the 10-second counting of the self-timer and preventing a wasteful power consumption from occurring during the light measurement and the 8-second counting of the self-timer.

Step S300: The process waits for 2 seconds.

If a remote-control signal is received and a shutter release operation is initiated, the process proceeds from Step S295 to Step S301.

Steps S301 to S304: If the red-eye preventing mode is set with the flash mode active, the red-eye preventing lamp 33 is lit up for 2 seconds and then the shutter is released. If the red-eye preventing mode has not been set, the process returns immediately. Accordingly, if the red-eye preventing mode is not set when the remote controller is in use, the shutter is immediately released. If the red-eye preventing mode is set, the red-eye preventing lamp 33 is lit up for 2 seconds and then the shutter is released.

Figure 28:
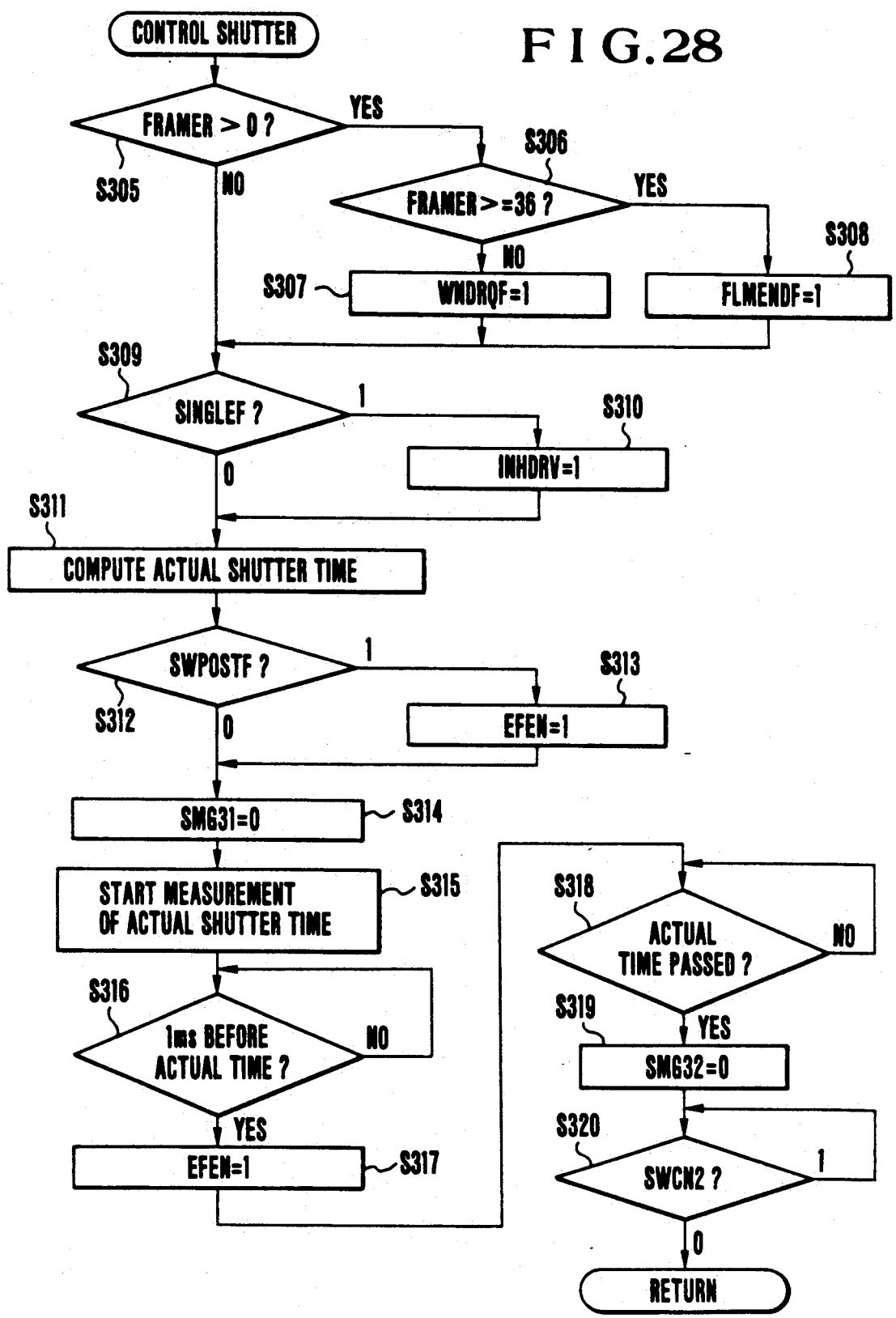
FIG. 28 is a flowchart of the subroutine "Control shutter".

FIG. 28 is a detailed flowchart of the subroutine "CONTROL SHUTTER".

Steps S305 to S308: If there is no film in the camera, film winding is not performed. If the film has been exposed up to the 36th frame, the end-of-film flag FLMENDF is set up. If the film has not yet been exposed up to the 36th frame, a winding request flag WNDRQF is set up.

Steps S309 and S310: If the film transport mode is set to the single shooting mode, the inhibit-release-after-single-shooting flag INHDRV is set up.

Step S311: An actual shutter running time is computed from the APEX value of the computed shutter speed TVDISPR.

Steps S312 and S313: If the trailing-curtain-sync-flash setting switch SWPOSTF is off, the leading-curtain sync flash has been selected. Accordingly, "1" is outputted as the flashing control signal EFEN to enable the flash unit to flash.

Step S314: The energization of the shutter-leading-curtain holding electromagnet MG31 is stopped to cause the leading curtain to run.

When the shutter leading curtain completes running, the X-sync contact 531 is turned on. The flashing controlling circuit 513 causes the trigger circuit 514 to output a trigqer signal for flashing, on the basis of AND processing between the flashing control signal EFEN and an ON signal from the X-sync contact 531. When the flash unit flashes and the intensity of light reflected from the subject reaches a correct level, the flashing controlling circuit 513 stops the flashing of the flash unit. However, in the case of the trailing-curtain sync flash setting, since the value of the flashing control signal EFEN is not "1", the flash unit does not flash.

Step S315: Measurement of an actual shutter timer is initiated.

Step S316: The process waits until 1 ms before the expiry of the actual shutter time.

Step S317: "1" is outputted as the flashing control signal EFEN. Since the X-sync contact 531 has already been turned on, the flashing controlling circuit 513 immediately causes the flash unit to flash and executes flashing control.

Step S318: The process waits for the actual shutter time to pass.

Step S319: The energization of the shutter-trailing-curtain holding the electromagnet MG32 is stopped causing the shutter trailing curtain to run.

Step S320: The process returns when the running-of-trailing-curtain completion switch SWCN2 is turned on.

Figure 29:
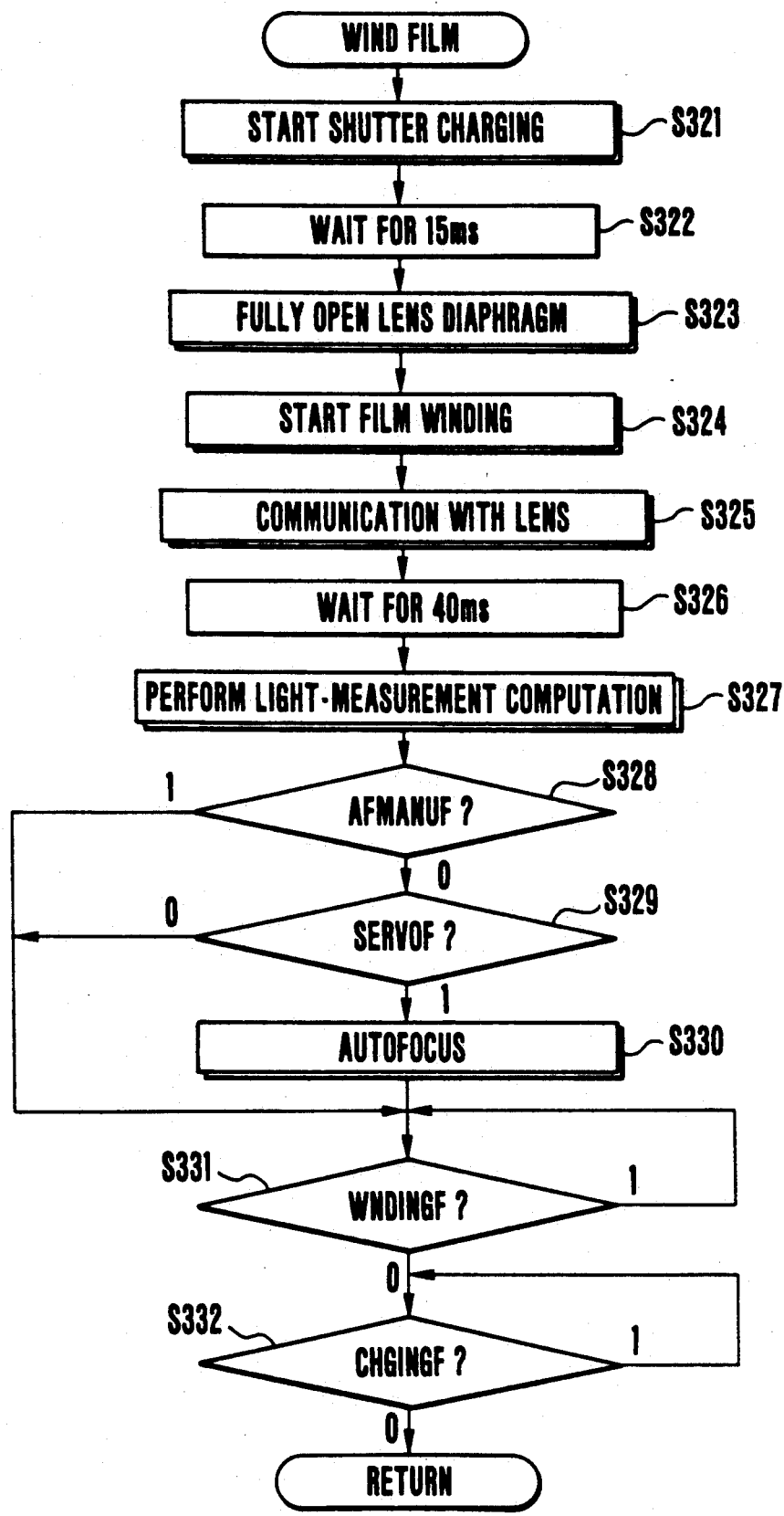
FIG. 29 is a flowchart of the subroutine "Wind film".

FIG. 29 is a detailed flowchart of the subroutine "WIND FILM".

Step S321: A shutter charging interrupt is started. The motor M2 is activated. Since the control is executed in the interrupt, it is executed in parallel with this flowchart. A detailed description will be described later.

Step S322: The process waits for 15 ms to avoid a rush current in the energization of the motor M2.

Step S323: A command to fully open the aperture is transmitted to the lens.

Step S324: A film winding interrupt is started. The motor M1 is activated. Since the control is executed in the interrupt, it is executed in parallel with this flowchart, as in the case of the shutter charging interrupt.

Step S325: Communication with the lens is performed and data is read.

Step S326: The process waits for 40 ms until the main mirror moves down.

Step S327: The subroutine "LIGHT MEASUREMENT COMPUTATION" is called.

Steps S328 to S330: If the AF mode is the servo AF mode, the subroutine "AUTOFOCUS" is called. An AF operation is performed even during continuous shooting.

Step S331: The process waits until the film-winding flag WNDINGF goes to "0", that is, the process waits for the completion of film winding which is being performed in parallel.

Step S332: The process waits for the completion of shutter charging similarly to the film winding. After the shutter charging has been completed, the process returns and the film winding is ended.

FIGS. 30(A) and 30(B) are detailed flowcharts of the subroutine "START SHUTTER CHARGING".

Step S333: Data of "4000" is stored in a shutter-charging time-out counter OC4CNTR.

Step S334: The motor M2 is driven to run in the forward direction.

Step S335: The shutter-charging flag CHGINGF is set, and the charging phase state flag CMSPF is cleared.

Step S336: A 500 $\mu$s-timer interrupt is started.

After that, when 500 $\mu$s elapses during the execution of the subroutine "WIND FILM", an interrupt occurs and control is transferred to the subroutine "500 $\mu$s-TIMER INTERRUPT".

Steps S337 to S340: The shutter-charging time-out counter OC4CNTR is decremented by "1", and if "0" is reached, the process proceeds to Step S339. If the count value of the shutter-charging time-out counter OC4CNTR becomes "0", it indicates that the interrupt has occurred 4,000 times at intervals of 500 $\mu$s. That is to say, if the motor M2 runs forward for 2 seconds but the shutter charging is not completed, it is determined that an accident has occurred. The motor M2 is braked and the error flag ERRORF is set to "1". Simultaneously, the shutter-charging flag CHGINGF is cleared.

Step S341: The state of the charging phase state flag CMSPF is checked. Since the charging phase state flag CMSPF has been cleared in Step S335, Step S342 and the subsequent steps are executed.

Step S342 to S344: If the shutter-charging and mirror-up phase switch CMSP1 or CMSP2 is in the "0" state, the charging phase state flag CMSPF is left in the "0" state and the process proceeds to Step S345. If both switches are set to "1", the charging phase state flag CMSPF is set to "1".

Step S345: The 500 μs-timer interrupt is again started to bring the interrupt to an end. When the shutter-charging and mirror-up phase switches CMSP1 and CMSP2 are both set to "1", the process proceeds from Step S341 to Step S346 in the next interrupt.

Steps S346 and S347: If the shutter-charging and mirror-up phase switch CMSP1 or CMSP2 is in the "1" state, the process proceeds to Step S345, in which the 500 μs-timer interrupt is again started to bring the interrupt to an end. If both switches are set to "0", the process proceeds to Step S348.

Step S348: Since the shutter charging has been completed, the shutter-charging flag CHGINGF is cleared.

Step S349: The motor M2 is braked and the interrupt is brought to an end. After that, the 500 μs-timer interrupt is not executed.

Figure 31A:
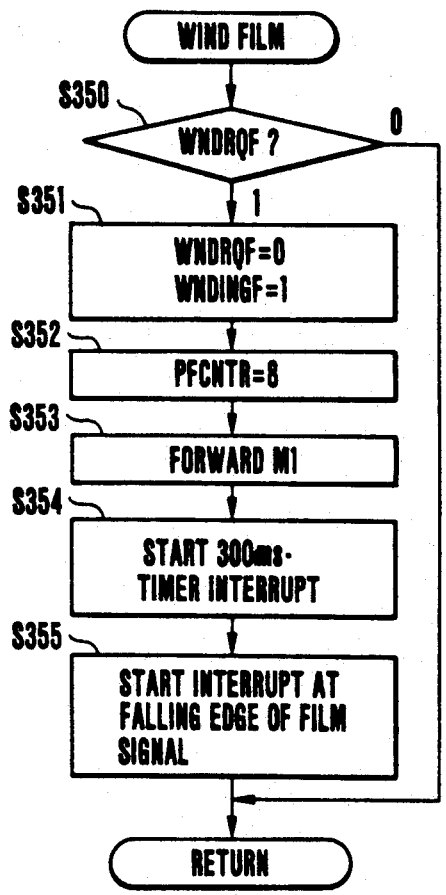
FIGS. 31(A), 31(B) and 31(C) are flowcharts of the subroutines for "Wind film".
Figure 31B:
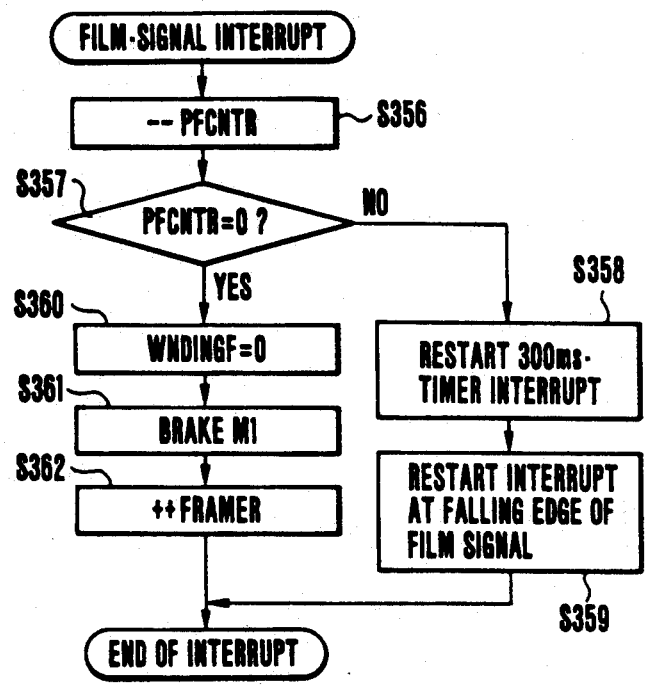
Figure 31C:
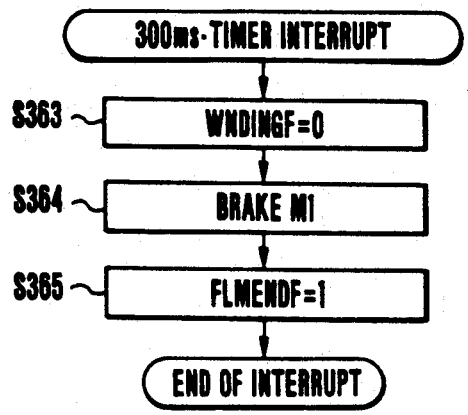

FIGS. 31(A), 31(B) and 31(C) are detailed flowcharts of the subroutine "WIND FILM".

Step S350: If there is no request for film winding, that is, if there is no loaded film, the process returns without executing anything.

Step S351: The film-winding request flag WNDRQ is cleared, and the film-winding flag WNDINGF is set.

Step S352: Data of "8" is stored in a perforation counter PFCNTR.

Step S353: The motor M1 is driven to run in the forward direction, thereby starting film winding.

Step S354: A 300 ms-timer interrupt is started.

Step S355: An interrupt is started which is caused at the falling edge of a film signal.

When the motor M1 is driven in the forward direction, the film is wound. The perforation portion of the film passes through the gap between the phototransistor 505 and the LED 504. During this time, the film-base portion of the film intercepts the light emitted from the LED 504, and the phototransistor 505 is turned off and hence the comparator 507 outputs a high-level signal. While a perforation hole is passing through the aforesaid gap, the light passes through the perforation hole and the comparator 507 outputs a low-level signal. When the perforation hole enters the gap and the comparator 507 outputs the low-level signal, the interrupt occurs and the subroutine "FILM-SIGNAL INTERRUPT" is executed.

Steps S356 to S357: The perforation counter PFCNTR counts down. If the film is transported by eight perforation holes, i.e., by one frame, the process proceeds to Step S360. If not yet, the process proceeds to Step S358.

Step S358: The 300 ms-timer interrupt is again started.

Step S359: The subroutine "FILM-SIGNAL INTERRUPT" is again started to bring the interrupt to an end.

Step S360: The film-winding flag WNDINGF is set.

Step S361: Since the film winding has been completed, the motor M1 is braked.

Step S362: The number of exposed frames is incremented by "1", and the interrupt is brought to an end.

The 300 ms-timer interrupt normally does not occur since it is again started each time the number of perforation holes is counted by one in Step S358. However, in a case where the film is wound up to the end of the film and is stretched in that state, if the interval of the film-signal interrupt becomes longer than 300 ms, the 300 ms-timer interrupt occurs.

Step S363: The film-winding flag WNDINGF is cleared.

Step S364: The motor M1 is braked.

Step S365: The end-of-film flag FLMENDF is set and the interrupt is brought to an end.

In the above-described manner, film exposure, film winding and shutter charging can be performed.

As is apparent from the foregoing description, since the camera according to the present invention is arranged so that if the flashing timing of the flash unit is set to a timing immediately before the start of running of the trailing curtain of the shutter, the operation of the red-eye preventing device is disabled. Accordingly, it is possible to solve the problem that a frame of film is exposed to red-eye preventing light during photography and a scene which does not conform to the intention of a photographer is photographed.

In a case where the emission of the red-eye preventing light is stopped before the start of running of the leading curtain of the shutter with the flashing timing of the flash unit being set to a timing immediately before the start of running of the trailing curtain of the shutter, a substantial red-eye preventing effect cannot be achieved and electrical energy is merely wasted. The present invention makes it possible to prevent the wasteful consumption of the electrical energy.

While the present invention has been described with respect to what is presently considered to be the preferred embodiments, it is to be understood that the invention's entirety covers various modifications and equivalent arrangements included within the spirit and scope of the appended claims. The scope of the following claims is to be accorded the broadest interpretations which would encompass all such modifications and equivalent structures and functions.

What is claimed is:

1. A camera having a red-eye phenomenon preventing emission device, said camera comprising:
   shutter means, located within said camera, having a leading curtain and a trailing curtain;
   a flash unit capable of flashing in a range of time between immediately after a completion of a running of said leading curtain to immediately before a start of a running of said trailing curtain; and
   emission control means which disables said red-eye phenomenon preventing emission device when said flash unit is set for flashing immediately before the start of a running of said trailing curtain.

2. A photographic system comprising:
   a camera body;
   a red-eye phenomenon preventing emission device coupled to said camera body;
   shutter means, located within said camera, having a leading curtain and a trailing curtain;
   a flash unit capable of flashing in a range of time between immediately after a completion of a running of said leading curtain to immediately before a start of a running of said trailing curtain; and
   emission control means which disables said red-eye phenomenon preventing emission device when said flash unit is set for flashing immediately before the start of the running of said trailing curtain.

* * * * *

UNITED STATES PATENT AND TRADEMARK OFFICE
CERTIFICATE OF CORRECTION

PATENT NO. : 5,264,894  
DATED : November 23, 1993  
INVENTOR(S) : Ryuichi KOBAYASHI, et al.

Page 1 of 2

It is certified that error appears in the above-indentified patent and that said Letters Patent is hereby corrected as shown below:

FIGURE 6:
    Sheet 8, "FULLAUOTOF = 0" should read --FULLAUTOF = 0--.

COLUMN 2:
    line 28, "zoom" should read --zoom phase--.

COLUMN 4:
    line 66, "pressed" should read --presses--.

COLUMN 6:
    line 22, "about" should read --about 40°--; and
    line 23, "whichever" should read --Whichever--.

COLUMN 9:
    line 65, "a" (second occurrence) should read --an--.

COLUMN 10:
    line 59, "s" should read --is--.

COLUMN 14:
    line 5, "switch SW11" should read --SW1--.

COLUMN 15:
    line 45, "t" should read --to--; and
    line 49, "an" should read --a--.

UNITED STATES PATENT AND TRADEMARK OFFICE
CERTIFICATE OF CORRECTION

PATENT NO. : 5,264,894
DATED : November 23, 1993
INVENTOR(S) : Ryuichi KOBAYASHI, et al.

It is certified that error appears in the above-indentified patent and that said Letters Patent is hereby corrected as shown below:

<u>COLUMN 18</u>:
 line 31, "example" should read --example,--.

<u>COLUMN 19</u>:
 line 29, "value" should read --values--.

<u>COLUMN 23</u>:
 line 3, "S206" should read --S206,--.

<u>COLUMN 28</u>:
 line 28, "o" should read --on--.

<u>COLUMN 31</u>:
 line 4, "charqing" should read --charging--; and
 line 34, "flag WNDRQ" should read --flag WNDRQF--.

Signed and Sealed this

Sixteenth Day of August, 1994

Attest:

BRUCE LEHMAN

*Attesting Officer*        *Commissioner of Patents and Trademarks*